United States Patent
Cosentino et al.

(10) Patent No.: US 11,027,991 B2
(45) Date of Patent: Jun. 8, 2021

(54) ELECTROLYTIC BIOCIDE GENERATING SYSTEM FOR USE ON-BOARD A WATERCRAFT

(71) Applicant: ElectroSea, LLC, Wayzata, MN (US)

(72) Inventors: Louis Ciro Cosentino, Palm Beach Gardens, FL (US); Daniel L. Cosentino, Wayzata, MN (US)

(73) Assignee: ElectroSea, LLC, Wayzata, MN (US)

( * ) Notice: Subject to any disclaimer, the term of this patent is extended or adjusted under 35 U.S.C. 154(b) by 294 days.

(21) Appl. No.: 16/152,176

(22) Filed: Oct. 4, 2018

(65) Prior Publication Data

US 2019/0106339 A1    Apr. 11, 2019

Related U.S. Application Data

(60) Provisional application No. 62/737,555, filed on Sep. 27, 2018, provisional application No. 62/735,615, (Continued)

(51) Int. Cl.
*C02F 1/461* (2006.01)
*C02F 1/467* (2006.01)
(Continued)

(52) U.S. Cl.
CPC ........ *C02F 1/46104* (2013.01); *C02F 1/4674* (2013.01); *C02F 1/004* (2013.01); *C02F 2103/008* (2013.01); *C02F 2103/02* (2013.01); *C02F 2103/023* (2013.01); *C02F 2103/08* (2013.01); *C02F 2201/001* (2013.01);
(Continued)

(58) Field of Classification Search
CPC ............ C02F 2201/46145; C02F 1/461; C02F 1/46104; C02F 2001/46119; C02F 2201/4612; C02F 2201/4611; C02F 2201/4613; C02F 2201/46105
See application file for complete search history.

(56) References Cited

U.S. PATENT DOCUMENTS 3,010,886 A   11/1961  Chappell
3,241,512 A   3/1966   Green
(Continued)

FOREIGN PATENT DOCUMENTS

DE   10 2004 005 303 A1   8/2005
EP       2 394 965 A1     12/2011
(Continued)

OTHER PUBLICATIONS

Abdel-Aal et al., "Hydrogen Production Using Sea Water Electrolysis," The Open Fuel Cells Journal, vol. 3, pp. 1-7 (2010).
(Continued)

*Primary Examiner* — Nicholas A Smith
(74) *Attorney, Agent, or Firm* — Merchant Gould P.C.

(57) ABSTRACT

The present disclosure relates to a biocide generating system for inhibiting bio-fouling within a water system of a watercraft. The water system is configured to draw water from a body of water on which the watercraft is supported. The biocide generating system includes an electrode arrangement adapted to be incorporated as part of an electrolytic cell through which the water of the water system flows.

22 Claims, 37 Drawing Sheets

Related U.S. Application Data filed on Sep. 24, 2018, provisional application No. 62/568,629, filed on Oct. 5, 2017.

(51) Int. Cl.

| | | |
|---|---|---|
| *C02F 103/02* | (2006.01) | |
| *C02F 103/00* | (2006.01) | |
| *C02F 1/00* | (2006.01) | |
| *C02F 103/08* | (2006.01) | |

(52) U.S. Cl.
CPC . *C02F 2201/008* (2013.01); *C02F 2201/4611* (2013.01); *C02F 2201/4612* (2013.01); *C02F 2201/4613* (2013.01); *C02F 2201/4614* (2013.01); *C02F 2201/4615* (2013.01); *C02F 2201/4617* (2013.01); *C02F 2201/46145* (2013.01); *C02F 2201/46175* (2013.01); *C02F 2209/40* (2013.01); *C02F 2303/04* (2013.01); *C02F 2303/20* (2013.01)

(56) References Cited

U.S. PATENT DOCUMENTS

| | | | |
|---|---|---|---|
| 3,458,413 | A | 7/1969 | Ueda et al. |
| 4,173,525 | A | 11/1979 | Nakamatsu et al. |
| 4,488,945 | A | 12/1984 | Spaziante |
| 4,561,955 | A | 12/1985 | Jackson |
| 5,807,473 | A | 9/1998 | Sadler et al. |
| 5,853,562 | A | 12/1998 | Eki et al. |
| 6,096,177 | A | 8/2000 | Kamitani et al. |
| 6,716,325 | B2 | 4/2004 | Bentley |
| 6,821,398 | B2 | 11/2004 | Von Broembsen |
| 8,163,141 | B2 | 4/2012 | Von Broembsen |
| 8,968,575 | B2 | 3/2015 | Zolotarsky et al. |
| 2003/0024809 | A1 | 2/2003 | Broembsen |
| 2005/0173262 | A1* | 8/2005 | Nakanishi ............. C02F 1/4676 205/743 |
| 2006/0169647 | A1 | 8/2006 | Doyle et al. |
| 2007/0095732 | A1 | 5/2007 | Lutz |
| 2007/0108056 | A1* | 5/2007 | Nyberg ................ C02F 1/4695 204/554 |
| 2008/0000775 | A1 | 1/2008 | Childers, II et al. |
| 2009/0211918 | A1* | 8/2009 | Hardee ................... C25B 15/00 205/556 |
| 2009/0229992 | A1 | 9/2009 | Sanchez et al. |
| 2010/0213049 | A1 | 8/2010 | Burtsch |
| 2013/0087450 | A1 | 4/2013 | Antozzi et al. |
| 2016/0130165 | A1* | 5/2016 | Park ......................... B63J 4/002 210/96.1 |
| 2017/0152162 | A1* | 6/2017 | Cam .................. C02F 1/46109 |
| 2019/0023596 | A1 | 1/2019 | Trela |
| 2020/0017379 | A1* | 1/2020 | Nakayama ................ C02F 1/48 |

FOREIGN PATENT DOCUMENTS

| | | | | |
|---|---|---|---|---|
| KR | 10-0663332 B1 | 1/2007 | | |
| KR | 100663332 B1 | 1/2007 | | |
| WO | WO 2010/022057 A1 | 2/2010 | | |
| WO | WO-2014016038 A1 * | 1/2014 | ............ | C02F 1/4691 |
| WO | 2014129710 A1 | 8/2014 | | |
| WO | 2017017462 A1 | 2/2017 | | |
| WO | 2018102623 A1 | 6/2018 | | |

OTHER PUBLICATIONS

About our Equipment, http://electrichlor.com/equipment/, Electrichlor, 4 pages (Copyright 2012).
Assessment of the Effects of Chlorinated Seawater from Power Plants on Aquatic Organisms, Interagency Energy/Environment R&D Program Report, Environmental Protection Agency, EPA-600/7-28-221, 76 pages (Nov. 1978).
AS-US Standard Brochure, Arctic Steel, 4 pages (Feb. 2016).
Carson, "CircuPool RJ Series Salt Chlorine Generator," Pool Product Magazine, http://www.poolproductreviewsmagazine.com/, 4 pages (Jun. 2009).
Cathelco Cathodic Protection Systems in Australia by Marine Plant Systems, Marine Plant Systems Pty Ltd., pp. 1-6 (Mar. 23, 2017).
Chaplin, "Electrolysis of Water," http://www1.lsbu.ac.uk/phpcgiwrap/water/pfp.php3?page=http://www1.lsbu.ac.uk/water/electrolysis.html, pp. 1-5 (Feb. 27, 2017).
Chemistry of Sea Water, Chapter VI, pp. 165-227.
Chemtrol Pool Control—Chemical Automation, http://www.sbcontrol.com/salt_generators.htm, pp. 1-3 (Date Downloaded Jan. 23, 2017).
Chen et al., $Ti/RuO_2-Sb_2O_5-SnO_2$ electrodes for chlorine evolution from seawater, Chemical Engineering Journal, vol. 172, pp. 47-51 (2011).
Chlorine Analyser, http://www.turtletough.com.au/product/chlorine-analyser-2/#woocommerce-tabs3, pp. 1-4 (Mar. 6, 2017).
Chlorine Analyzer for Chlorine Dosing Control, http://www.processinstruments.net/products/chlorine-analyzer/?gclid=CIuGzpKq19ECFcVEhgodPkMH3w, pp. 1-2 (Jan. 23, 2017).
Chlorine Generator, http://www.doheny.com/poolsupplies/ChlorineGenerator5742.html?adpos=1o6&creative=116116201388&device=c&matchtype=&network=g&gclid=CjwKEAiA, 2 pages (Copyright 2015).
Chlorine Measurement by Amperometric Sensor, Application Data Sheet, Emerson Process Management, ADS 43-6063/rev.B, 3 pages (Feb. 2009).
CircuPool RJ-30 Classic Replacement Cell, http://www.discountsaltpool.com/CircuPool-RJ-30-Classic-Replacement-Salt-Cell.phpk, pp. 1-2 (Jan. 15, 2017).
Clomburg et al,. Industrial biomanufacturing: The future of chemical production, Science, vol. 355, 12 pages (Jan. 6, 2017)
Compu-Chlor Auto Cleaning Replacement Cells, http://www.compupool.com.au/product/genuine_cells_auto.htm, 1 page (Jan. 15, 2017).
CPSC Series Auto Cleaning Replacement Cells, http://www.compupool.com.au/product/genuine_cells_cpsc.html, 1 page (Jan. 15, 2017).
Current Limiting, Apex Manufacturing, Inc., www.apexanalog.com, AN09U RevE, pp. 1-3 (Oct. 2012).
Driving Capacitive Loads, Apex Manufacturing, Inc. www.apexanalog.com, AN25U RevG, pp. 1-19 (Oct. 2012).
DX Seawater Pumps Reliable & Heavy-duty Centrifugal Pumps, Domestic Murine, ISO 9001-2008, 2 pages (Feb. 26, 2010).
Effects of Wastewater and Cooling Water Chlorination on Aquatic Life, Enviromental Protection Agency, EPA-600/3-76-098, 54 pages (Aug. 1976).
Electrolytic Cells, http://chemed.chem.purdue.edu/genchem/topicreview/bp/ch20/faraday.php, pp. 1-10 (Date Downloaded Feb. 26, 2017).
Evaluation Kit, Apex Manufacturing, Inc., www.apexanalog.com, EK27U Rev F, pp. 1-9 (Dec. 2015).
Flat Plate vs. Round, Electrichlor, http://electrichlor.com/flat-plate-vs-round/, pp. 1-4 (Copyright 2012).
General Operating Considerations, Apex Manufacturing, Inc., www.apexanalog.com, AN01U RevJ, pp. 1-13 (Oct. 2012).
GENH30-25, TDK-Lambda Americas-Inc, https://www.genesysdcstore.com/collections/120-volt-options/products/genh30-26, pp. 1-6 (Copyright 2017).
Genuine CircuPool® Replacement Parts, http://circupool.mybigcommerce.com/parts/?sort=featured&page=2, pp. 1-2 (Date Downloaded Jan. 15, 2017).
Grandison et al., "A Review of Marine Growth Protection System (MGPS) Options for the Royal Australian Navy," Maritime Platforms Division, DSTO-TR-2631, 38 pages (Dec. 2011).
Hsu et al., "Effects of electrode settings on chlorine generation efficiency of electrolyzing seawater," Journal of Food and Drug Analysis, vol. 23, pp. 729-734 (2015).
Hypochlorite Generators, Electrichlor, http://electrichlor.com/mariners/, pp. 1-4 (Copyright 2012).
Hypopac Concentric Tubular Cell, http://titanindia.com/hypopac-concentric-tubular-cell.html, pp. 1-3 (Copyright 2016).
IntelliChlor® Electronic Chlorine Generator (Model IC60, IC40, IC20) Installation and User's Guide, 48 pages (Copyright 2009).

(56) References Cited

OTHER PUBLICATIONS

International Search Report and Written Opinion for Application No. PCT/US2018/054200 dated Dec. 21, 2018.
Iridium Coated Titanium Anodes: Sources, Anticipated Life, Applications, http://www.finishing.com/141/64.shtml, pp. 1-9 (Copyright 1995-2016).
Kraft et al., "Electrochemical water disinfection Part I: Hypochlorite production from very dilute chloride solutions," Journal of Applied Electrochemistry, vol. 29, Issue 7, pp. 859-866 (Jul. 1999).
Liang et al., "Research on Electrochemical Behavior of Ti—Ir—Ru Anode Coating in Electrolytic Antifouling of Flowing Brine," Journal of Materials Engineering and Performance, vol. 18, No. 8, pp. 1086-1090 (Nov. 2009).
Macdonald et al., The Interaction of Chlorine and Seawater, Pacific Marine Science Report 77-6, 55 pages (Feb. 1977).
Manasfi et al., "A Comparison Between Freshwater and Seawater Swimming Pools: From Disinfection By-products Profile to Genotoxicity," 6$^{th}$ International Conference on Swimming Pool and Spa Conference, 9 pages (Mar. 2015).
Marine (Offshore) Application Electrochlorination System, http://www.qdmis.com/marine-offshore-electro-chlorinator_p54.html, pp. 1-8 (Copyright 2015-2017).
McPherson, "Amperometric vs. colorimetric methods for on-line measurement of chlorine," WaterWorld, http://www.waterworld.com/articles/print/volume-28/issue-8/editorial-features/amperometric-vs-colorimetric-methods-for-on-line-measurement-of-chlorine.html, 5 pages (Mar. 6, 2017).
Oh et al., "Evaluation of a seawater electrolysis process considering formation of free chlorine and perchlorate," Desalination and Water Treatment, vol. 18, pp. 245-250 (Jun. 2010).
On-Board Waste Treatment LECTRA/SAN MC, http://raritaneng.com/onboardwastetreatmentlectrasanmc/, pp. 1-4 (Copyright 2017).
Operational Amplifier Basics, Apex Manufacturing, Inc. www.apexanalog.com, AN31U RevD, pp. 1-3 (Oct. 2012).
OpimumOxides™ Data Sheet, Optimum Anode Technologies, Inc., 4 pages (Copyright 2012).
Pentair Rainbow 320 Automatic In-Line Chlorine/Bromine Feeder, http://www.poolsupplyworld.com/pentair-Rainbow-320-Automatic-In-Line-ChlorineBromine-Feeder/R171096.htm?xzm2&ecmpid=aw_pla_search_R171096&a, pp. 1-5 (Copyright 2016).
Pikaar et al., "Electrochemical sulfide oxidation from domestic wastewater using mixed metalcoated titanium electrodes," Water Research, vol. 45. Issue 17, pp. 5381-5388 (Nov. 2011).
PM224 MOSFET Power Amplifier Module PM224HV MOSFET High Voltage Power Amplifier Module, http://www.marchandelec.com/pm224.html, pp. 1-2 (Date Downloaded Feb. 12, 2017).
Polmn et al., "Results and Benefits of the Adoption of Pulse-Chlorination® for Industrial Cooling Seawater Antifouling at Qatargas, Ras Laffan Industrial City, Qatar," pp. 1-9 (2012).
Power Amp Output Impedance, Apex Manufacturing, Inc., www.apexanalog.com, AN10U RevD, pp. 1-2 (Oct. 2012).
Power Amplifier Support Components, Apex Manufacturing, Inc. www.apexanalog.com, AN PA50U RevB, pp. 1-2 (Nov. 2012).
Power Operational Amplifier, Apex Manufacturing, Inc. www.apexanalog.com, PA50U RevJ, 4 pages (Jan. 2015).
Programmable Power Supplies, Apex Manufacturing, Inc., www.apexanalog.com, ANO7U RevE, pp. 1-3 (Oct. 2012).
Rajaopal, S. "Chlorination and Biofouling Control in Industrial Cooling Water Systems," Chapter 8, Operational and Environmental Consequences of Large Industrial Cooling Water Systems, pp. 163-182 (2012).
Regulated Adjustable DC Power Supply HY5020EX 50V 20A Over-Voltage Reverse-Voltage Protection, http://www.volteq.com/volteq-power-supply-hy5020ex-50v-20a-over-voltage-over-current-protection.html, pp. 1-6 (Copyright 2006).
RS-150 Series 150W Single Output Switching Power Supply, 2 pages (Jul. 8, 2015).
Ru-ir coated titanium electrode assembly for salt water electrolysis, http://www.bjchangli.com.cn/product/1731406881-220830537/Ru_Ir_coated_titanium_electrode_assembly_for_salt_water_electrolysis.html, pp. 1-7 (Copyright 1999-2016).
Saleem, "Biofouling Management in the Cooling Circuit of a Power Industry Using Electrochemical Process," J. Chem. Soc. Pak, vol. 33, No. 3, pp. 295-304 (2011).
Salt water chlorination, Wikipedia, https://en.m.wikipedia.org/wiki/Salt_water_chlorination, pp. 1-7 (Date Downloaded Jan. 15, 2017).
Seawater chlorination systems, http://www.titanindia.com/seawater-chlorination-systems.html, pp. 1-3 (Date Downloaded Jan. 15, 2017).
Seawater Electrochlorination Systems, De Nora Water Technologies, pp. 1-8 (Copyright 2015).
Single Supply Operation of Power Operational Amplifiers, Apex Manufacturing, Inc. www.apexanalog.com, AN21U RevD, pp. 1-6 (Oct. 2012).
Tsolaki et al., "Technologies for ballast water treatment: a review," J. Chem. Technol. Biotechnol., vol. 85, pp. 19-32 (2010).
Turbo Cell & Control Electronics, Pro Logic Version Rev. 4.45 Diagnostics Manual, 42 pages (Copyright 2014).
Vallet et al., "A study of the failure mechanism of chlorine anodes," Electrochemical Society Proceedings, vol. 95-11, pp. 338-360 (1995).
Voltage to Current Conversion, Apex Manufacturing, Inc., www.apexanalog.com, AN13U RevF, pp. 1-4 (Aug. 2013).
Wallis, "The maintenance of satisfactory water conditions in dolphinaria," Aquatic Mammals, vol. 1, No. 3, pp. 19-25 (1972).
Webb, "Scale Problems in Saltwater Pools," 4 pages (Feb. 2011).
What is Electrochlorination?, http://www.evoqua.com/en/brands/Electrocatalytic/Pages/what-is-electrochlorination.aspx, pp. 1-2 (Date Downloaded Jan. 15, 2017).

\* cited by examiner

FIG. 4
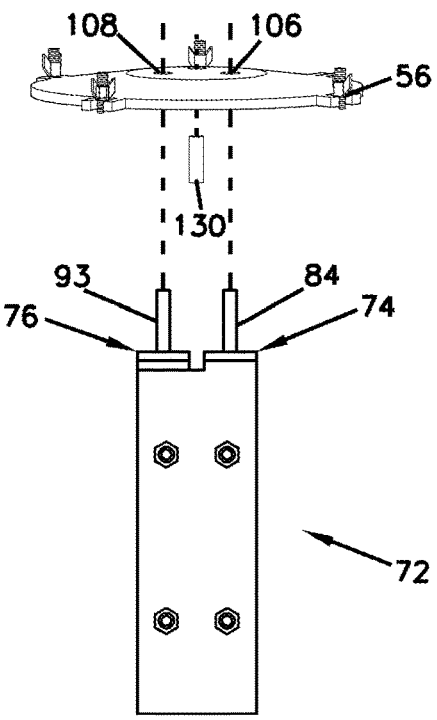
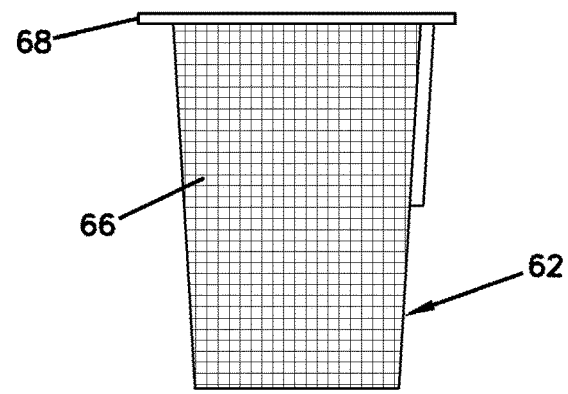
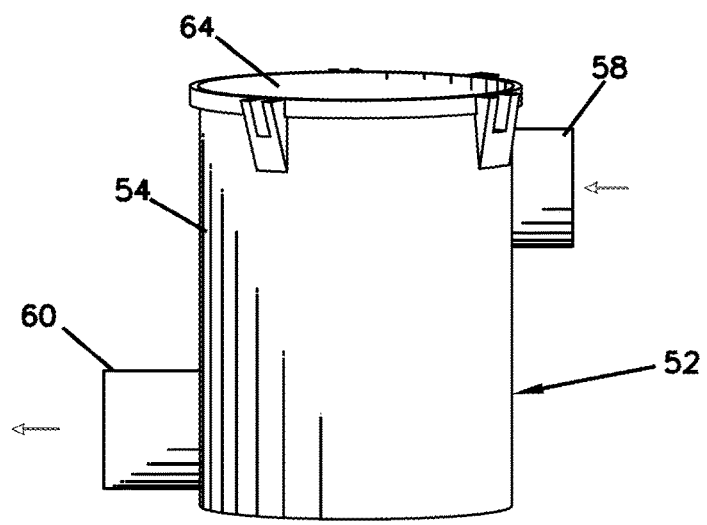

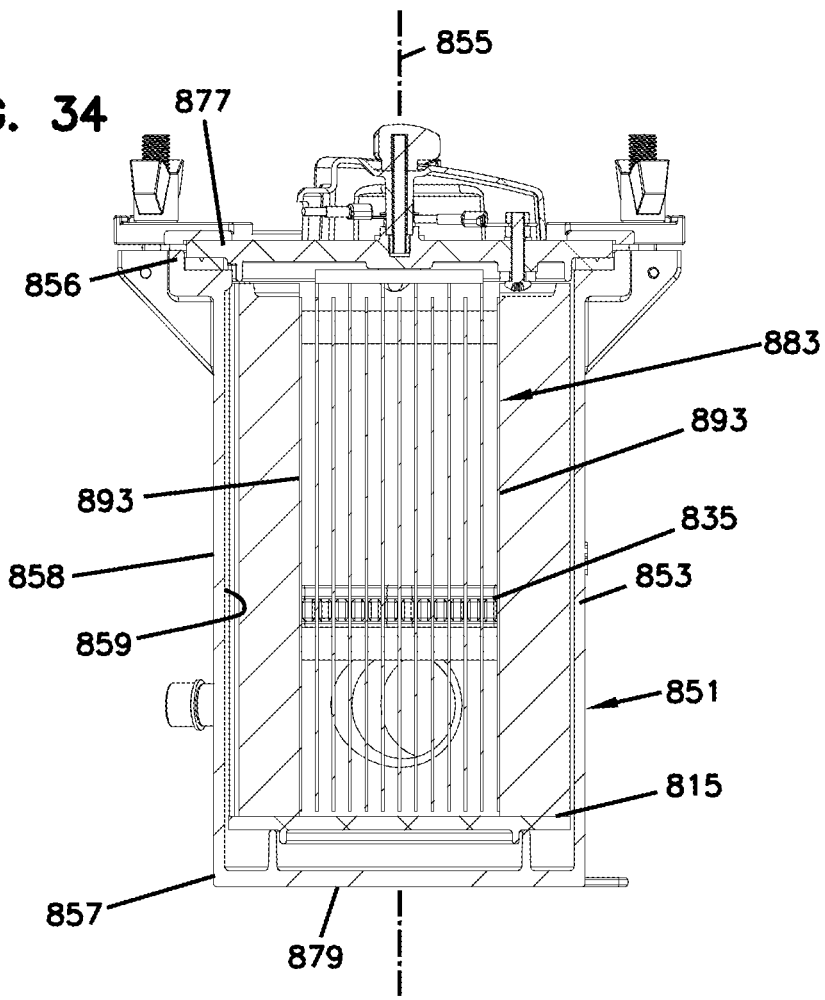
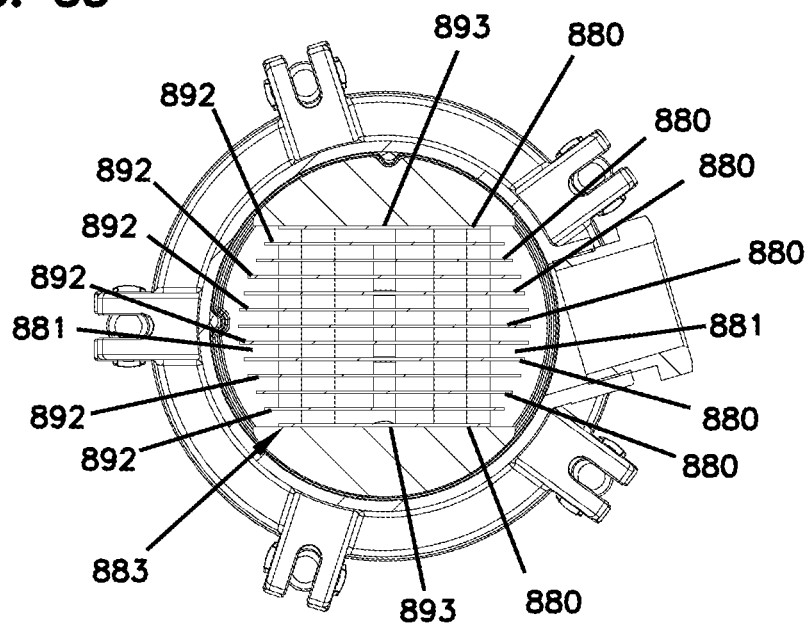

ELECTROLYTIC BIOCIDE GENERATING SYSTEM FOR USE ON-BOARD A WATERCRAFT

CROSS REFERENCE TO RELATED APPLICATIONS

The present application claims the benefit of U.S. Provisional Patent Application No. 62/568,629, filed Oct. 5, 2017, U.S. Provisional Patent Application No. 62/735,615, filed Sep. 24, 2018, and U.S. Provisional Patent Application No. 62/737,555, filed Sep. 27, 2018, the disclosures of which are hereby incorporated by reference herein in their entirety.

TECHNICAL FIELD

The present disclosure relates generally to biocide generating systems for reducing or eliminating biofouling within water systems. More particularly, the present disclosure relates to an anti-biofouling system for treating the water of an on-board water system of a watercraft.

BACKGROUND

Watercraft, particularly marine watercraft, often include on-board water systems which use water (e.g., sea water) drawn from the bodies of water on which the watercraft are buoyantly supported. A prevalent type of on-board water system is configured to pass drawn water through a heat exchanger used to cool refrigerant associated with air conditioning systems, chillers, and the like. Other on-board water systems include potable water systems, sanitation systems, propulsion systems, engine cooling systems, baitwell filling systems and systems corresponding to ancillary equipment. Bio-fouling caused by bio-growth (e.g., marine growth) can result in the clogging of on-board water systems, and the inefficient operation, overheating, and malfunction of equipment dependent upon the water systems thereby leading to costly downtime and expensive repair. Commonly, the issue of bio-growth within on-board water systems is addressed by periodic (e.g., semi-annual) acid cleaning of the water systems. Acid cleaning is expensive, time consuming, and involves the use of harsh and hazardous chemicals. Improvements in this area are needed.

SUMMARY

One aspect of the present disclosure relates to a biocide generating system for inhibiting biofouling within an on-board water system of a watercraft such that related equipment (e.g., a heat exchanger) of the watercraft can be operated at peak performance with minimal to no downtime. In certain examples, the biocide generating system can include an electrolytic module for providing the in situ generation of biocide within the water passing through the on-board water system. In certain examples, the biocide generating system can be continuously operated or intermittently operated. In certain examples, a biocide generating system in accordance with the principles of the present disclosure eliminates the need for acid cleaning of the on-board water system, or substantially reduces the frequency that acid cleaning of the on-board water system is required.

Another aspect of the present disclosure relates to a biocide generating device including an electrolytic module adapted to fit within a canister (e.g., a strainer canister) of an on-board water system of a watercraft. In one example, the electrolytic module is coupled to a lid of the canister. In one example, the electrolytic module includes electrode plates that fit within the canister. In one example, the electrolytic module includes electrode terminals that extend through the lid of the canister and that are respectively electrically coupled to the electrode plates. In a further example, a gas sensing electrode is also coupled to the lid of the canister.

Another aspect of the present disclosure relates to a biocide generating system having a constant current source for providing constant electrical current across an electrolytic cell for generating biocide.

A further aspect of the present disclosure relates to a biocide generating system including an electrolytic cell for generating a biocide and a controller. The biocide generating system includes an electrical isolation circuit for electrically isolating the biocide generating system from other conductive components of the watercraft. In one example, the biocide generating system includes a zero voltage reference that is isolated relative to a ground (e.g., an earth ground) of the watercraft. In one example, the electrical isolation circuit inductively transfers power from a power source on the watercraft to the biocide generating system.

Still another aspect of the present disclosure relates to a biocide generating system including a gas sensing circuit for detecting the accumulation of gas within an electrolytic cell of the biocide generating system. In one example, the gas sensing circuit includes a gas sensing electrode. In certain examples, the gas sensing electrode mounts at an upper region of the electrolytic cell. In certain examples, the gas sensing electrode can include at least a portion that is submerged beneath water within the electrolytic cell during normal operation of the biocide generating system and that becomes exposed when gas collects in the electrolytic cell. In certain examples, the gas sensing circuit applies an oscillating current to the gas sensing electrode, and the gas sensing circuit senses when an impedance between the gas sensing electrode and another component of the electrolytic cell changes due to exposure of the gas sensing electrode to gas. In one example, the other component of the electrolytic cell includes an electrode of an electrode arrangement used to generate biocide within the electrolytic cell.

Another aspect of the present disclosure relates to a biocide generating system for inhibiting biofouling within a water system of a watercraft. The water system is configured to draw water from a body of water on which the watercraft is buoyantly supported. The biocide generating system includes an electrode arrangement adapted to be incorporated as part of an electrolytic cell through which the water of the water system flows. The biocide generating system also includes a control system that interfaces with the electrode arrangement. The control system includes an electrical power circuit for establishing a flow of electrical current between first and second electrodes of the electrode arrangement to generate a biocide in the water which flows through the electrolytic cell. The control system also includes a gas sensing circuit for detecting when gas collects in the electrolytic cell. The control system can be configured to terminate the generation of biocide when the collection of gas is detected.

Another aspect of the present disclosure relates to a biocide generating system for inhibiting biofouling within a water system of a watercraft. The water system is configured to draw water from a body of water on which the watercraft is buoyantly supported. The biocide generating system includes an electrode arrangement adapted to be incorporated as part of an electrolytic cell through which the water of the water system flows. The biocide generating system also includes a control system that interfaces with the electrode arrangement. The control system includes an electrical power circuit for establishing a flow of electrical current between electrodes of the electrode arrangement to generate a biocide in the water which flows through the electrolytic cell. The control system also is adapted to determine when water is not flowing through the water system, and to terminate the generation of biocide when it has been determined that water is not flowing through the water system. The control system can determine whether water is flowing through the water system by various means such as sensors (e.g., gas collection sensors, flow sensors, etc.) or by monitoring the operational status (e.g., on or off) of the system pump or pumps or by one or more flow sensors. When the control system determines that water is no longer flowing through the water system, the control system preferably terminates the generation of biocide by terminating power to the electrode arrangement. The control system can terminate the generation of biocide immediately after it has been established that water is no longer flowing through the water system. Alternatively, the control system can allow the system to continue to generate biocide for a predetermined time after water flow has ceased and then terminate the generation of biocide after the predetermined time has expired. The predetermined time can correspond to a duration that allows sufficient biocide to be generated for an effective concentration of the biocide to diffuse into a portion of the water system located before of the electrolytic cell (i.e., between the electrolytic cell and the sea-water intake of the water system) so that bio-growth is inhibited in this portion of the water system. In the case where the electrode arrangement is within a strainer, the portion of the water system before the electrolytic cell desired to be treated can extend from the strainer to the sea-water intake of the water system. In the case where the electrode arrangement is after the strainer, the portion of the water system before the electrolytic cell desired to be treated can extend through the strainer to the sea-water intake of the water system. In the case where the electrode arrangement is after of the system pump, the portion of the water system before the electrolytic cell desired to be treated can extend through the pump and the strainer to the sea-water intake of the water system.

Another aspect of the present disclosure relates to a biocide generating system for inhibiting biofouling within a water system of a watercraft. The water system is configured to draw water from a body of water on which the watercraft is buoyantly supported. The biocide generating system includes an electrode arrangement adapted to be incorporated as part of an electrolytic cell through which the water of the water system flows. The biocide generating system also includes a control system that interfaces with the electrode arrangement. The control system includes an electrical power circuit for establishing a flow of electrical current between electrodes of the electrode arrangement to generate a biocide in the water which flows through the electrolytic cell. The system can be configured to generate biocide when water is flowing through the water system. In this way, the flow of water carries the biocide to portions of the water system located after the electrolytic cell to inhibit bio-growth in the portion of the water system after the electrolytic cell. The system can also be configured to generate biocide for limited or controlled durations when water is not flowing through the water system. In this way, biocide generated by the electrolytic cell can diffuse from the electrolytic cell in direction toward the sea-water inlet to treat the portion of the water system located before the electrolytic cell.

Another aspect of the present disclosure relates to a biocide generating device. The biocide generating device includes a canister lid (e.g., a strainer canister lid) and an electrode arrangement (e.g., an electrode assembly) carried with the canister lid for generating a biocide through electrolytic action. In certain examples, the canister lid is adapted to attach to a canister main body which contains a straining filter. In certain examples, electrode plates of the electrode arrangement fit within the straining filter. In certain examples, the electrode arrangement includes a catalyst coating for catalyzing the generation of chlorine. In one example, the electrode arrangement includes electrode plates carried with the canister lid that fit within the canister main body when the canister lid is mounted on the canister main body. In certain examples, the electrode plates of the electrode arrangement fit within the straining filter of the strainer. In certain examples, the canister lid also carries a gas sensor.

Still another aspect of the present disclosure relates to a biocide generating system for inhibiting biofouling within a water system of a watercraft. The water system is configured for drawing water from a body of water on which the watercraft is buoyantly supported. The biocide generating system includes an electrode arrangement adapted to be incorporated as part of an electrolytic cell through which the water of the water system flows. The electrode arrangement includes at least one anode and at least one cathode. The biocide generating system also includes a constant current source for establishing a flow of electrical current between the anode and the cathode to generate a biocide in the water which flows through the electrolytic cell. In one example, the biocide generating system also includes an isolation circuit for coupling the constant current source to a power source of the watercraft.

Another aspect of the present disclosure relates to a biocide generating system including an electrode arrangement adapted to be incorporated as part of an electrolytic cell through which the water of a water system flows. A control system interfaces with the electrode arrangement. The control system includes an electrical power circuit for establishing a flow of electrical current between electrodes of the electrode arrangement to generate a biocide in the water within the electrolytic cell. The control system is configured to determine whether water is flowing through the water system or not, and is configured to terminate the generation of biocide in relation to when water flow through the water system stops. In one example, the control system terminates the generation of biocide immediately when it is determined that water flow through the water system has stopped. In another example, the control system terminates the generation of biocide for a pre-determined time delay after it is determined that water flow through the water system has stopped.

Another aspect of the present disclosure relates to a biocide generating system including an electrode arrangement adapted to be incorporated as part of an electrolytic cell through which the water of a water system flows. A control system interfaces with the electrode arrangement. The control system includes an electrical power circuit for establishing a flow of electrical current between electrodes of the electrode arrangement to generate a biocide in the water within the electrolytic cell. The control system is configured to determine whether water is flowing through the water system or not, and is configured to generate biocide when water is flowing through the system, and is also configured to generate a controlled amount of biocide when the water flow through the water system has stopped such that sufficient biocide is generated to diffuse from the electrolytic cell toward a water inlet of the water system. In one example, the electrolytic cell is located between a pump and an outlet of the water system.

A further aspect of the present disclosure relates to a biocide generating system including a housing having a water inlet and a water outlet. The housing defines a flow passage that extends along a longitudinal axis of the housing between the water inlet and the water outlet. The flow passage has a curved boundary. An electrode arrangement is positioned within the flow passage of the housing. The electrode arrangement is adapted to be incorporated as part of an electrolytic cell through which the water of the water system flows. The electrode arrangement includes interleaved plates, each one of the plates having a length, a height and a thickness. The lengths of the plates extend along the longitudinal axis. The plates have different heights, and the plates have ends that are staggered along a profile that extends along the curved boundary of the flow passage. The plates can be staggered at only one end of the electrode arrangement, or at both ends of the electrode arrangement.

The present disclosure also relates to a biocide generating system including a housing having a water inlet and a water outlet. The housing defines a flow passage that extends between the water inlet and the water outlet. An electrode arrangement is positioned within the flow passage of the housing. The electrode arrangement is adapted to be incorporated as part of an electrolytic cell through which the water of a water system flows. The electrode arrangement includes interleaved electrode plates having inner major surfaces and outermost major surfaces. The inner major surfaces are coated with a catalyst for catalyzing the generation of chlorine and the outermost major surfaces not being coated with the catalyst for catalyzing the generation of chlorine.

A further aspect of the present disclosure relates to a biocide generating system including a housing having a water inlet and a water outlet. The housing defines a flow passage that extends between the water inlet and the water outlet. An electrode arrangement is positioned within the flow passage of the housing. The electrode arrangement is adapted to be incorporated as part of an electrolytic cell through which the water of the water system flows. The electrode arrangement includes interleaved electrode plates. A flow diverter is provided within the flow passage for diverting the flow of water such that the water flow is distributed more uniformly through the electrode arrangement. In one example, the flow diverter includes portions that extend into interstitial spaces between the electrode plates. In one example, the flow-diverter is a comb-like baffle having comb teeth that extend into interstitial spaces between the electrode plates.

A further aspect of the present disclosure relates to a biocide generating system including an electrode arrangement adapted to be incorporated as part of an electrolytic cell through which the water of the water system flows. The biocide generating system also includes a control system that interfaces with the electrode arrangement. The control system includes an electrical power circuit for establishing a flow of electrical current between first and second electrodes of the electrode arrangement to generate a biocide in the water within the electrolytic cell. The control system includes a switching arrangement operable in a first switch configuration in which the first electrode is an anode and the second electrode is a cathode. The switching arrangement is also operable in a second switch configuration in which the first electrode is a cathode and the second electrode is an anode. During biocide generation, the control system switches the switching arrangement back and forth between the first and second switch configurations to inhibit the accumulation of scale on the electrodes. In a further example, the switching arrangement is also operable in a third switch configuration in which the first and second electrodes are electrically connected together, and wherein the control system temporarily switches to the third switch configuration before switching/alternating between the first and second switch configurations. In the third switch configuration, the first and second electrodes can be electrically connected to a zero voltage reference that is electrically isolated from a main power system of the boat.

Another aspect of the present disclosure relates to a watercraft biocide generating system including an electrode arrangement adapted to be incorporated as part of an electrolytic cell through which the water of the water system flows. The biocide generating system also includes a flow sensor for sensing a rate of water flow through the electrolytic cell, and a control system that interfaces with the electrode arrangement. The control system includes an electrical power circuit for establishing a flow of electrical current between first and second electrodes of the electrode arrangement to generate a biocide in the water within the electrolytic cell. The control system varies a magnitude of the electrical current established between the first and second electrodes in direct relation to the rate of water flow sensed by the flow sensor.

A further aspect of the present disclosure relates to a biocide generating device including a housing defining an interior region that extends along a central axis of the housing, an inlet at a first side of the housing located on one side of the central axis and an outlet at a second side of the housing located on an opposite side of the central axis. The inlet and the outlet are located at first and second axial positions along the central axis that are offset from one another. The biocide generating device also includes an electrode unit including an electrode plate arrangement having first and second sets of electrode plates that are interleaved with interstitial spaces defined between the electrode plates. The electrode plate arrangement is positioned within the interior region of the housing with open ends of the interstitial spaces facing toward the inlet and the outlet. The biocide generating device further includes a flow baffle positioned within the interior region of the housing adjacent the second side of the housing. The flow baffle is positioned at a third axial position along the central axis that is between the first and second axial positions. The flow baffle has a comb-like structure with comb fingers that extend into the interstitial spaces defined between the electrode plates.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples described herein are based.

BRIEF DESCRIPTION OF THE DRAWINGS

The accompanying drawings, which are incorporated in and constitute a part of the specification, illustrate aspects of the present disclosure and together with the description, serve to explain the principles of the disclosure. A brief description of the drawings is as follows:

FIG. 4 is an exploded view of the electrolytic cell of FIG. 3;

FIG. 34 is a cross-sectional view taken along section line 34-34 of FIG. 33;

FIG. 35 is a cross-sectional view taken along section line 35-35 of FIG. 33;

DETAILED DESCRIPTION

Figure 1:
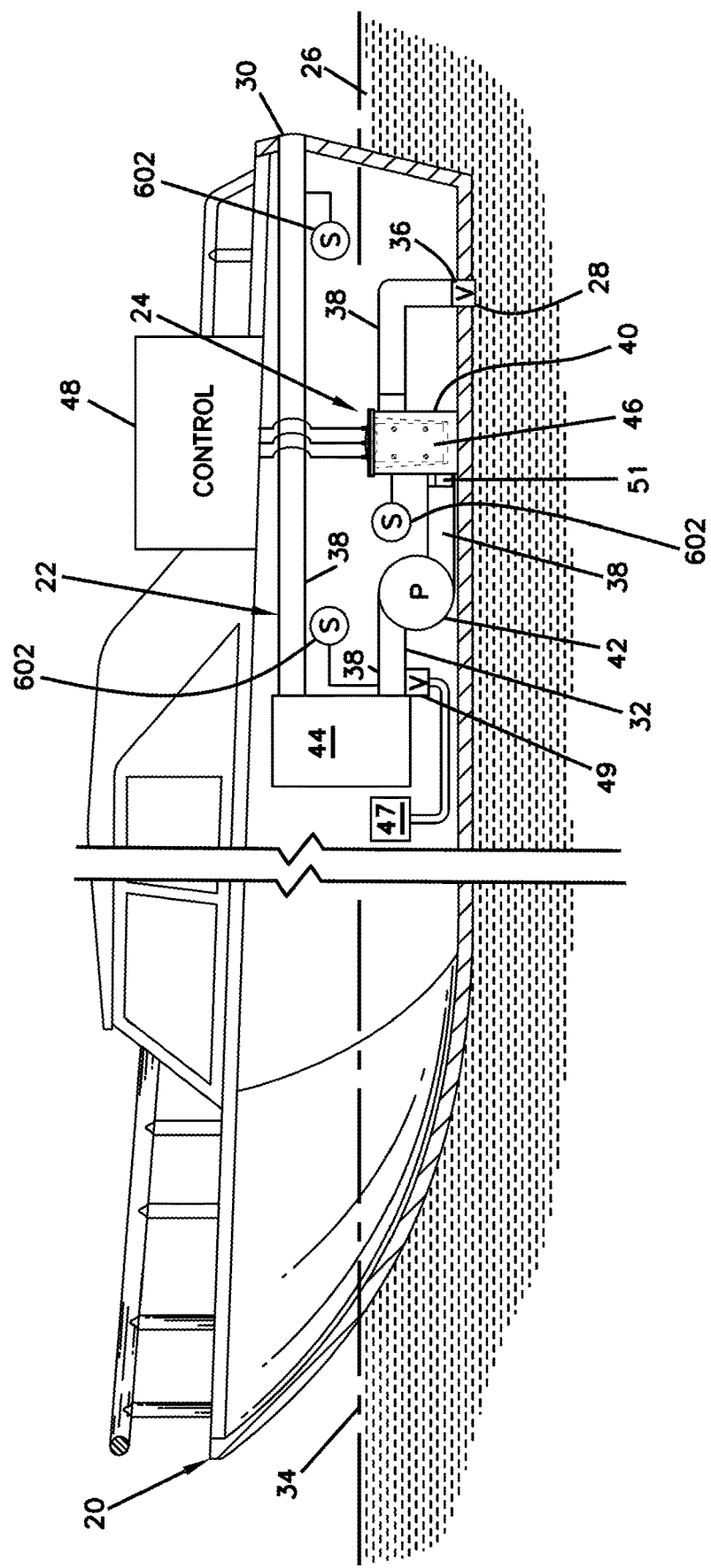
FIG. 1 illustrates a watercraft including an on-board water system incorporating a biocide generating system in accordance with the principles of the present disclosure.

FIG. 1 illustrates a watercraft 20 having an on-board water system 22 including a biocide generating system 24 in accordance with the principles of the present disclosure. The watercraft 20 is shown supported on a body of water 26. The on-board water system 22 includes an inlet 28, an outlet 30, and a water flow path 32 that extends from the inlet 28 through the watercraft 20 to the outlet 30. The inlet 28 is configured for drawing water from the body of water 26 into the water flow path 32. The inlet 28 is located below a water line 34 of the watercraft 20 and is preferably located at a bottom of the hull of the watercraft 20. The inlet 28 can be opened and closed by a valve 36 such as a seacock. The outlet 30 is configured for discharging water that has passed through the water flow path 32 back to the body of water 26. Preferably, the outlet 30 is positioned above the water line 34. The on-board water system 22 can include a plurality of components positioned along the water flow path 32. The water flow path 32 can include a plurality of conduits 38 (e.g., hoses, tubes, pipes, etc.) which extend between the components of the on-board water system 22 and function to carry water along the water flow path 32 between the various components. As shown at FIG. 1, the depicted components include a water strainer 40, a pump 42, and one or more systems and/or equipment 44 that make use of water conveyed through the water flow path 32.

In the depicted example, the biocide generating system 24 includes an electrolytic cell 46 integrated with the strainer 40. The electrolytic cell 46 interfaces with a control unit 48 (e.g., controller) and is adapted for generating a biocide within the water of the water flow path 32 while the water passes through the strainer 40. The biocide is configured for inhibiting biofouling within the conduits 38 and within one or more of the components positioned along the water flow path 32. It will be appreciated that the biocide can also be referred to as a disinfecting agent or a cleaning agent since the biocide can also include disinfecting and cleaning properties.

Figure 2:
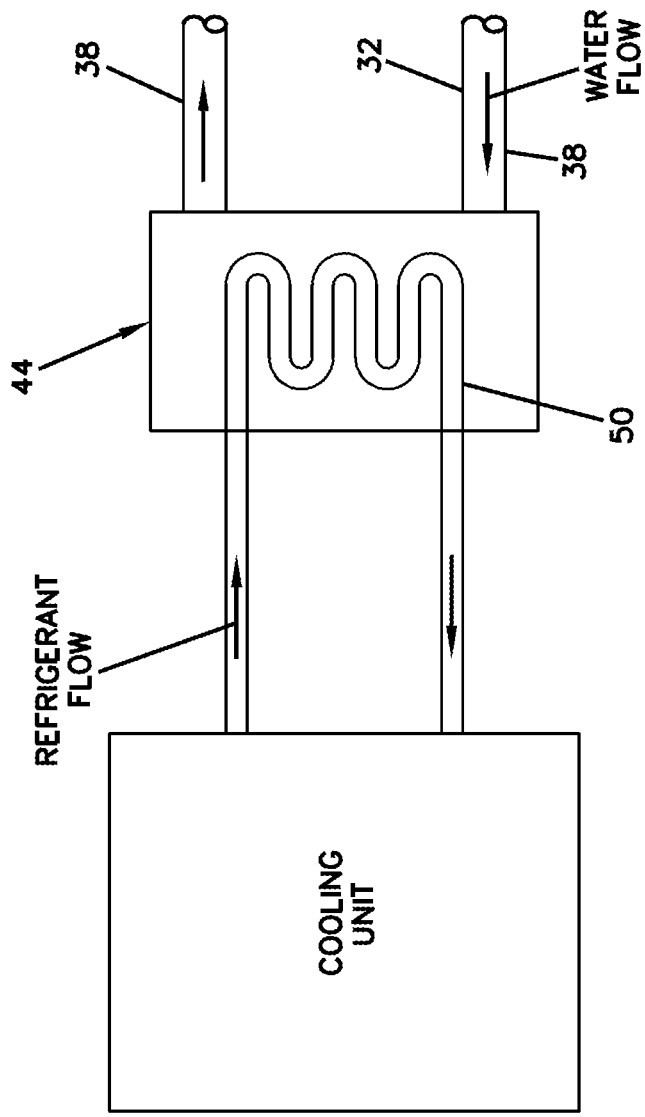
FIG. 2 is a schematic view of a heat exchanger that is an example of a type of equipment that can be part of the on-board water system of the watercraft of FIG. 1.

It will be appreciated that examples of the type of the systems and/or equipment 44 that can benefit from biocide treatment can include cooling systems such as air conditioners or chillers where water drawn from the body of water 26 can be used as a cooling media for cooling refrigerant of the cooling systems. FIG. 2 shows an example piece of equipment 44 in the form of a heat exchanger for a cooling system such as an air conditioner or other cooling system. Within the heat exchanger, water from the water flow path 32 flows across coils 50 or other conduits through which refrigerant corresponding to the cooling system flows. As the refrigerant flows through the coils 50, the water in the heat exchanger cools the refrigerant within the coils 50. In other examples, the water from the water flow path 32 can be used to provide engine cooling. In other examples, water from the water flow path 32 can be used for sanitation systems or watercraft propulsion systems.

In certain examples, the water flow path 32 may provide water to water systems for which biocide is not desired. Example water systems can include potable water systems for providing drinking water (drinking water systems often include reverse osmosis filtration systems that are not compatible with significant levels of chlorine), shower water, water for faucets, or other potable water uses on the water vessel. Additionally, water from the water flow path 32 can be used for live well systems to fill live wells for holding bait on the watercraft 20. An example water system 47 of the type mentioned above which is not compatible with biocide and which draws water from the flow path 32 is shown at FIG. 1. A valve 49 can be used to open and close fluid communication between the main water flow path 32 and the water system 47. When water systems that are incompatible with the presence of biocide in the water are in need of water from the water flow path, power to the electrolytic cell of the biocide generating system 24 can be temporarily turned off (e.g., the system can be operated in an inhibit mode) so as to inhibit the generation of biocide. It will be appreciated that the control unit 48 can interface with such water systems and can automatically disable (i.e., turn off; operate in an inhibit mode) the biocide generating system 24 when water is needed for a potable water system, a bait well, or other water system where biocide is not desired. For example, when the water system 47 incompatible with biocide is activated (e.g., when valve 49 is opened), the system can initiate an activate water command/signal which is received by the controller 48 and used as a trigger for initiation of the inhibit mode. After the demand for water by the incompatible water system has been satisfied (e.g., when valve 49 is closed), the system can issue a deactivate water command/signal which is received by the controller 48 and used as a trigger for resuming the generation of biocide. Referring to FIG. 1, the valve 49 can interface with a processor 248 that stops electrical power from being supplied to the electrolytic cell 46 when the valve 49 is open and permits power to be provided to the electrolytic cell 46 when the valve 49 is closed.

In the example of FIG. 1, the watercraft 20 is shown with only one on-board water system 22. In other examples, watercraft may include multiple on-board water systems each having one or more pumps that operate independently of one another. It will be appreciated that separate biocide generating systems 24 can be incorporated into each of the on-board water systems of the watercraft and can be controlled by a common control unit.

It will be appreciated that biocide generating systems in accordance with the principles of the present invention can be used for watercraft launched in both saltwater and freshwater. However, a preferred biocide in accordance with the aspects of the present disclosure includes chlorine generated through the electrolysis of sea water. Therefore, for freshwater watercraft, biocide generating systems in accordance with the principles of the present disclosure can include a salt supplementing station where salt such as sodium chloride is added to the water of the on-board water system 22 before the electrolytic cell of the biocide generating system. For marine watercraft, the natural salt present in sea water or brackish water is sufficient to allow for the in situ generation of biocide within the water flowing through the water flow path 32. For freshwater applications, it is contemplated that other biocides such as copper could also be used. In such systems, an electrolytic cell including electrodes of copper can be used to introduce copper as a biocide into the water of the water flow path 32.

As indicated above, a preferred biocide generated by biocide generating systems in accordance with the principles of the present disclosure includes chlorine and/or a derivative thereof. Other biocides can also be generated dependent upon the type of salts present in the water. The process for generating biocide can include an in situ process where sea water (e.g., ocean water, brackish water, etc.) is subjected to electrolysis as the sea water flows through an electrolytic cell. The electrolytic cell can include electrodes defining an anode (e.g., a positive pole) and a cathode (e.g., a negative pole). The direct passage of electrical current through the sea water between the anode and the cathode drives electrolysis that separates the water and the salt into their basic elements. In certain examples, chlorine is generated at the anode and hydrogen is generated at the cathode. The chlorine generated at the anode and/or derivatives thereof can function as a biocide for inhibiting bio growth in conduits and equipment of the water flow path located after from the electrolytic cell.

In certain examples, biocide generating systems in accordance with the principles of the present disclosure can include control circuitry for controlling operation of first and second electrodes in a manner that inhibits or resists the accumulation of scale (e.g., precipitation-based scale such as calcium carbonate, calcium hydroxide, magnesium hydroxide, and the like) on the first and second electrodes. Typically, scaling is prone to occur at the cathode of the electrolytic cell because of the alkaline characteristic of the water at the cathode-water interface, but is not prone to occur at the anode because of the lower pH (e.g., acidic characteristic) of the water at the anode-water interface. By alternating the polarity of the first and second electrodes, the first and second electrodes can be switched back and forth between anodes and cathodes. When a given one of the electrodes is operated as an anode, the lower pH of the water at the anode-water interface can assist in dissolving scale that may have been formed on the electrode when the electrode was previously operated as a cathode. Thus, continuously switching the polarity of the first and second electrodes inhibits the accumulation of scale on the electrodes to a level in which the performance or efficiency of the electrolytic cell is compromised. In one example, the electrolytic cell has an undivided arrangement in which the first and second electrodes are not separated by a membrane.

In certain examples, the biocide generating system alternates operation of the electrolytic cell between a forward biocide generating state and a reverse biocide generating state. In the forward biocide generating state, the first electrode is operated as an anode and the second electrode is operated as a cathode such that current flows in a forward direction between the first and second electrodes through the sea water within the electrolytic cell causing the generation of biocide in the sea water. In the reverse biocide generating state, the first electrode is operated as a cathode and the second electrode is operated as an anode such that current flows in a reverse direction between the first and second electrodes through the sea water within the electrolytic cell causing the generation of biocide in the sea water. It will be appreciated that as the biocide generating system is operated in a given one of the forward and reverse biocide generating states, an ion concentration gradient can develop and increase in intensity over time within the electrolytic cell. For example, the concentration of certain negative ions (e.g., $Cl^-$) can increase adjacent the anode and the concentration of certain positive ions (e.g., $Na^+$) can increase adjacent the cathode.

Aspects of the present disclosure relate to operating the electrolytic cell in each of the forward and reverse biocide generating states for a relatively short duration (e.g., less than or equal to 10 minutes, or less than or equal to 8 minutes, or less than or equal to 6 minutes, or less than or equal to 5 minutes) before alternating the biocide generating state. By alternating the electrolytic cell between the forward and reverse biocide generating states relatively frequently (i.e., by keeping the operating durations of the first and second biocide generating states relatively short), the ion gradient within the electrolytic cell is frequently reversed, which assists in the efficient and effective scale-free operation of the electrolytic cell.

The biocide generating system can also be operated temporarily in an ion re-distribution state adapted to facilitate movement or re-arrangement or equilibration of ions within the electrolytic cell from a first ion distribution in which ions in the sea water within the electrolytic cell are concentrated near the electrodes to a second ion distribution in which the ions are more uniformly distributed within the sea water of the electrolytic cell. The second ion distribution ideally represents the ion distribution in the water of the electrolytic cell corresponding to a condition in which no difference in electric potential exists between the first and second electrodes and the ions and/or the ion concentration in the electrolyte within the electrolytic cell are at equilibrium and uniformly distributed. In a preferred example, the biocide generating system can be operated in the ion-redistribution state for a time period between the forward and reverse biocide generating states, and can also be operated in the ion-redistribution state for a time period between the reverse and forward biocide generating states. When electrical current is applied across the first and second electrodes during the forward or reverse biocide generating states, the ions within the water of the electrolytic cell migrate toward the electrodes of the opposite pole (e.g., negative ions migrate toward the anode while positive ions migrate toward the cathode) causing the ions to be arranged in the first ion distribution. When the electrolytic cell is operated in the ion re-distribution state, electrical current is no longer driven across the first and second electrodes by the electrical power source (e.g., the electrical power is disconnected from the electrodes and/or no difference in electric potential is provided between the first and second electrodes), and the first and second electrodes are electrically connected together to provide an electrical short between the first and second electrodes. When the electrical current is no longer applied across the first and second electrodes, the ions have a tendency to move toward an equilibrium state in which the ions in the electrolyte (e.g., the sea water) are uniformly distributed in the electrolytic cell. Concurrently, water flow through the electrolytic cell can wash ions away from the electrodes. By terminating electrical power to the electrodes and concurrently electrically connecting the first and second electrodes together, the rate of movement of the ions toward the second ion distribution is expedited as compared to the rate of ion movement that would occur by only terminating electrical power to the electrodes. In certain examples, electrically connecting the first and second electrodes together results in the expedited movement of ions in the electrolyte toward an equilibrium state (e.g., ions that had been concentrated adjacent the electrodes during biocide generation move away from the electrodes to provide a more uniform distribution of ions in the electrolyte). In certain examples, the first and second electrodes are concurrently connected to a zero voltage reference of an electrical power system of the electrolytic cell (e.g., a power system that provides electrical power to the electrodes) when the electrolytic cell is in the ion re-distribution state. The zero voltage reference is electrically isolated from a main ground of the boat by a transformer or the like.

Figure 42:
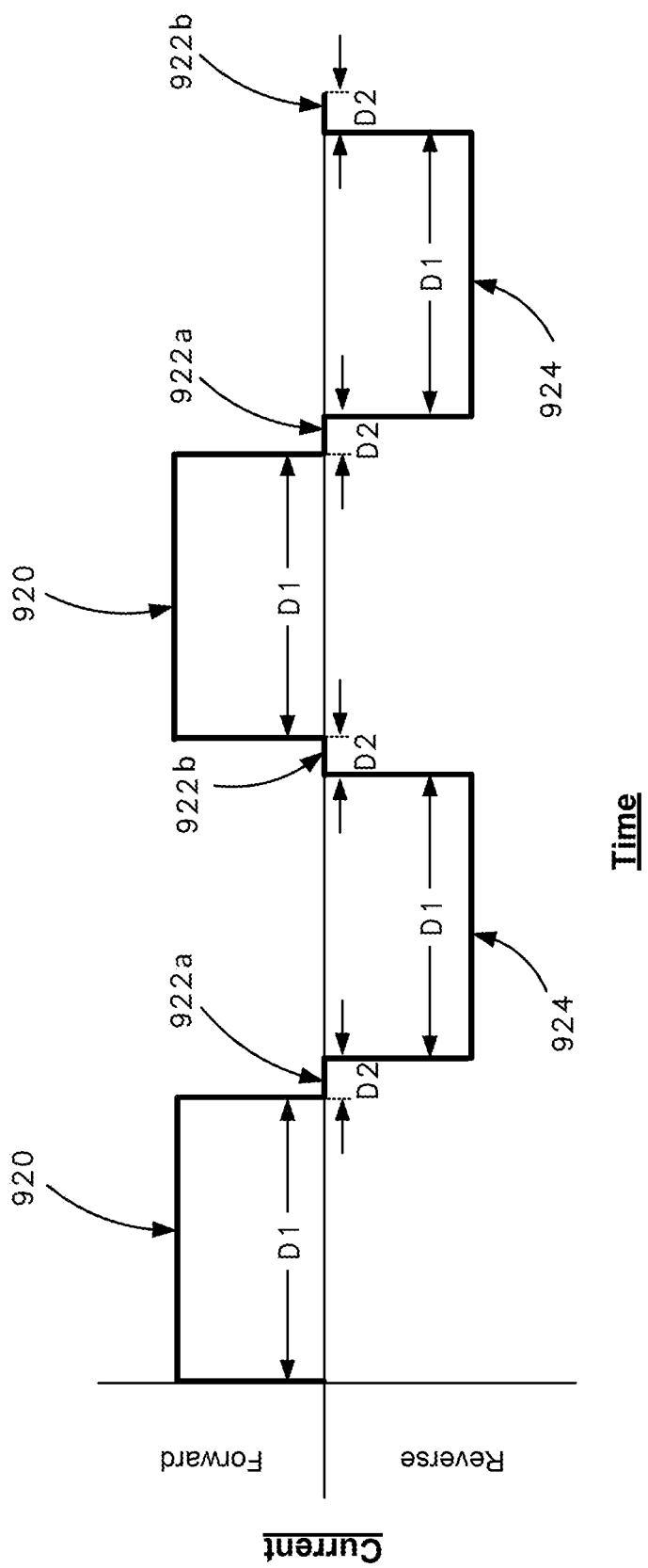
FIG. 42 is a graph depicting control protocol including a repeating pattern for controlling the application of current across the electrodes of the electrolytic cell.

FIG. 42 is a graph showing electrical current applied across the first and second electrodes over time. The graph is representative of a control protocol for controlling the application of electrical current across the first and second electrodes. The control protocol can use a repeating pattern of operating states. Referring to FIG. 42, the repeating pattern includes a forward biocide generating operating state (see 920), followed by an ion re-distribution operating state (see 922a), followed by a reverse biocide generating operating state (see 924), followed by the ion-redistribution state (see 922b). Thereafter, the pattern is repeated as biocide is generated.

It is preferred for a constant electrical current source to be used as an electrical power source for applying the electrical current across the first and second electrodes during biocide generation. It will be appreciated that the ability to provide constant current with a constant current electrical power source is dependent upon the resistance of the load and the capacity of the power source. Thus, at low load resistances, a constant current source may not be able to provide constant current if it lacks sufficient electrical voltage. Referring to FIG. 42, the depicted electrical current profile is shown assuming ideal conditions. In actual practice, variations may exist and the current profile may deviate from the depicted current profile. It will also be appreciated that the voltage applied across the electrodes can ramp-up over time and then stabilize each time one of the forward or reverse biocide generating operating states is initiated.

In one example, the control circuitry can include one or more switches for alternating the polarity of the first and second electrodes. In certain examples, the control circuitry can alternate the electrodes back and forth between a first polarity state and a second polarity state. In alternating the polarity of the electrodes, an intermediate state (e.g., an ion re-distribution state) can be implemented temporarily between the first and second polarity states. In the first polarity state, the first electrode functions as an anode and the second electrode functions as a cathode. In contrast, in the second polarity state, the first electrode functions as a cathode and the second electrode functions as an anode. Preferably, the control system alternates (e.g., reverses) the polarity state of the electrodes after the electrodes have been active in one of the polarity states for a duration of time. In one example, the duration the electrodes are operated in the first polarity state before switching to the second polarity state is equal to the duration the electrodes are operated in the second polarity state before switching back to the first polarity state. In one example, the duration the electrodes are operated in the first polarity state before switching to the second polarity state does not deviate by more than 5, 10 or 20 percent as compared to the duration the electrodes are operated in the second polarity state before switching back to the first polarity state. In one example, over an extended operating period (e.g., a week or a month), the electrolytic cell generates biocide in the first polarity state for the same or about the same amount of time in which the electrolytic cell generates biocide in the second polarity state. In one example, over an extended operating period (e.g., a week or a month), the amount of time electrolytic cell generates biocide in the first and second polarity states does not deviate by more than 5, 10 or 20 percent. In a preferred example, water continues to flow through the electrolytic cell and the electrolytic cell continues to generate biocide for use in preventing bio-growth in the boat water system as the electrolytic cell is operated in both the first and second polarity states.

In one example, over an extended operating period, the electrolytic cell is continuously switched back and forth between the first and second polarity states. Each time the electrolytic cell is switched to the first polarity state, the electrolytic cell is operated for a first set duration d1 (see FIG. 42) in the first polarity state before switching from the first polarity state to the second polarity state. Similarly, each time the electrolytic cell is switched to the second polarity state, the electrolytic cell is operated for the first set duration d1 in the second polarity state before switching from the second polarity state to the first polarity state. It will be appreciated that the system may not switch directly from the first polarity state to the second polarity state or vice-versa. For example, in switching between the first and second polarity states, an intermediate state (e.g., an ion re-distribution state) may be implemented temporarily between the first and second polarity states. The first set duration is preferably long enough to allow the electrodes to fully charge and for biocide to be generated. The first set duration is preferably short enough to inhibit scaling. In one example, the first set duration is less than or equal to 10 minutes, or in the range of 1-10 minutes, or in the range of 2-10 minutes, or in the range of 2-8 minutes, or in the range of 2-6 minutes, or in the range of 3-5 minutes.

In certain examples, once the electrodes have been active in one polarity state for the first set duration, electrical power to the electrodes is terminated and the first and second electrodes are electrically connected together prior to reversing the polarity state of the electrodes. In one example, the first and second electrodes can be electrically connected together and to a zero voltage reference (e.g., a zero voltage reference that is electrically isolated from the ground of the main power system of the boat). In one example, electrically connecting the first and second electrodes together while electrical power is terminated to the electrodes can expedite the transfer of ions in the sea water within the electrolytic cell away from the electrodes to provide a more uniform distribution of ions in the sea water (e.g., the ions move toward equilibrium). In one example, the first and second electrodes can be electrically connected together for a second set duration d2 (see FIG. 42) before switching to the subsequent first or second polarity state. In certain examples, the second set duration d2 is long enough for localized concentrations of ions adjacent the electrodes to move away from the electrodes to provide a more uniform distribution of ions within the electrolyte. In certain examples, when the electrical power is terminated and the first and second electrodes are electrically connected together, the ions in the sea water within the electrolytic cell move toward a uniform ion distribution that would be expected when the ions of the cell are at equilibrium and no difference in electric potential (e.g., voltage differential) exists between the electrodes. In certain examples, the second set duration d2 is shorter than the first set duration in which the electrodes are operated in the first and second polarity states. In certain examples, the second set duration is less than 2 minutes, or less than 1 minute, or less than 45 seconds, or about 30 seconds.

In certain examples of the present disclosure, electrolytic cells in accordance with the principles of the present disclosure can include electrode arrangements each including first and second electrodes. The first electrode can include a plurality of first electrode plates and the second electrode can include a plurality of second electrode plates. The first and second electrode plates can be interleaved with respect to one another such that interstitial spaces are positioned between each of the first and second electrode plates. The saltwater flowing through the water flow path flows within the interstitial spaces and is electrolyzed as the water flows through the interstitial spaces such that chlorine is generated. In certain examples, each of the electrode plates includes an electrically conductive material such as a metal material. In one example, the metal material may include titanium. In certain examples, the electrode plates can be coated with a catalyst coating adapted to catalyze the generation of chlorine. In one example, the catalyst coating can include a platinum group metal. Example platinum group metals suitable for use in a catalyst coating include iridium and ruthenium. In certain examples, the catalyst coating may include metal oxide mixtures that can include oxides of iridium, and/or oxides of ruthenium and/or oxides of titanium and/or oxides of tantalum and/or oxides of niobium. It will be appreciated that the above catalysts are merely examples and that other catalyst mixtures can also be used. In certain examples, the catalyst coating including metal oxide mixtures may not be applied to the outside major surfaces of the outermost electrode plates in the electrolyte cell. Eliminating the coating on the outside major surfaces can help to reduce and/or eliminate scale build-up.

It will be appreciated that in certain examples, the biocide generating system 24 is adapted to inhibit the growth of bio matter within the water flow path 32. Thus, the biocide generating system can be configured to regularly provide biocide to the water flowing through the water flow path 32. In certain examples, when the biocide generating system is active (i.e., turned on and not in an inhibit mode where biocide generation is inhibited) the biocide generating system 24 can be continuously operated to provide biocide to the water of the water flow path when water is flowing through the water flow path 32. In other examples, when the biocide generating system is active, the biocide can be intermittently generated so that biocide is provided with sufficient frequency to inhibit the growth of bio matter. For the regular treatment of water within the water flow path 32 so as to inhibit the growth of bio matter, the biocide generating system can generate biocide at concentrations in the range of 0.1-5.0 parts per million, or at concentrations in the range of 0.1-2.0 parts per million, or at concentrations in the range of 0.1-1.0 parts per million, or in concentrations in the range of 0.1-0.5 parts per million. As indicated above, a preferred biocide includes chlorine. To minimize the discharge of residual chlorine from the water system, the biocide generating system 24 may be designed to generate only enough chlorine needed to inhibit the growth of bio matter. In certain examples, the chlorine concentration does not exceed 1.0 parts per million within the water system, although alternatives are possible.

It will be appreciated that the rate at which biocide is generated is directly dependent upon the magnitude of the electrical current directed across the electrodes. Also, the amount of biocide generated is dependent upon the amount of time the cell is generating biocide. Further, the concentration of biocide generated in the electrolyte (e.g., sea water or other salt water) flowing through the system is dependent upon water flow rate. Thus, the concentration of biocide present in the flowing electrolyte of the system can be controlled by varying the current level across the electrodes and/or cycling the cell On and Off to vary the time of operation of the cell and/or varying the water flow rate through the system. In certain examples, the water flow rate through the system is monitored, and the electrical current level and/or the time of operation of the cell are varied (e.g., controlled, regulated, etc.) to achieve a target biocide concentration in the water of the system. It will be appreciated that the water flow rate can be determined based on flow information derived from the pump control or by one or more flow sensors. An example flow sensor can include a flow meter such as a hall-effect flow sensor (e.g., an electronic paddle flow meter). In certain examples, the flow meter can be provided at or in the electrolytic cell. In certain examples, the flow meter can be provided at an outlet of the electrolytic cell. In a preferred example, the biocide concentration in the electrolyte is maintained at a level sufficiently high to kill bio-matter and sufficiently low to avoid damaging corrosion within system. A preferred chlorine concentration is less than or equal to 2 ppm, or less than or equal to 1 ppm, or less than or equal to 0.5 ppm, or less than or equal to 0.3 ppm, or less than or equal to 0.2 ppm or in the range of 0.1-0.2 ppm.

As indicated above, the biocide generating system 24 can automatically be cycled On and Off to control the amount of chlorine generated, or can vary the electrical current to vary the amount of chlorine generated. The controller 48 may be configured to regulate the operation of the biocide generating system 24 to achieve a desired or target amount of chlorine. In certain examples, the controller 48 can regulate the amount of chlorine generated based at least partially on a measured flow rate of the seawater flowing through the electrolytic cell for electrolysis.

In certain examples, pulsing the current to the electrodes On and Off results in slugs of chlorine treated water passing through the system, rather than a continuous flow of water having a constant chlorine concentration. In other examples, the total output of chlorine is controlled independent of the seawater flow rate through the electrolyte unit.

In certain examples, chlorine sensors 602 (see FIGS. 1 and 15) for sensing chlorine concentration in the water can be provided at one or more locations along the flow path of the water system. For examples, the sensors 602 can be positioned at the electrolytic cell unit, at the seawater outlet, or at other positions along the flow path of the water system. The controller 48 can interface with the sensors 602 and can use chlorine concentration data from the sensors 602 to control or vary operation of the electrolytic cell. For example, based on the sensed chlorine concentration or concentrations, the controller can increase or decrease water flow rate through the electrolytic cell unit and/or the electrical current provided to the electrolytic cell unit and/or an On and Off pulse duration of the cell unit. In this way, the controller can modify the rate of biocide generation and/or the water flow rate of the system in real time to maintain a desired chlorine concentration throughout the system or at discrete locations in the system. Moreover, the controller can control operation of the system so that the residual chlorine in the water discharged from the outlet 30 does not exceed a predetermined concentration level.

For different applications, biocide concentrations higher or lower than the above specified concentrations may be generated. For example, under certain circumstances, it may be desired to "shock" the water flow path 32. For such applications, the biocide generating system 24 can generate significantly higher concentrations of biocide as needed.

In a preferred example, the biocide generating system 24 includes an adaptive dynamic control system that dynamically varies the magnitude of the current applied across the electrodes in direct proportion to the flow rate of water through the electrolytic cell. Thus, the rate of biocide production varies directly with the water flow rate through the system. The magnitude of electrical current used to provide a desired biocide concentration in the flow of sea water through the electrolytic cell for a given water flow rate can be determined by a method such as an algorithm or look-up table. The flow rate can be determined by a flow sensor 51 (see FIGS. 1, 3 and 15). In one example, the flow sensor 51 is integrated with/attached to the electrolytic cell. In one example, the flow sensor 51 can be mounted adjacent to the outlet of the electrolytic cell to prevent bio-growth from damaging or fouling the flow sensor. By dynamically controlling the rate of biocide generation, it is possible to maintain the concentration of biocide at a target level or within a target range regardless of the water flow rate. Thus, at low flow rates, the biocide production rates can be reduced accordingly to maintain the biocide concentration within the target range thereby preventing biocide concentrations from increasing to a level which could be damaging to components of the system (e.g., via corrosion). For example, parts such as heat exchangers can include copper-nickel alloy parts that may be susceptible to corrosion. At low flow rates, the biocide production rates can be reduced accordingly to maintain the biocide concentration within the target range thereby preventing biocide concentrations from decreasing to a level ineffective for killing bio-organisms.

The biocide production rates can be controlled using an application of Faraday's law of electrolysis which teaches that the amount of a chemical consumed or produced at one of the electrodes in an electrolytic cell is directly proportional to the amount of electrical current that passes through the cell. One coulomb of charge equates to one ampere per second, and Faraday's constant of 96,485 coulombs represents the number of coulombs of electrical charge carried by one mole of electrons. Thus, 96,485 coulombs will produce one mole of Cl⁻ at an electrode of the electrolytic cell. Taking this information into consideration in combination with the water flow rate through the electrolytic cell, it is possible to calculate the electrical current required to pass through the electrolytic cell to generate a desired concentration of biocide in the sea water passing through the electrolytic cell.

An example formula (see below) derived from the above information specifies that the electrical current (A) required to pass through the electrolytic cell to generate a desired concentration (C) of Chlorine in the sea water flowing through the electrolytic cell equals the desired concentration (C) of Chlorine multiplied by the water flow rate (Q) divided by 5.75. The value K represents a system specific constant that takes into consideration operating properties of electrolytic cell (e.g., inefficiencies related biocide conversion at the electrodes) as well as the characteristics of the electrolyte (e.g., sea water quality, levels of organic material in the sea water which may react with the biocide, etc.). In certain examples, K can be empirically determined.

$$A = \frac{K \times C \times Q}{5.75}$$

Where
- A=electrical current passing through the sea water between the electrodes of the electrolytic cell in amperes
- C=desired concentration of chlorine to be generated in the sea water passing through the electrolytic cell in parts-per-million
- Q=flow rate of sea water through the electrolytic cell in gallons per minute
- K=system specific constant The biocide generating system 24 preferably operates to generate biocide while water is flowing through the water system. In this way, biocide generated at the electrolytic cell 46 can be carried with the flowing water to treat the conduit and components of the water system located after the electrolytic cell. As indicated above, biocide can be generated continuously or intermittently as the water flows through the system. In certain examples, the biocide generating system may also operate to generate biocide for a controlled or limited duration when water is not flowing through the water system (e.g., when the pump is off). The duration preferably corresponds to sufficient time for the system to generate enough biocide for the biocide to diffuse from the electrolytic cell 46 toward the sea-water inlet of the water system to prevent bio-growth within the portion of the water system located before the electrolytic cell 46. Preferably, the duration is short enough to prevent the excessive accumulation of gas within the system. In certain examples, the duration can be in the range of at least thirty seconds to at least five minutes. In other examples, the duration can be in the range of thirty seconds to ten minutes, in the range of thirty seconds to seven minutes, in the range of thirty seconds to five minutes, or in the range of thirty seconds to two minutes. In certain examples, the biocide generating system may operate intermittently to generate biocide while water is not flowing through the system so as to generate enough biocide to treat the portion of the water system before the electrolytic cell via diffusion without collecting excessive gas within the system (e.g., within the strainer). Preferably, for a majority of the time that water is not flowing through the water system, the biocide generating system will not be generating biocide.

Figure 3:
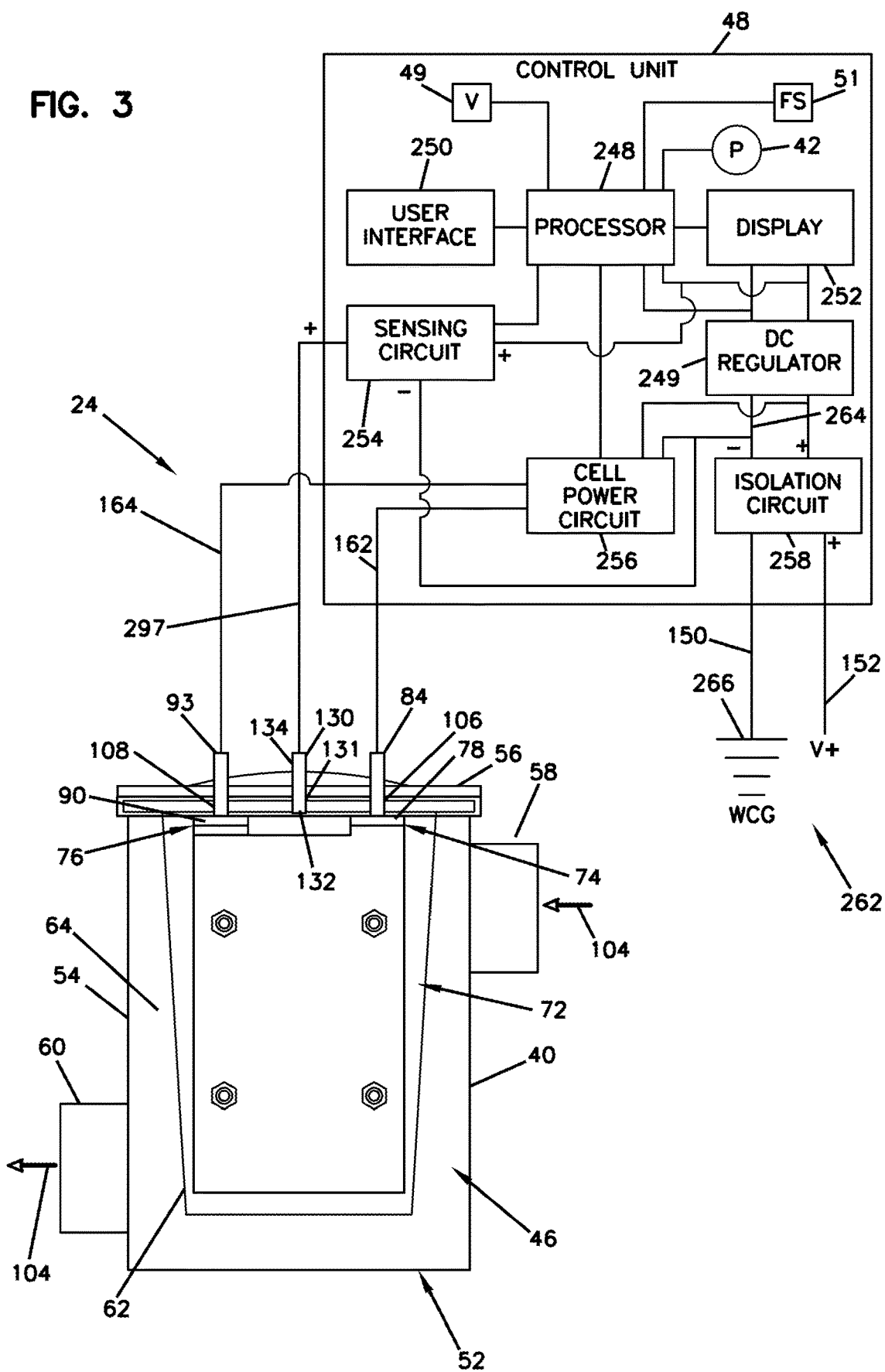
FIG. 3 schematically depicts an electrolytic cell and control unit of the biocide generating system of FIG. 1, wherein the electrolytic cell is integrated as part of a water strainer of the on-board water system.

Referring to FIG. 3, the control unit 48 (i.e., a controller, control system, etc.) is depicted including the processor 248 which is shown interfacing with a user interface 250, a display 252, a sensing circuit 254, a cell power circuit 256, and an isolation circuit 258. In certain examples, the user interface 250 and the display 252 can be separate units or can be integrated in a common unit. The user interface may include buttons, keypads, switches, dials, touch screens, or like structures for allowing a user to input information, turn the system 24 on and off, and modify operational settings of the system 24. The display may include indicator lights, display screens, audible indicators, or other features for indicating operating states, modes, conditions, or parameters of the system 24. The sensing circuit 254 can be configured to detect/sense the accumulation of gas within the electrolytic cell 46. The cell power circuit 256 can be configured to supply electrical power to the electrolytic cell 46 (e.g., to electrodes of the electrolytic cell 46). The processor 248 can interface with a switch for turning the power to the electrolytic cell 46 on and off. In one example, the cell power circuit 256 includes a constant current source for driving a constant current through the electrolytic cell 46 which is not dependent upon the load across the electrolytic cell or the applied voltage. The magnitude of the constant current provided by the constant current source can be varied by the controller to regulate the amount of biocide generated by the system. The isolation circuit 258 transfers power from a power source 262 on the watercraft 20 to the biocide generating system 24 and concurrently provides the biocide generating system 24 with a zero voltage reference 264 that is electrically isolated from an earth ground 266 of the watercraft 20.

Figure 11:
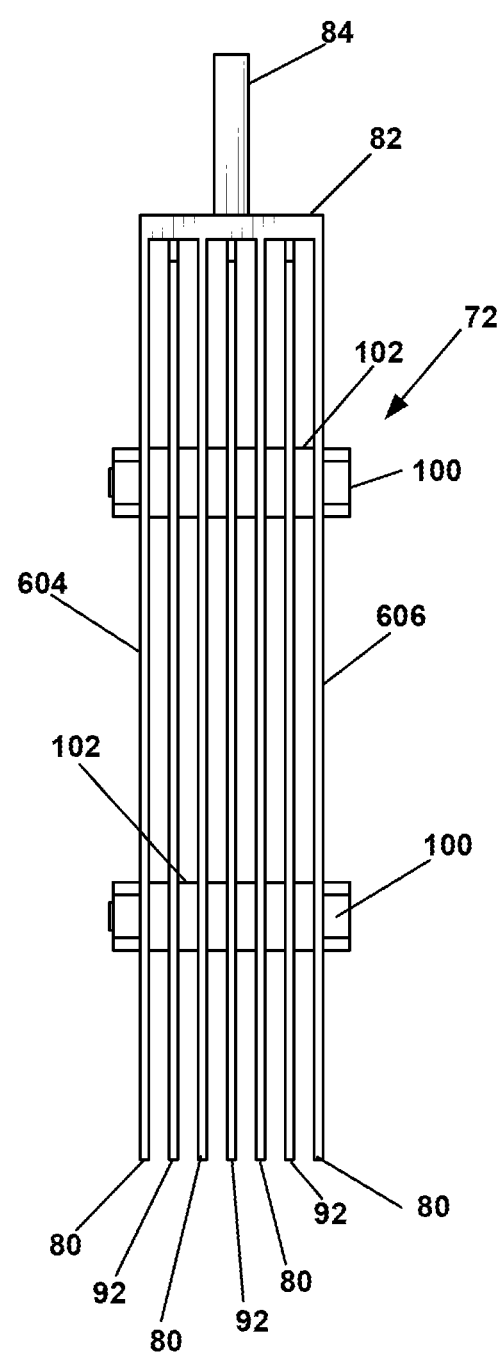
FIG. 11 is an end view of the electrode arrangement of FIG. 9.
Figure 12:
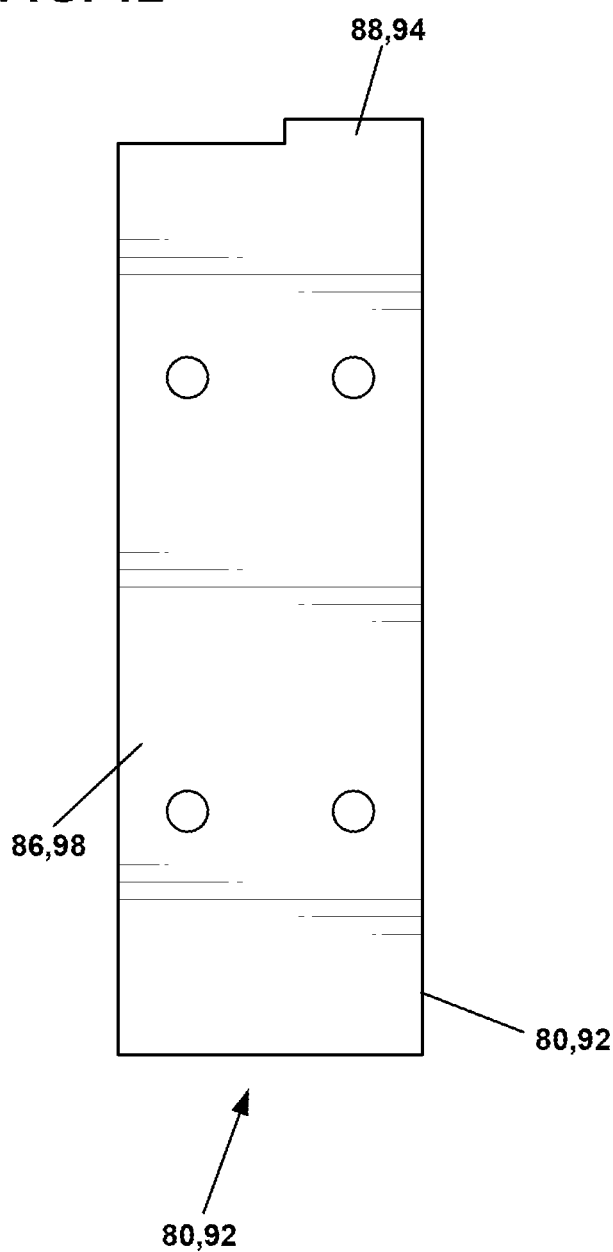
FIG. 12 is a side view of one of the electrically conductive plates of the electrode arrangement of FIG. 9.
Figure 13:
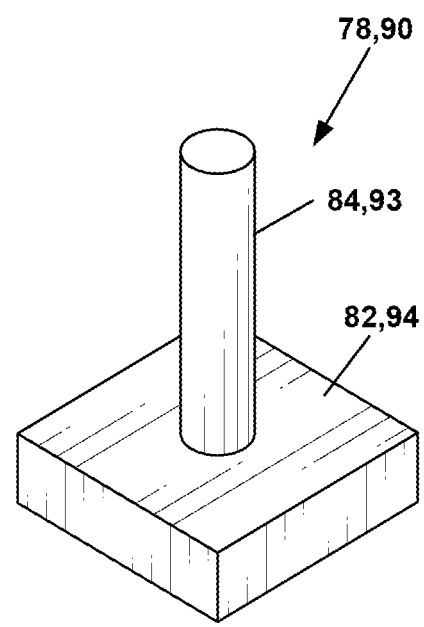
FIG. 13 is a perspective view of an electrical terminal of the electrode arrangement of FIG. 9.

As shown at FIGS. 3 and 4, the electrolytic cell 46 is integrated with the water strainer 40. It will be appreciated that a water strainer is a device that mechanically filters the water drawn into the water flow path 32 to prevent undesirable material (e.g., particulates over a certain size) from passing through the water flow path 32. It will be appreciated that water strainers typically include removable filters that are periodically removed from the strainer, cleaned and then returned to the strainer. It will be appreciated that different filters can have different levels of filtration ranging from coarse to fine. Additionally, filters can have different configurations depending upon the type of strainer used. Some types of filters can include a basket type configuration. Other filters can be configured as cylindrical sleeves. It will be appreciated that water strainers may also include a flow diverter to help create laminar flow or to assist in providing more uniform flow through the electrolytic cell. For example, to reduce scaling, it is desirable to limit eddies, recirculation and dead/stagnant flow areas (e.g., areas of low flow) through the electrolytic cell. For example, it is desirable to encourage more uniform flow between all the plates of the electrolytic cell and across the entire flow area (the cross-sectional area defined between the plates as shown at FIG. 11) defined by the electrolytic cell. A flow diverter may help to provide uniform flow within the system such that seawater does not only flow directly thru a limited portion (e.g., a top part) of a water strainer. One advantage of using a flow diverter in accordance with the principles of the present disclosure is that such use can decrease or eliminate scale build-up. In certain examples, a flow diverter may be included as an attachment to an electrolyte cell. In certain examples, a strainer containing an electrolytic cell may have an in-line inlet and outlet to encourage more uniform water flow through the strainer.

The depicted strainer 40 of FIGS. 3 and 4 includes a housing 52 (e.g., a strainer canister) including a main housing body 54 and a lid 56 (e.g., a strainer lid). The lid 56 is preferably removable from the main housing body 54 and can also be referred to as a cover. In certain examples, the lid 56 is removably mounted at a top of the main housing body 54. In certain examples, fasteners such as bolts, nuts, clips, clamps, or other structures can be used to removably attach the lid 56 to the main housing body 54. In certain examples, the housing 52 has a metal construction. The metal construction can include stainless steel. In other examples, one or more components of the housing 52 can have a dielectric construction. The dielectric construction can include a composite construction where an electrically conductive material is coated with a dielectric material, or a composite construction where portions of the housing are electrically conductive and portions are dielectric. Dielectric constructions can also include solid dielectric constructions.

The main housing body 54 includes a water inlet 58 and a water outlet 60. As depicted, the water inlet 58 is elevated relative to the water outlet 60. In other examples, other outlet and inlet configurations can be used. For example, in another example, the water inlet can extend through the bottom of the housing and the water outlet can extend through the side of the housing.

Figure 5:
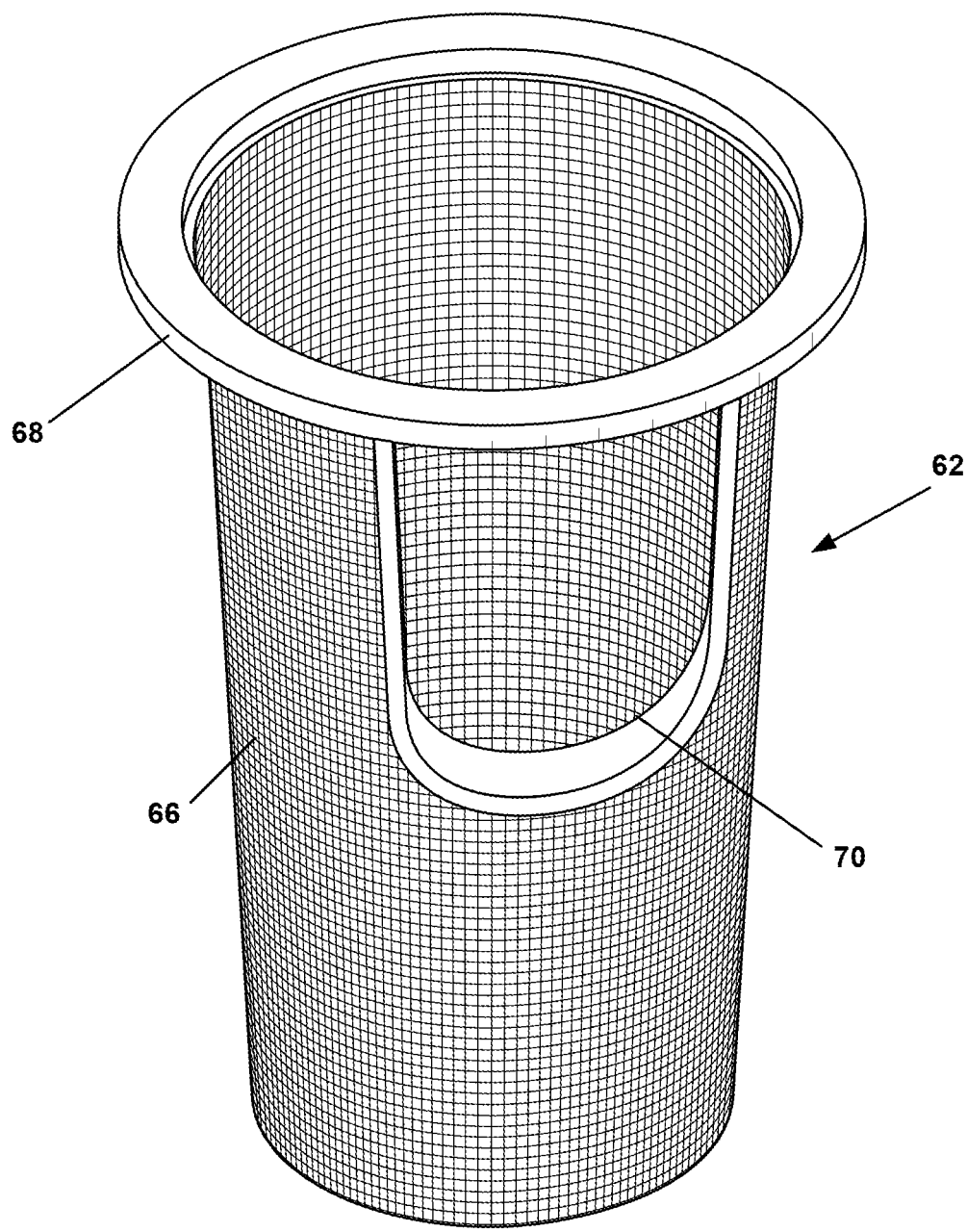
FIG. 5 illustrates a straining filter suitable for use in the water strainer of FIG. 3.

Referring to FIGS. 4 and 5, the strainer 40 includes a straining filter 62 that removably mounts within an interior 64 of the housing 52. As depicted, the straining filter 62 has a basket-like configuration. The straining filter 62 is depicted including a filtering media 66 and a top flange 68. When mounted within the housing 52, the top flange 68 can seat upon a shoulder or other structure of the housing 52 to provide for exact positioning of the straining filter 62. An opening 70 is defined through the side of the filter media 66. When the straining filter 62 mounts within the housing 52, the opening 70 preferably aligns with the water inlet 58 of the main housing body 54. Thus, in use, water being conveyed through the water flow path 32 enters the housing 52 through the water inlet 58 and enters an interior of the straining filter 62 through the opening 70. The water then passes through the filter media 66 and exits the housing 52 through the water outlet 60. Particulate materials strained by the filter media 66 remains on an inside of the filter media 66. When the straining filter 62 is removed from the housing 52, the strained material remains on the inside of the filter media 66 and is preferably removed during cleaning.

While the straining filter 62 is depicted as a basket-style filter, it will be appreciated that other types of straining filters can be used, particularly when used in combination with other styles of strainer housings. For example, cylindrical straining filters having open bottoms can be used with strainer housings having bottom inlets and side outlets. In such configurations, the straining filters have interior regions in which the filtered material collects.

Referring to FIGS. 3, 4, and 9-13, the electrolytic cell 46 includes an electrode arrangement 72 integrated with the strainer 40 such that electrolysis of the water of the water flow path 32 occurs within the interior volume of the strainer housing 52. The electrode arrangement 72 can also be referred to as an electrolytic module. In the depicted example, the electrode arrangement 72 includes a first electrode 74 and a second electrode 76. The first electrode 74 includes a first terminal 78 electrically coupled to a plurality of parallel first electrode plates 80. The first terminal 78 includes a first terminal block 82 and a first terminal post 84. The first electrode plates 80 are electrically and mechanically coupled to the first terminal block 82. In one example, the first electrode plates 80 include main bodies 86 and upper tabs 88. The upper tabs 88 are preferably electrically and mechanically coupled to the first terminal block 82 by means such as welding or soldering. In certain examples, the first terminal 78 and the first electrode plates 80 can have metal constructions that include a metal material such as titanium. In certain examples, the first electrode plates 80 can be coated with a catalyst material of the type previously described.

The second electrode 76 of the electrode arrangement 72 has a similar configuration as the first electrode 74. For example, the second electrode 76 includes a second terminal 90 and parallel second electrode plates 92 that are electrically and mechanically coupled to the second terminal 90. In a preferred example, the second terminal 90 and the second electrode plates 92 have metal constructions that may include a metal material such as titanium. The second electrode plates 92 are positioned between the first electrode plates 80 and spaced-apart in relation relative to the first electrode plates 80 such that interstitial space exists between each of the first electrode plates 80 and a corresponding one of the second electrode plates 92. The second terminal 90 includes a second terminal block 94 electrically and mechanically coupled to upper tabs 96 of the second electrode plates 92. The second electrode plates 92 also include main bodies 98 and the second terminal 90 includes a second terminal post 93. In certain examples, the second electrode plates 92 can be coated with a catalyst material of the type previously described.

The first and second sets of electrode plates 80, 92 of the electrode arrangement 72 are coupled together by a plurality of fasteners 100. In a preferred example, fasteners 100 are dielectric fasteners that do not provide electrical connectivity between the plates 80, 92. In certain examples, the fasteners 100 are bolts that extend through openings defined in the electrode plates 80, 92. In certain examples, dielectric spacers 102 are provided on the fasteners 100 at locations between opposing electrode plates 80, 92. The spacers 102 function to maintain a desired spacing between each of the opposing sides of the plates 80, 92.

In certain examples, to discourage scale build-up, the catalytic coating adapted for catalyzing the generation of chlorine is not applied to the two outermost major surfaces 604, 606 (see FIG. 11) of the conductive plates of the electrolytic cell. As depicted, the outermost plates are defined by plates of the first set of electrode plates 80. In other examples, the outermost plates can be plates of the second set of electrode plates 92. The interior major surfaces of the plates 80, 92 are preferably fully coated with catalytic coating.

In a preferred example, the electrode arrangement 72 is mounted to the lid 56 of the strainer housing 52. The terminal posts 84, 93 can extend through the lid 56 and project upwardly/outwardly from an upper/outer side of the lid 56. The plates 80, 92 are secured at a bottom/under side of the lid 56 and project downwardly from the inner side of the lid 56. When the lid 56 is mounted on the main housing body 54, the electrode plates 80, 92 fit within the interior of the housing 52 and within the interior of the straining filter 62. During operation of the on-board water system 22, the interior of the strainer housing 52 fills with water such that the anode and cathode plates 80, 92 are preferably fully submerged within the water flowing through the strainer 40. The electrode arrangement 72 is preferably coupled to the lid 56 such that the electrode arrangement 72 is carried with the lid 56 when the lid 56 is removed from the main housing body 54. When it is desired to clean the straining filter 62, the lid 56 is removed from the main housing body 54 to provide access to the straining filter 62. When the lid 56 is removed, the electrode arrangement 72 is carried with the lid 56 and concurrently removed from the interior of the straining filter 62 so as to not interfere with the subsequent removal of the straining filter 62 for cleaning.

Figure 9:
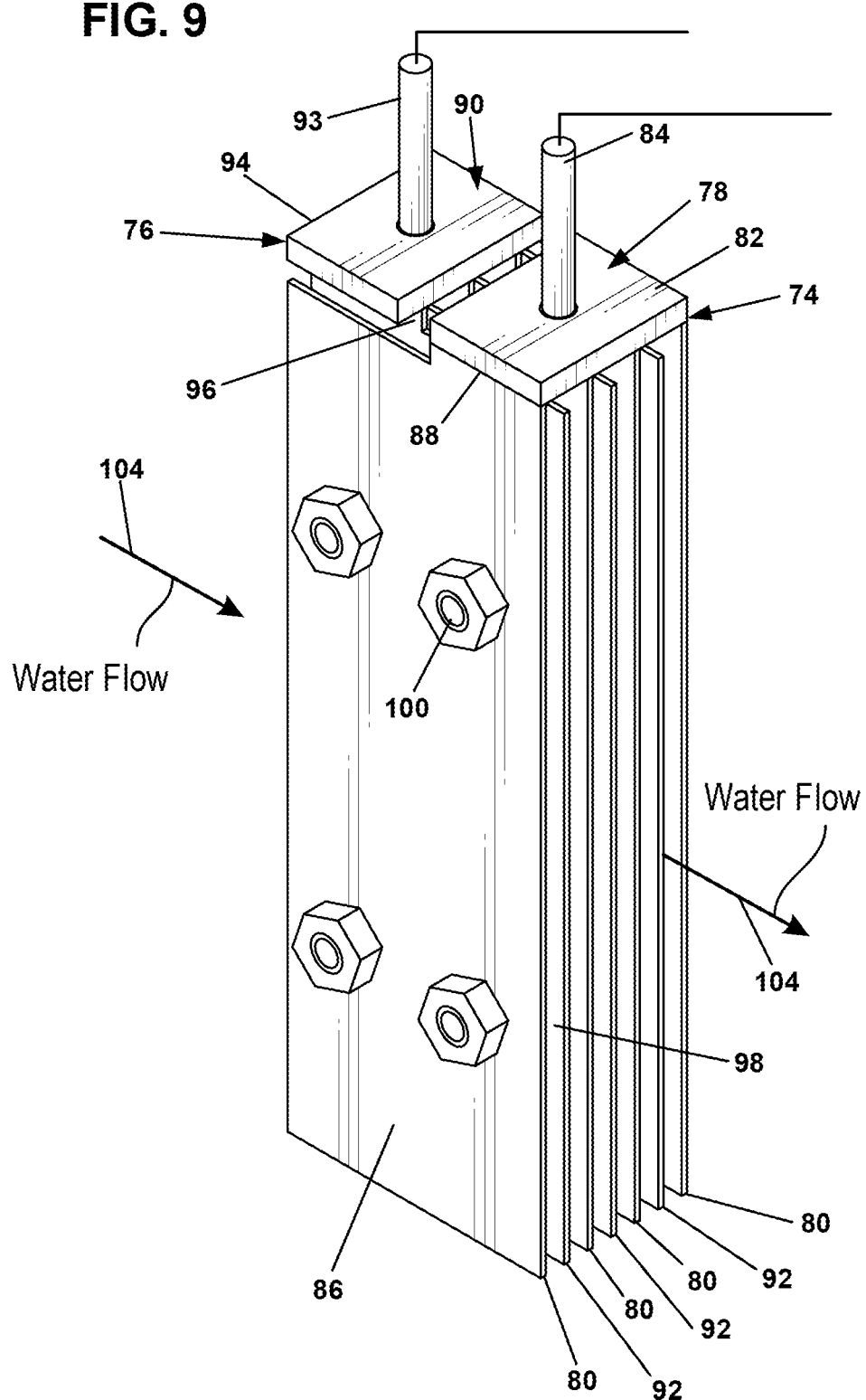
FIG. 9 is a perspective view of an electrode arrangement of the electrolytic cell of FIG. 3, wherein the electrode arrangement includes a plurality of spaced apart electrically conductive plates which can include interleaved anode and cathode plates.
Figure 10:
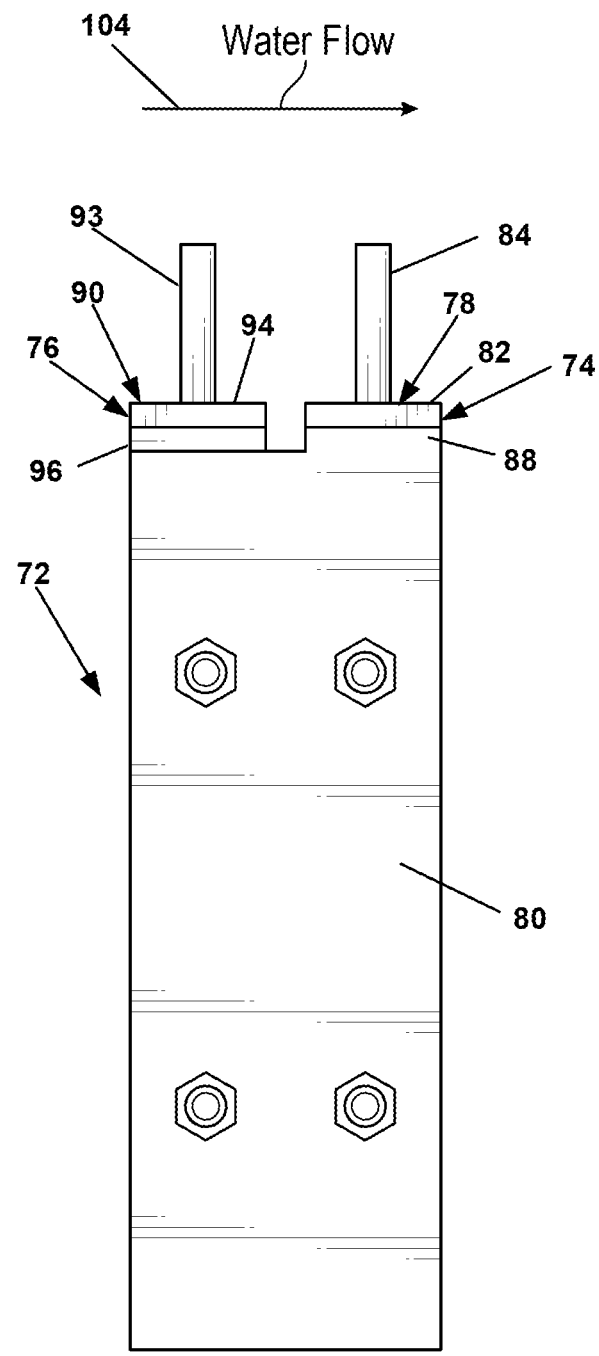
FIG. 10 is a side view of the electrode arrangement of FIG. 9.

In a preferred example, water flowing through the strainer 40 flows through the interstitial space between the anode and cathode plates 80, 92 in a direction shown by arrows 104 labeled at FIG. 9. In certain examples, the plates 80, 92 are located within the strainer filter 62 with open ends of the interstitial spaces between the plates 80, 92, facing toward the opening 70 of the strainer filter 62 and in alignment with the water inlet 58 of the strainer housing 52.

Figure 6:
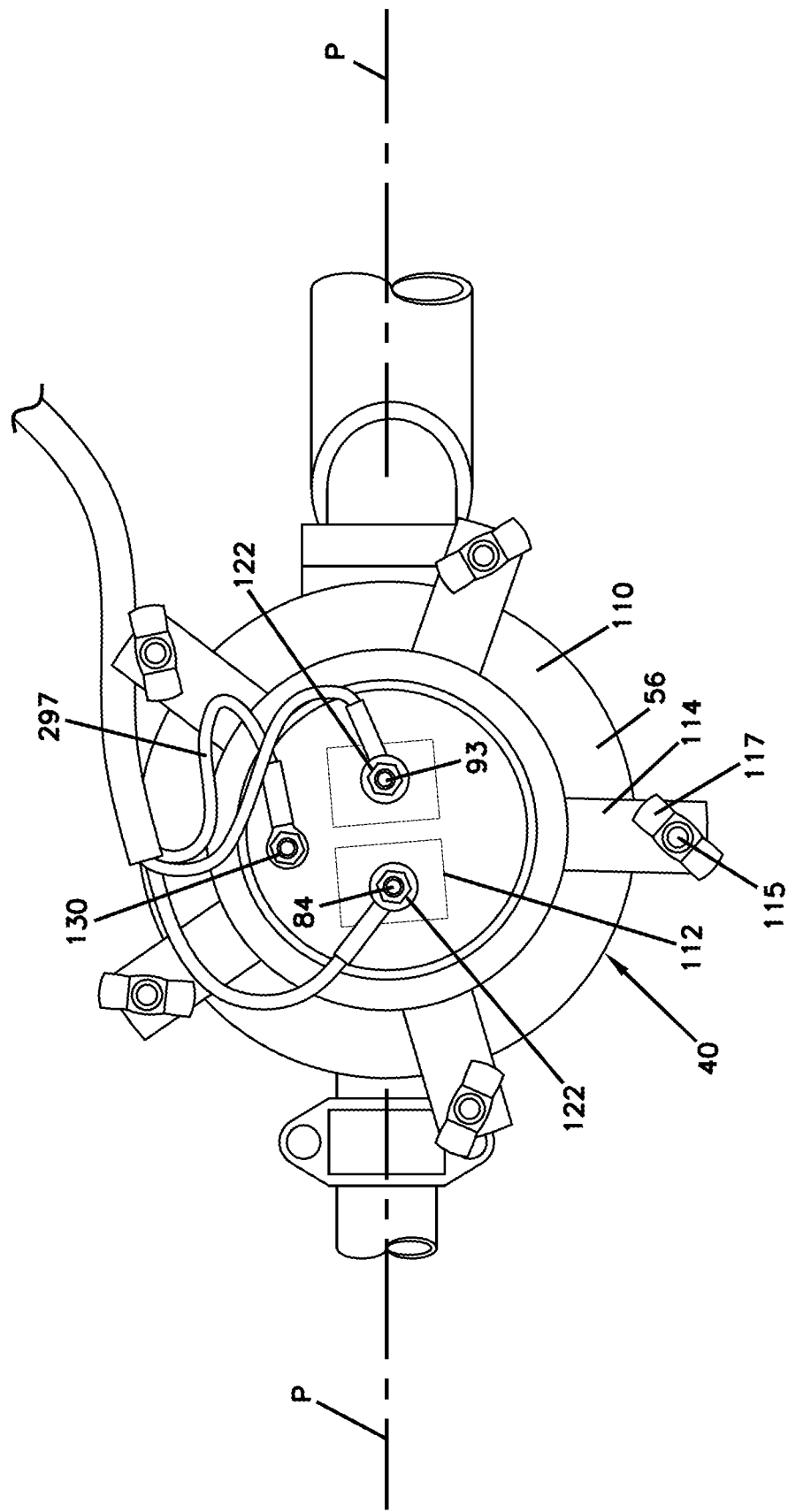
FIG. 6 is a top view of the electrolytic cell of FIG. 3.

In certain examples, the anode terminal post 84 and the cathode terminal post 93 extend through openings 106, 108 (see FIGS. 4 and 7) defined through the lid 56. In certain examples, the openings 106, 108 can be sealed by gaskets or other seals that provide a sealed interface between the terminal posts 84, 93 and the lid 56. In the case where the lid 56 has a metal construction, the sealing gaskets can provide a dielectric insulation layer between the lid and the terminal posts 84, 93. In other examples, the lid 56 can have a dielectric construction. For example, as shown at FIG. 6, the lid 56 can have a composite construction with an outer rim 110 having a metal construction and an inner portion 112 (see FIGS. 7 and 8) having a dielectric construction. In one example, the inner portion 112 can have a dielectric construction including a plastic material that includes polycarbonate. In certain examples, the openings 106, 108 can be defined through the inner portion 112.

Referring to FIG. 6, the outer rim 110 can be annular in shape and can include mounting tabs 114 defining fastener openings for receiving fasteners corresponding to the main housing body 54. In certain examples, the fasteners can include threaded shanks 115 secured to the main housing body 54 of the strainer canister, and nuts such as wing nuts 117 can be threaded on the threaded shanks after the threaded shanks have been passed through openings defined by the mounting tabs 114. In certain examples, a gasket can be provided between the lid 56 and the main housing body 54 to provide sealing.

Figure 8:
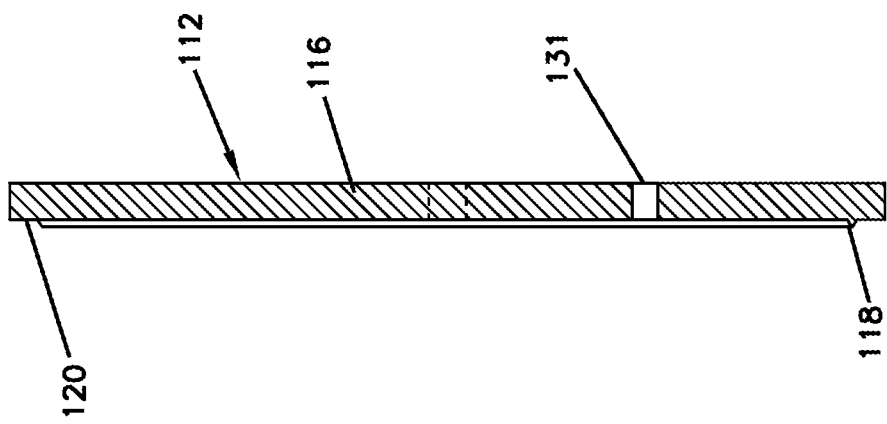
FIG. 8 is cross-sectional view taken along section lines 8-8 of FIG. 7.
Figure 7:
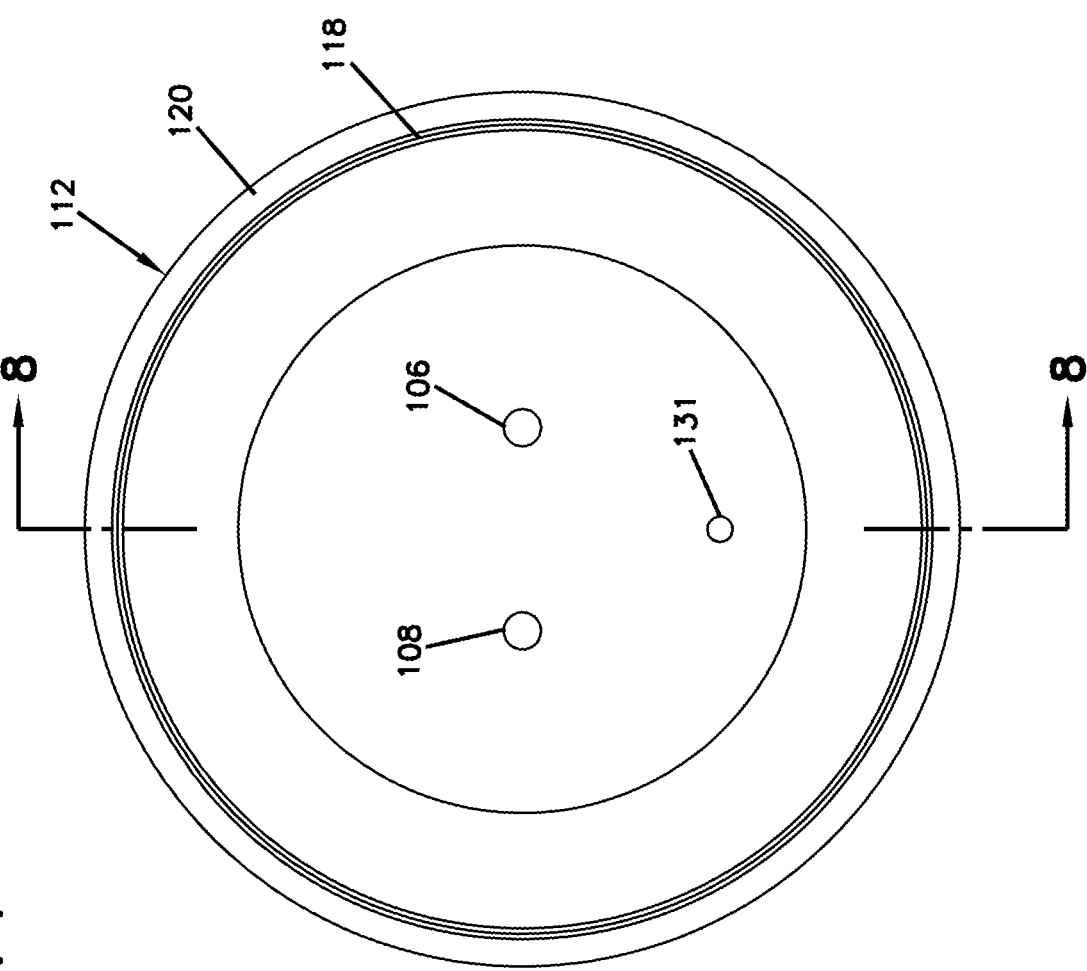
FIG. 7 is a top, plan view of a lid of the electrolytic cell of FIG. 3.

FIGS. 7 and 8 further show the inner portion 112 of the lid 56. The inner portion 112 includes a main body 116 and a circular ridge 118 that projects from the main body 116. In one example, the ridge 118 can fit within an opening defined by the rim 110. An annular shoulder 120 can be positioned around the exterior of the ridge 118. The shoulder 120 can seat on a top side of the rim 110 and can be bonded to the rim 110. The terminal openings 106, 108 can be defined through a central region of the inner portion 112. Fasteners 122 (e.g., nuts) can be threaded on the terminal posts 84, 93 to secure the electrode arrangement 72 to the lid 56.

It is desirable for the gas by-product of the electrolysis that occurs within the electrolytic cell 46 to not accumulate within the electrolytic cell 46. Example of gas by-product includes hydrogen and other gases. To prevent the accumulation of gas within the housing 52, it is desirable for the electrolytic cell 46 to be deactivated when water is not flowing through the housing 52. When water is flowing through the housing 52, gas generated through electrolysis at the electrolytic cell 46 is swept out of the housing 52 with the flowing water that exits the electrolytic cell 46 through the water outlet 60. However, if the electrolytic cell 46 is operating to generate biocide while flow is not occurring through the housing 52, gas by-product from the electrolysis may accumulate in the housing 52, which is not desirable.

In certain examples, the sensing circuit 254 of the biocide generating system 24 can be configured for detecting the accumulation of gas within the housing 52. When the sensing circuit 254 detects the collection of gas within the housing 52, the sensing circuit 254 triggers the disconnection of power to the electrode arrangement 72 (e.g., the processor 248 can open a switch to interrupt the supply of electrical current to the electrolytic cell 46). In certain examples, the sensing circuit 254 can include a gas detection sensor for sensing a difference in properties between a gas and a liquid (e.g., sea water). For example, one type of sensing circuit can detect based on the higher electrical conductivity of sea water as compared to gas. Such a sensing circuit can use first and second electrodes that are electrically connected to each other by sea water when the housing is filled with saltwater, and that are electrically disconnected (e.g., isolated) from one another by gas when gas accumulates within the housing 52. Essentially, a closed circuit exists when the electrodes are electrically connected by sea water (which provides relatively low impedance between the electrodes), and an open circuit exists when the electrodes are separated by collected gas (which provides relatively high impedance between the electrodes). The sensing circuit monitors the connection state between the first and second electrodes to determine whether the connection state is an open or closed circuit. The sensing circuit can monitor parameters which change when the impedance between first and second electrodes changes. Example parameters include changes in current flow and/or changes in voltage.

Other gas sensing systems/circuits can detect the collection of gas based on the higher density of sea water as compared to gas. For this type of gas sensing system/circuit, a float switch can be used to determine when gas collects in the housing 52. The float switch can include a float that moves with the water level in the housing 52. The float is raised/lifted to an upper position by the sea water when the housing is full of sea water, and lowers/drops to a lower position when the sea water level drops due to the collection of gas in the housing 52. The float switch changes states when the float moves between the upper and lower positions to provide an indication of whether gas is collecting in the housing 52. Another gas sensing system/circuit can detect the collection of gas based on the difference in optical properties of sea water as compared to gas. For this type of gas sensing system/circuit, an optical sensing system can be used to determine when gas collects in the housing 52. The optical sensing system can include an optical emitter and an optical sensor. An optical signal sensed at the optical sensor varies based on whether gas or liquid is present between the optical emitter and the optical sensor. The variation in the optical signal can be used to determine whether gas is accumulating within the housing 52.

A preferred gas sensor for the sensing circuit 254 includes a gas sensing electrode 130 that senses the presence of collected gas based on the difference in electrical conductivity between sea water and gas. Preferably, the gas sensing electrode 130 is mounted at a gas collection location of the housing 52. Typically, the gas collection location is located at an upper region of the housing 52. When sea water is flowing through the housing 52, the upper region of the housing 52 where the gas sensing electrode 130 is located is filled with sea water. Thus, the gas sensing electrode 130 is immersed within sea water. When gas collects within the housing 52, the gas displaces the sea water at the upper region of the housing 52 such that the sensing electrode 130 is no longer immersed in sea water and is exposed to the gas. In certain examples, the gas sensing electrode 130 has a metal construction that may include a metal such as titanium. In certain examples, the gas sensing electrode 130 is mounted to the lid 56 of the housing 52. In certain examples, the gas sensing electrode 130 extends through an opening 131 (see FIGS. 4 and 7) defined in the lid 56. In certain examples, the gas sensing electrode 130 includes a sensing portion 132 (see FIG. 3) located at an inner side of the lid 56 which is adapted to extend into the interior of the housing 52, and a connection portion 134 (see FIG. 3) that extends outside the housing 52. In certain examples, a gasket or other seal can provide sealing between the gas sensing electrode 130 and the opening 131 in the lid 56.

In certain examples, the first and second posts 84, 93 are aligned along a plane P (see FIG. 6), and the gas sensing electrode 130 is offset from the plane P. Similarly, in certain examples, the openings 106, 108 are aligned along the plane P, and the opening 131 for the gas sensing electrode 130 is offset from the plane P.

In certain examples, the sensing circuit 254 senses electrical connectivity between the gas sensing electrode 130 and another component of the electrolytic cell. In one example, electrical connectivity is sensed between the gas sensing electrode 130 and either the first terminal 78 or the second terminal 90. In the sensing circuit 254 of FIG. 3, electrical connectivity is sensed between the sensing electrode 130 and the second terminal 90. In this example, when sea water is flowing through the housing 52, the housing 52 is filled with sea water and the sea water electrically connects the second electrode 76 and the gas sensing electrode 130 together. When gas collects within the housing, the sea water within the upper portion of the housing is displaced by gas thereby exposing the sensing portion 132 of the gas sensing electrode 130 such that sea water no longer provides an electrical connection between the gas sensing electrode 130 and the second electrode 76. Thus, an open circuit is formed between the sensing portion 132 of the gas sensing electrode 130 and the second electrode 76. By monitoring a parameter related to electrical connectivity (e.g., voltage, impedance, etc.) and detecting changes in the parameter, it is possible to identify when gas collects within the housing 52. Upon detection of the collection of gas within the housing 52 (which indicates a stoppage of water flow through the water system), the control system of the biocide generating system 24 can immediately terminate power provided to the electrolytic cell 46 (e.g., by opening a switch) to stop the generation of biocide and the corresponding gas by-products. In other examples, the biocide generating system 24 can terminate power to the electrolytic cell 46 for a predetermined time after the detection of gas within the housing 52. The delay in terminating the biocide generation after the detection of accumulated gas can have a duration long enough for allowing enough biocide to be generated for the biocide to diffuse from the electrolytic cell to treat the portion of the water system located before the electrolytic cell, and short enough to prevent the excessive accumulation of gas.

In certain examples, the biocide generating system can include a redundant system for determining whether water is flowing through the housing 52. For example, a gas sensing system can be used in combination with the flow sensor 51 and/or a pump operation detector to provide redundant monitoring regarding whether water is flowing through the on-board water system 22. One example flow sensor 51 is shown at FIGS. 1 and 3 for sensing whether flow is occurring along the flow path 32 and optionally for generating data for allowing a flow rate through the flow path 32 to be determined. The flow sensor 51 can include a flow meter such as a hall-effect flow meter (e.g., electronic paddle flow meter). If any one of the flow monitoring means provides an indication that no flow is occurring within the system, the control system can disable the electrolytic cell 46 of the biocide generator. For example, if the flow sensor provides a no-flow indication to the control unit 48 or the gas sensing system provides an indication to the control unit 48 that gas is collecting at the electrolytic cell 46, the control unit 48 will disable the electrolytic cell 46. Similarly, the control unit 48 of the biocide generating system 24 can interface with the pump 42 itself (e.g., a pump motion sensor; a pump output pressure sensor, a sensor that detects power drawn by the pump, an operational state indication provided by the pump control, etc.) or an on/off switch corresponding to the pump to determine whether the pump 42 is on or off. When the control until 48 detects that the pump 42 is in an off state, the control unit 48 can terminate power to the electrolytic cell 46. In other examples, the system may generate biocide intermittently or for controlled durations when water is not flowing through the system (e.g., as indicated by the flow sensor and/or gas detection sensor and/or the status of the pump) so that biocide generated at the electrolytic cell can move by diffusion to the portion of the water system located before the electrolytic cell to discourage bio-growth at this region.

Referring again to FIG. 3, the control unit 48 of the biocide generating system 24 provides power to the electrolytic cell 46 for driving the electrolysis reaction that occurs at the electrode arrangement 72. As shown at FIG. 3, the control unit 48 may include leads 150, 152 for coupling the control unit 48 to the power source 262 on the watercraft 20. The power source 262 can be a battery, generator, or other power source. In certain examples, the power source can range from 12-240 volts and can provide alternating current (AC) or direct current (DC). Preferred power sources include 12 volt DC, or 24 volt DC, or 110 volt AC or 240 volt AC power sources. The control unit 48 of the biocide generating system can include the isolation circuit 258 for electrically isolating the power source 262 on the watercraft 20 from the electrical components of the biocide generating system 24. For example, the isolation circuit 258 can transfer electrical power from the power source 262 to the biocide generating system 24 in a manner where the biocide generating system 24 is provided with the zero voltage reference 264 that is not electrically connected to (i.e., is electrically isolated from) the earth ground 266 of the watercraft 20. In one example shown at FIG. 15, the isolation circuit 258 inductively transfers electrical power to the biocide generating system 24 via a transformer that may include inductive coils 159$a$, 159$b$. If the power source is a direct current power source, the isolation circuit 258 can include an inverter 161 for converting the direct current into alternating current which is applied through the inductive coil 159$a$ such that alternating current is induced at the inductive coil 159$b$. A rectifier 163 can be used to convert the alternating current induced at the inductive coil 159$b$ into a direct current voltage for use in powering the various electrical components of the biocide generating system 24. In the case where the power source 262 provides alternating current, the inverter 161 can be eliminated. In an example embodiment, the isolation circuit 258 is implemented using a VHB100 W DC-DC converter available from CUI, Inc. of Tualatin, Oreg. Other isolation circuits, including other types of DC-DC converters having different voltage thresholds, are useable as well. A voltage regulator 249 can regulate electrical power provided to the processor 248, the display 252 and other lower power components of the system.

It is preferred for the control system to apply DC voltage across the first terminal 78 and the second terminal 90. To precisely control the amount of biocide generated at the electrode arrangement 72, it is preferred for a constant current to be applied between the first electrode 74 and the second electrode 76 for driving the electrolysis reaction. In certain examples, the control unit 48 includes the cell power circuit 256 which includes a constant current source 160 (see FIG. 15) coupled to a switching device 600 which is connected to the first terminal 78 and the second terminal 90 by leads 162, 164. The constant current source 160 receives a DC voltage input 181 from the isolation circuit 258 and is configured to drive a constant current across the first electrode 74 and the second electrode 76. Preferably, the constant current source 160 maintains a constant current across the electrode arrangement independent of the load between the electrodes as long as sufficient power is available. Additionally, it is preferred for the constant current to be maintained despite fluctuations/variations in the input voltage from the processor. In certain examples, the processor 248 can control the constant current power source 160 via a control line to vary the constant current applied across the first and second electrodes 74, 76 based on a water flow rate through the flow path 32. The water flow rate can be determined by a reading from the flow sensor 51 or other means. In certain examples, the processor 248 can increase the constant electrical current with an increase in the water flow rate and decrease the constant electrical current with a decrease in the water flow rate so as to maintain a constant biocide concentration (or at least a biocide concentration within a target range) in the water flowing along the flow path 32.

Based on Faraday's law of electrolysis, the amount of biocide generated through electrolysis is proportional to the magnitude of the constant current supplied across the electrode assembly. Therefore, if higher concentrations of biocide are desired, the magnitude of the constant current provided to the electrode arrangement 72 can be increased accordingly. Similarly, if lower concentrations of biocide are desired, the magnitude of the constant current provided to the electrode arrangement 72 can be reduced accordingly. It will be appreciated that the magnitude of the constant current provided to the electrode arrangement 72 can be modified based on water flow rate through the on-board water system and other factors. In certain examples, the constant current source 160 can include a resistance set 190 (see FIG. 15) that can be changed between different resistance values by the processor 248 to selectively modify the magnitude of a reference current, thereby adjusting the magnitude of the constant current output by the constant current source 160.

Figure 15:
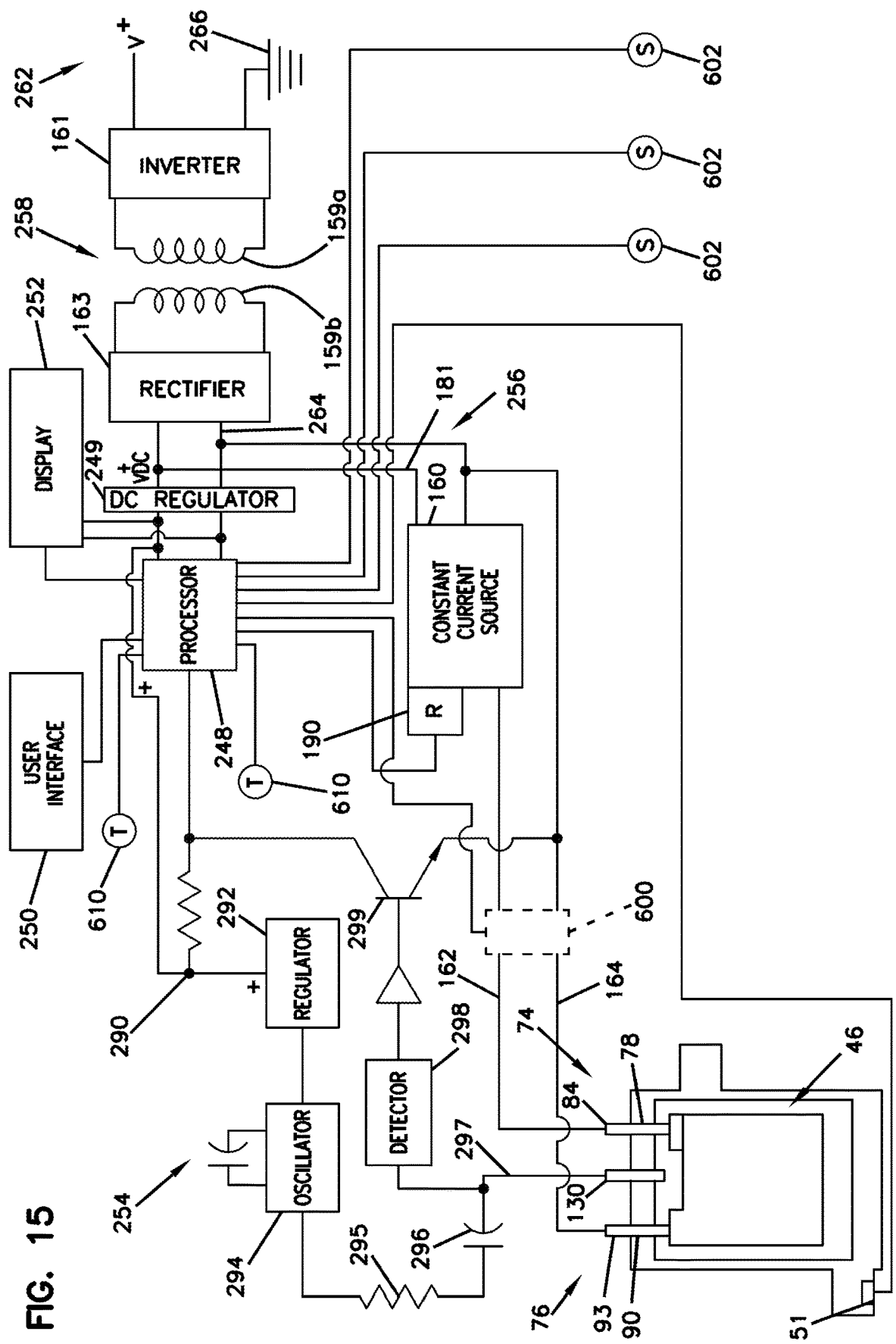
FIG. 15 depicts an example gas sensing circuit, isolation circuit, constant current source circuit, and switching device suitable for use with the biocide generating system of FIG. 3.
Figure 26:
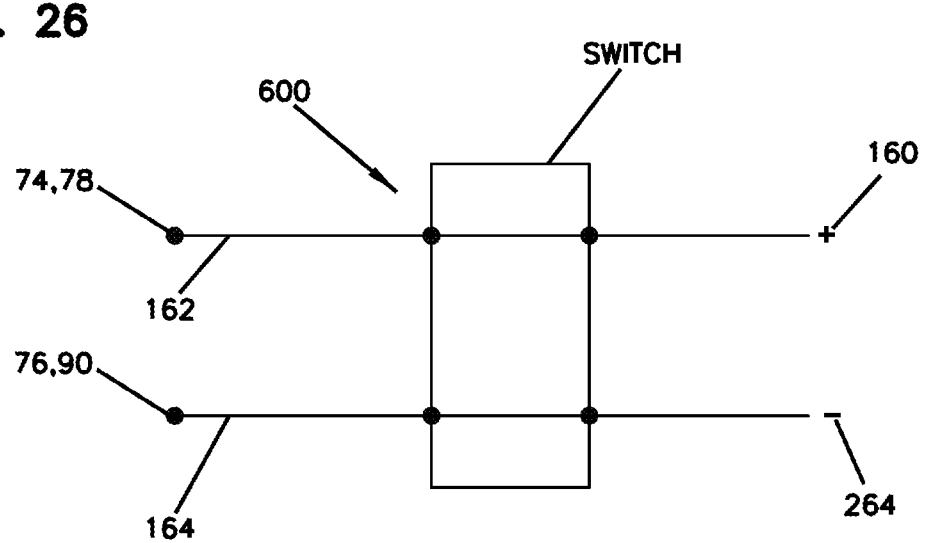
FIG. 26 is a schematic view of the example switching device shown in FIG. 15 arranged in a first configuration to connect the electrolytic cell to the current source in accordance with the principles of the present disclosure.
Figure 27:
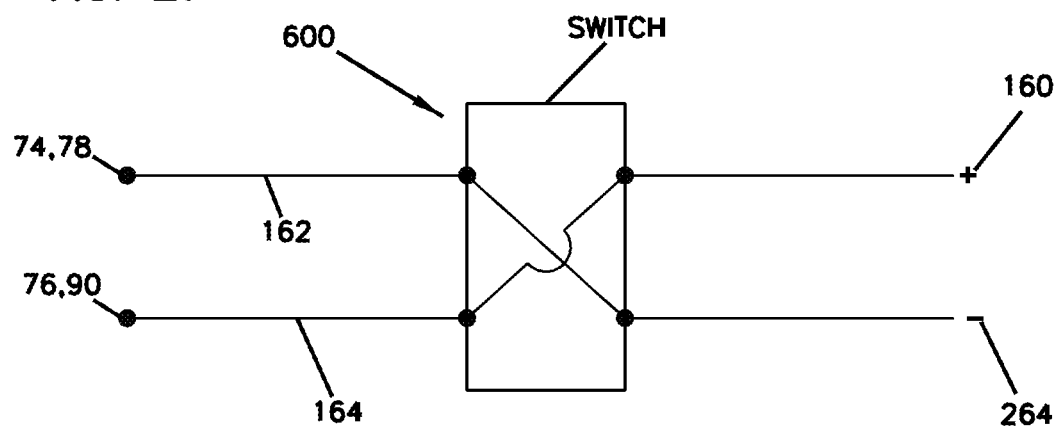
FIG. 27 is a schematic view of the example switching device shown in FIG. 26 arranged in a second configuration to reverse the polarity of the electrolytic cell in accordance with the principles of the present disclosure.
Figure 28:
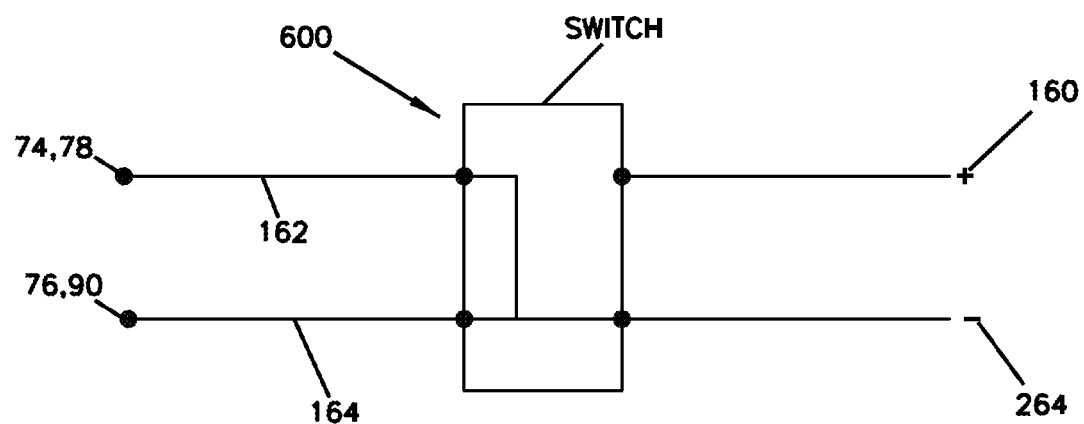
FIG. 28 is a schematic view of the example switching device shown in FIGS. 26 and 27 arranged in a third configuration in which the electrodes are short circuited together to cause ions concentrated adjacent the electrodes to move away from the electrodes towards an equilibrium state.

Referring to FIG. 15, the cell power circuit 256 preferably includes switching device 600 which is preferably configured for alternating (e.g., switching, forward and reversing, etc.) the polarity of the electrolytic cell 46 to inhibit the accumulation of scale on the electrodes as previously described. The switching device 600 can be configured in two different switch configurations corresponding to two different polarity states (e.g., polarity modes, polarity configurations, etc.) In a first switch configuration (see FIG. 26), the switching device 600 couples the constant current source 160 (FIG. 15) to the first terminal 78 (e.g., via lead 162) and couples the zero voltage reference 264 to second terminal 90 (e.g., via lead 164). In the first switch configuration the electrodes 74, 76 are operated in a first polarity state in which the first electrode 74 is an anode and the second electrode 76 is a cathode. In a second switch configuration (see FIG. 27), the switching device 600 couples the constant current source 160 to the second terminal 90 (e.g., via lead 164) and couples the zero voltage reference 264 to the first terminal 78 (e.g., via lead 162), thereby reversing the polarity compared to the first switch configuration. In the second switch configuration the electrodes 74, 76 are operated in a second polarity state in which the first electrode 74 is a cathode and the second electrode 76 is an anode. By reversing the polarity of the electrodes 74, 76 back and forth between the first and second polarity states during time periods in which biocide is intended to be generated, the accumulation of scale on the electrode plates of the electrodes 74, 76 over time is reduced. Preferably, the first and second electrodes 74, 76 are temporarily electrically connected together (see FIG. 28) before switching from one electrode polarity state to another to provide an electrical short between the electrodes 74, 76.

In certain examples, the processor 248 of the control unit 48 can interface with and coordinate operation of the switching device 600. For example, the processor 248 may control the frequency in which the switching device 600 is switched between the first and second configurations. While water is flowing through the system, it is desirable for the electrolytic cell 46 to be generating biocide. Typically, during biocide generation, the electrolytic cell 46 will be repeatedly switched back and forth between the first polarity state and the second polarity state. The electrolytic cell is preferably operated for a first duration in the first polarity state before being switched to the second polarity state, and is also operated for the first duration in the second polarity state before being switched back to the first polarity state. In certain examples, the first duration can be in the range of 3-5 minutes, but as indicated previously other durations can be used as well.

To expedite the movement of ions in the electrolyte away from the electrodes (e.g., equilibrating the ions in the electrolyte) before switching the system electrodes between the different polarity states, it is preferred for electrical power to the first and second electrodes to be terminated (i.e., a difference in electric potential is not provided between the first and second electrodes) and for the first and second electrodes 74, 76 to be electrically connected to each other (e.g., short circuited). In one example, the switching device 600 is operable in a third switch configuration (see FIG. 28) in which electrical power from the constant current source 160 is terminated to the first and second electrodes 74, 76 and the first and second electrodes 74, 76 are both electrically connected to each other and to the zero voltage reference 264. The electrolytic cell is preferably operated in the third switch configuration for a second duration before switching to a subsequent electrode polarity state. It will be appreciated that switching of the switching device 600 to the third switch configuration and the duration the switching device 600 remains in the third switch configuration before switching to the subsequent polarity state can be controlled by the control unit 48. In one example, the second duration is less than or equal to 1 minute, or less than or equal to 45 seconds or less than or equal to 30 seconds.

Figure 29:
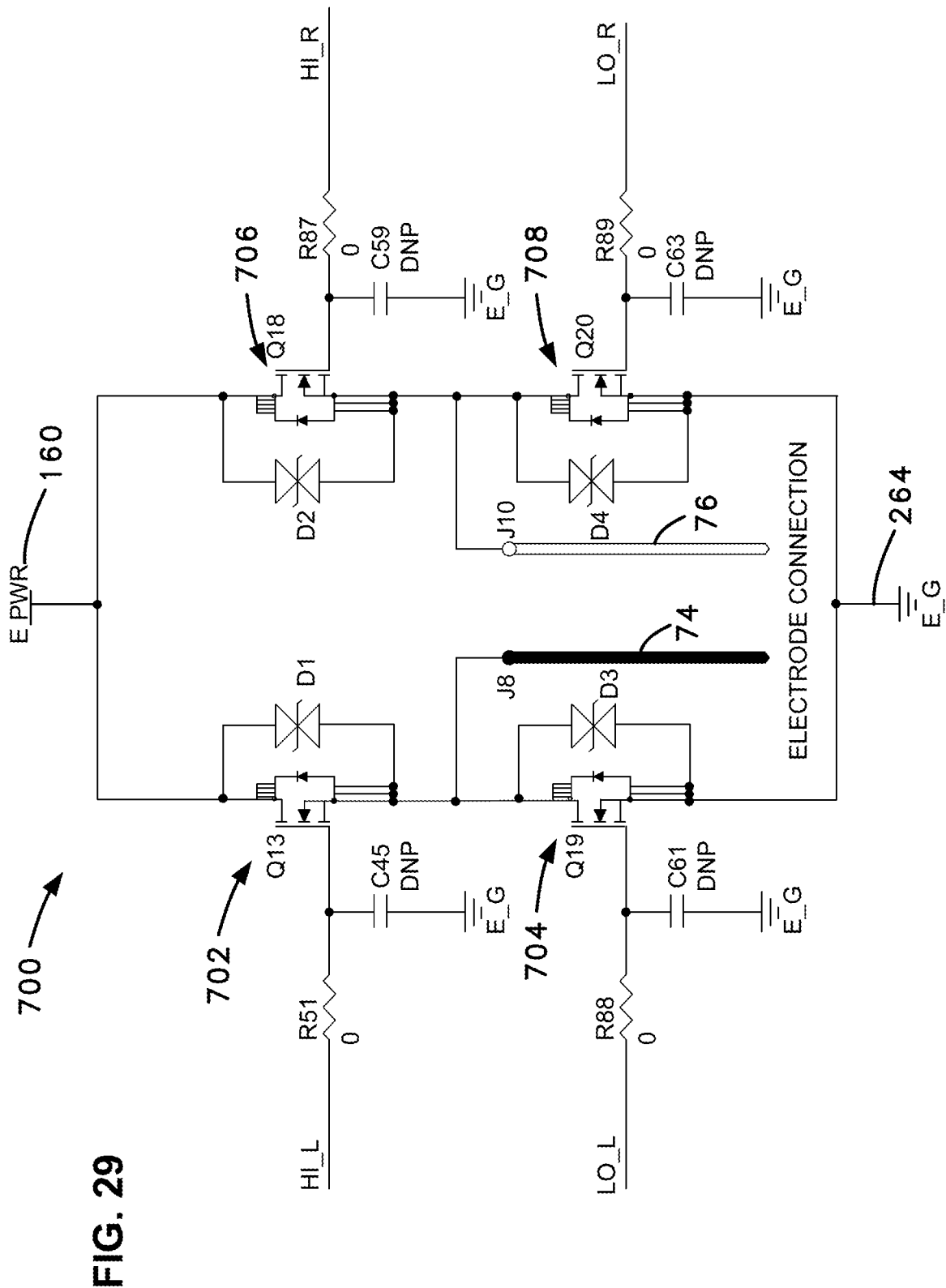
FIG. 29 is an example switch configuration suitable for performing the function of the switching device of FIGS. 26-28.
Figure 30:
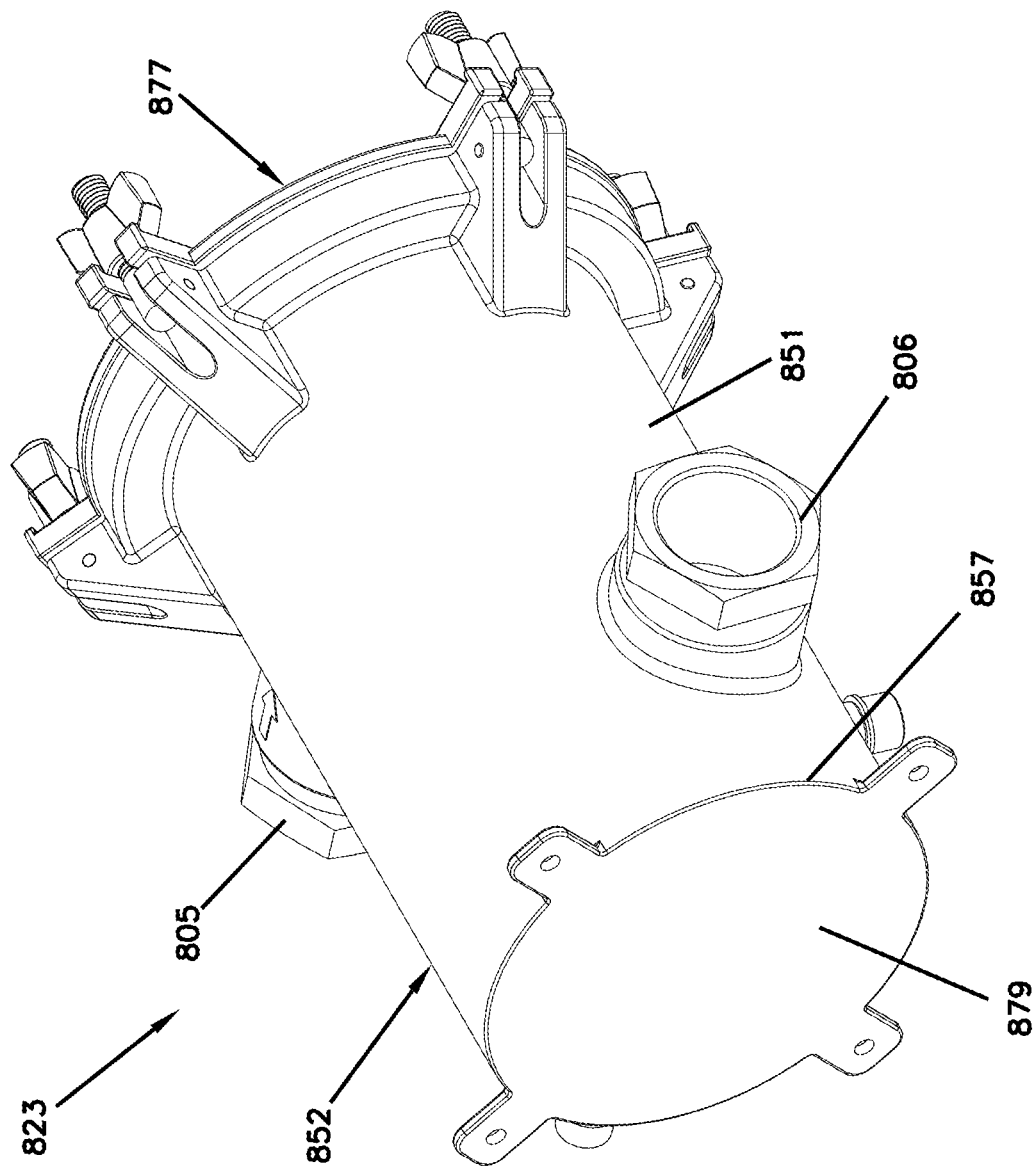
FIG. 30 is a perspective view of another electrolytic cell unit in accordance with the principles of the present disclosure.

FIG. 29 depicts an example switch arrangement 700 suitable for functioning as the switching device 600. The switch arrangement 700 is depicted as having an H-bridge design including a first switch 702, a second switch 704, a third switch 706 and a fourth switch 708. In one example, the switches 702, 704, 706 and 708 are transistors such as metal oxide semiconductor field-effect transistors (MOSFETS). When the first and fourth switches 702, 708 are on (i.e., closed) and the second and third switches 704, 706 are off (i.e., open), the switch arrangement 700 is in the first switching configuration in which the first electrode 74 is electrically connected to power (e.g., the constant current source 160) and the second electrode 76 is electrically connected to the zero voltage reference 264. When the first and fourth switches 702, 708 are off (i.e., open) and the second and third switches 704, 706 are on (i.e., closed), the switch arrangement 700 is in the second switching configuration in which the first electrode 74 is electrically connected to the zero voltage reference 264 and the second electrode 76 is electrically connected to power (e.g., constant current source 160). When the first and third switches 702, 706 are off (i.e., open) and the second and fourth switches 704, 708 are on (i.e., closed), the switch arrangement 700 is in the third switching configuration in which the first and second electrodes 74, 76 are both electrically connected to each other and to the zero voltage reference 264.

As indicated above, the sensing circuit 254 of FIG. 3 can monitor a parameter related to electrical connectivity to determine when gas collects within the housing 52. The parameter can relate to electrical connectivity between the gas sensing electrode 130 and another component of the electrolytic cell 46 such as one of the first or second electrodes 74, 76. As shown at FIG. 15, the sensing circuit 254 can include a power input 290 for receiving a direct current (DC) voltage from the regulator 249. The sensing circuit 254 can include a regulator 292 for further regulating the input voltage. The sensing circuit also includes an oscillator 294 that converts the regulated input voltage into an oscillator signal (e.g., an AC signal) that is applied through a resistor 295 to a lead 297 that couples to the gas sensing electrode 130. The resistor 295 has a reference resistance. A blocking capacitor 296 ensures there is no net DC voltage on the electrode 130. Depending on the position of the switch 600, at least one of the first and second terminals 78, 90 is connected to the zero voltage reference 264 of the biocide generating system. A detector 298 compares a resistance to the oscillator signal in the fluid between the gas sensing electrode 130 and the first or second terminal 78, 90 with the reference resistance. When saltwater makes an electrical connection between the gas sensing electrode 130 and the first or second terminal 78, 90, the sensed resistance between the electrode 130 and the first or second terminal 78, 90 is well below the reference resistance. In contrast, when accumulated gas within the electrolytic cell forms an open circuit between the electrode 130 and the first or second terminal 78, 90, the sensed resistance exceeds a threshold resistance of the detector 298 and the oscillator signal is directed by the detector 298 to a transistor 299 which activates a gate connection to the zero voltage reference 264, thereby causing a gas indicator signal to be sent to the processor 248. Upon receipt of the gas indicator signal, the processor 248 can open a power switch to stop power to the electrode arrangement 72 and can activate an indicator (e.g., a light, audible alarm or other indicator) on the display 252 to provide an indication that gas has been detected in the electrolytic cell 46. In example embodiments, the sensing circuit can be implemented using an LM1830 Fluid Detector, available from Texas Instruments (formerly National Semiconductor) of Dallas, Tex. However, other fluid level detectors can be used in a manner consistent with the present disclosure.

In certain examples, the processor 248 of the control unit 48 can interface with and coordinate operation of the sensing circuit 254, the cell power circuit 256, the switching device 600, the sensor 51, the user interface 250, the display 252, and the isolation circuit 258. Additionally, the processor 248 can interface with other pieces of equipment on the watercraft 20 such as pumps, potable water systems, systems for filling bait wells, or other systems. The processor can interface with software, firmware, and/or hardware. Additionally, the processor 248 can include digital or analog processing capabilities and can interface with memory (e.g., random access memory, read-only memory, or other data storage). In certain examples, the processor 248 can include a programmable logic controller, one or more microprocessors, or like structures. Example user interfaces can include one or more input structures such as keyboards, touch screens, buttons, dials, toggles, or other control elements that can be manipulated by an operator to allow the operator to input commands, data, or other information to the controller. The display can include lights, audible alarms, screens, or other display features. An overheat detection system may be arranged to output an overheat signal in the event the temperature sensed by a temperature sensor or sensors 610 (see FIG. 15) is above a predetermined temperature. The temperature sensors 610 may be used to help prevent active components from becoming hot or overheating during use or failure. The temperature sensors 610 may be used to detect when the temperature in an engine room of the watercraft becomes too hot, or when a temperature in an enclosure housing one or more components of the biocide generating system (e.g., the processor 248 and/or the sensing circuit 254 and/or the cell power circuit 256 and/or the isolation circuit 258) exceeds a predetermined level. The temperature sensors 610 can interface with the processor 248 and the processor can control or modify operation of the biocide generating system. For example, if the sensor or sensors 610 provide temperature reading indicative of an overheating condition (e.g., if the sensor reading is above a predetermined value), the processor 248 can implement a heat-reduction control protocol designed to reduce or minimize heat production by the biocide generating system. For example, the processor may cycle power on and off to the system to control the amount of heat generated, may reduce the electrical current provided to the electrolytic cell, or may shut down the system. In one example, the system may be powered off for at least thirty seconds, at least one minute, at least two minutes, at least three minutes, at least four minutes, or at least five minutes to allow for cooling.

Figure 14:
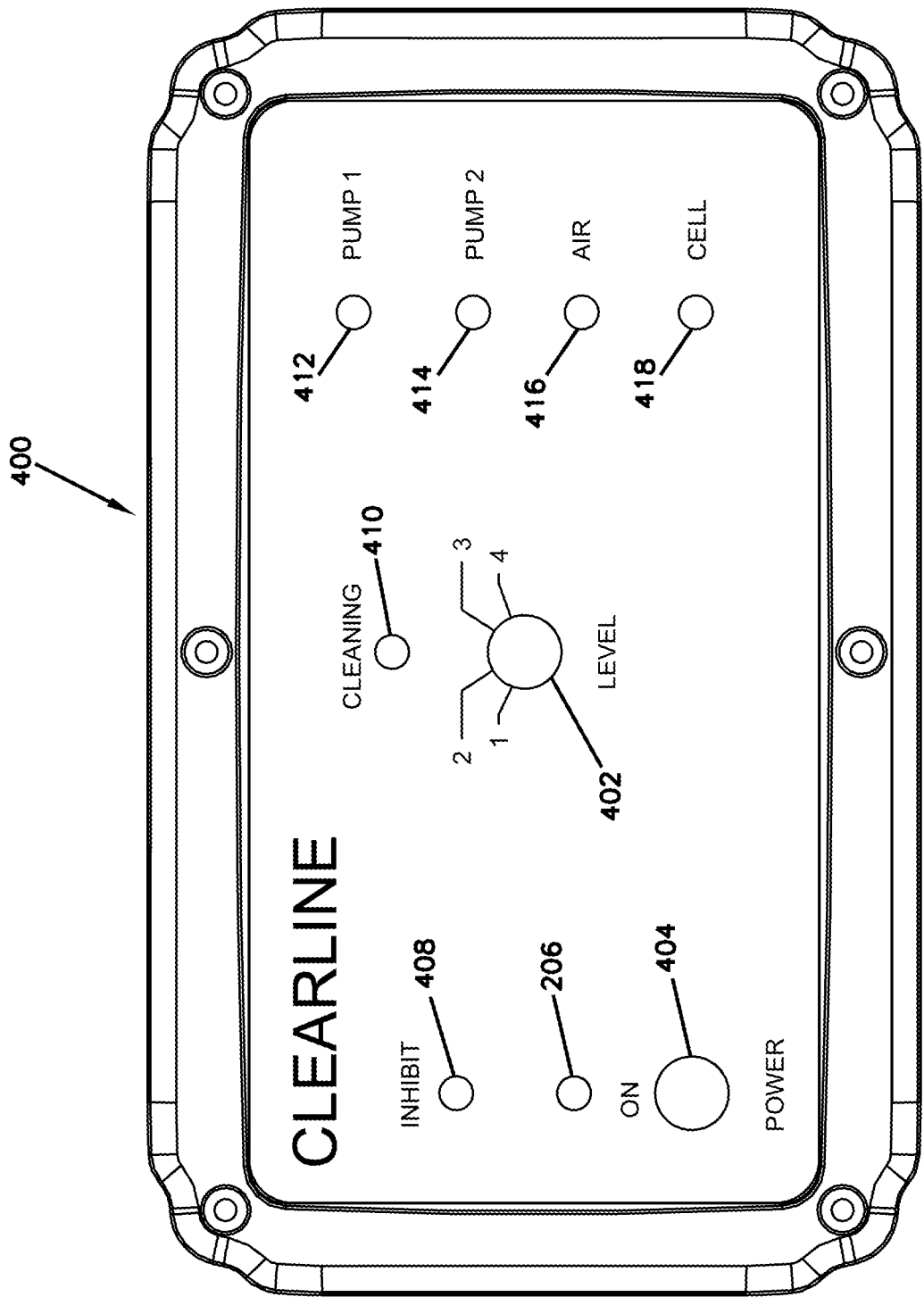
FIG. 14 depicts an example display and user interface suitable for use with the biocide generating system of FIG. 1.

FIG. 14 shows an example integrated display and user interface module 400 suitable for use with the biocide generating system 24 of FIG. 1. The combined display unit and user interface module 400 includes a user input in the form of a knob/dial 402 for allowing the user to vary the magnitude of the constant current provided to the electrolytic cell 46 for driving electrolysis. It will be appreciated that the knob/dial can be turned to change the resistance value of the resistance set 190 of the constant current source 160. The display and user interface 400 also includes a power button 404 for allowing the user to turn the biocide generating system 24 on and off, and an on-light 206 that is illuminated when the biocide generating system 24 is turned on. The power button 404 can interface with the processor 248 to determine the closed or open state of a power switch of the system. The display and user interface 400 also includes an inhibit light 408 that illuminates when the control system of the biocide generating system 24 is inhibiting the production of biocide. For example, the inhibit light 408 may be illuminated when a potable water system or bait-well fill system that uses water from the water flow path 32 is activated and drawing water from the water flow path 32.

Referring still to FIG. 14, display and user interface 200 can also include a cleaning light 410 that is illuminated when the biocide generating system 24 is actively generating biocide as water flows through the on-board water system 22. Additionally, the display and user interface module 400 can include a first pump light 412 that is illuminated by the system controller when a first pump of the watercraft 20 is actively pumping, and a second pump light 414 that is illuminated by the control system when a second pump of the watercraft 20 is actively pumping. The display and interface module 400 can also include an air detector light 416 that is illuminated by the processor 248 when the sensing circuit 254 of the biocide generating system 24 detects that gas is being collected at the electrolytic cell 46, and a cell light 418 that is illuminated when the electrode arrangement 72 of the electrolytic cell 46 is in need of cleaning. It will be appreciated that the cell light 418 can be illuminated after a predetermined time of operation of the biocide generating system 24 or based on a sensed electrolysis efficiency of the electrode arrangement 72.

In certain examples, electrode arrangements in accordance with the principles of the present disclosure have package sizes that are relatively small so as to be capable of fitting within water strainers or other types of housing that can be readily incorporated into the on-board water systems of watercraft. In certain examples, the electrode arrangements can have package sizes less than or equal to 50 square inches, or less than or equal to 45 square inches, or less than or equal to 40 square inches, or less than or equal to 35 square inches.

It will be appreciated that biocide generating systems 24 in accordance with the principles of the present disclosure can be incorporated into the on-board water systems of watercraft for first-fit applications, and for retrofit applications. In the case of retrofit applications, strainers having integrated electrolytic cells can be used to replace existing strainers present on the watercrafts in need of retrofit. Alternatively, a stand-alone electrolytic cell can be integrated into an existing on-board water system at a location before or after a strainer. In still other examples, water strainer lids having electrode arrangements and gas sensing capabilities integrated therewith can be designed to fit on the main housing bodies of existing strainers. Therefore, to provide a retrofit, all that is necessary is to replace the existing strainer lid of a strainer already installed in the on-board water system of the watercraft with a strainer lid having an integrated electrode arrangement. In this way, the existing strainer is retrofitted to have an integrated electrolytic cell suitable for generating biocide in situ with the on-board water system.

Figure 16:
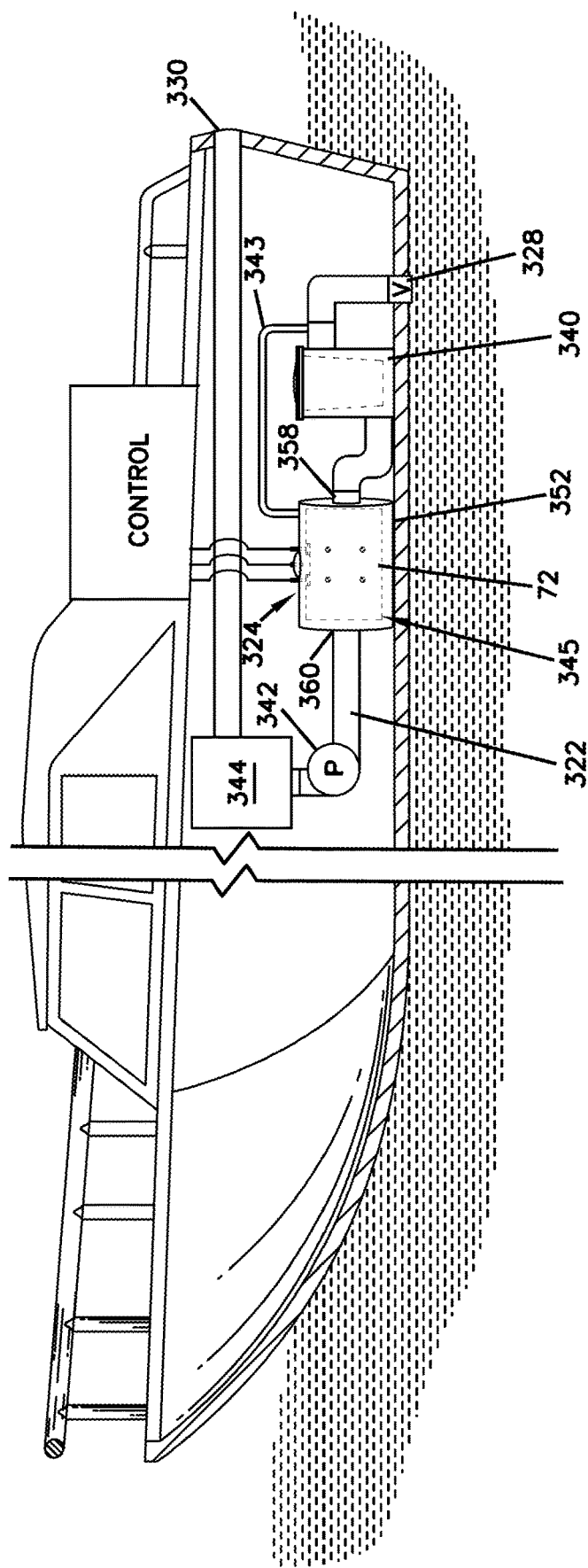
FIG. 16 illustrates a watercraft having an on-board water system incorporating another biocide generating system in accordance with the principles of the present disclosure.
Figure 17:
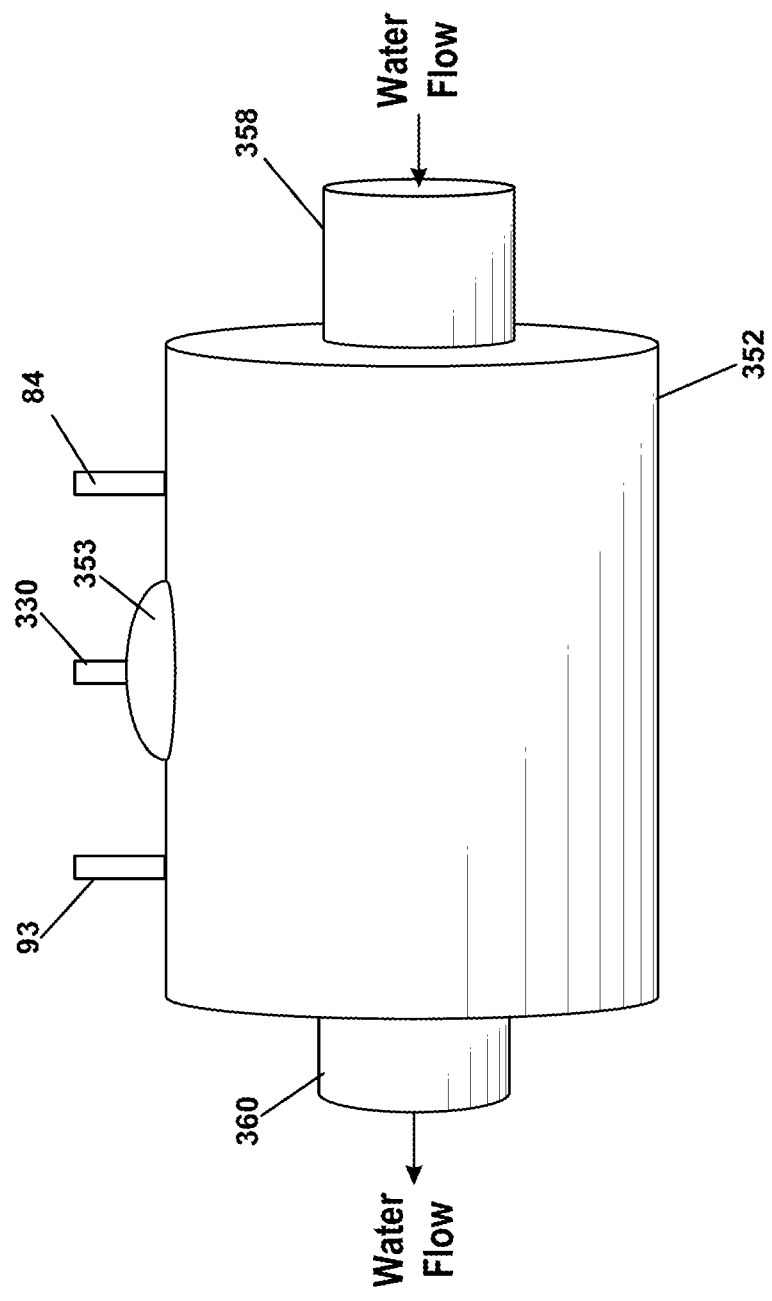
FIG. 17 depicts an electrolytic cell of the biocide generating system of FIG. 16.
Figure 18:
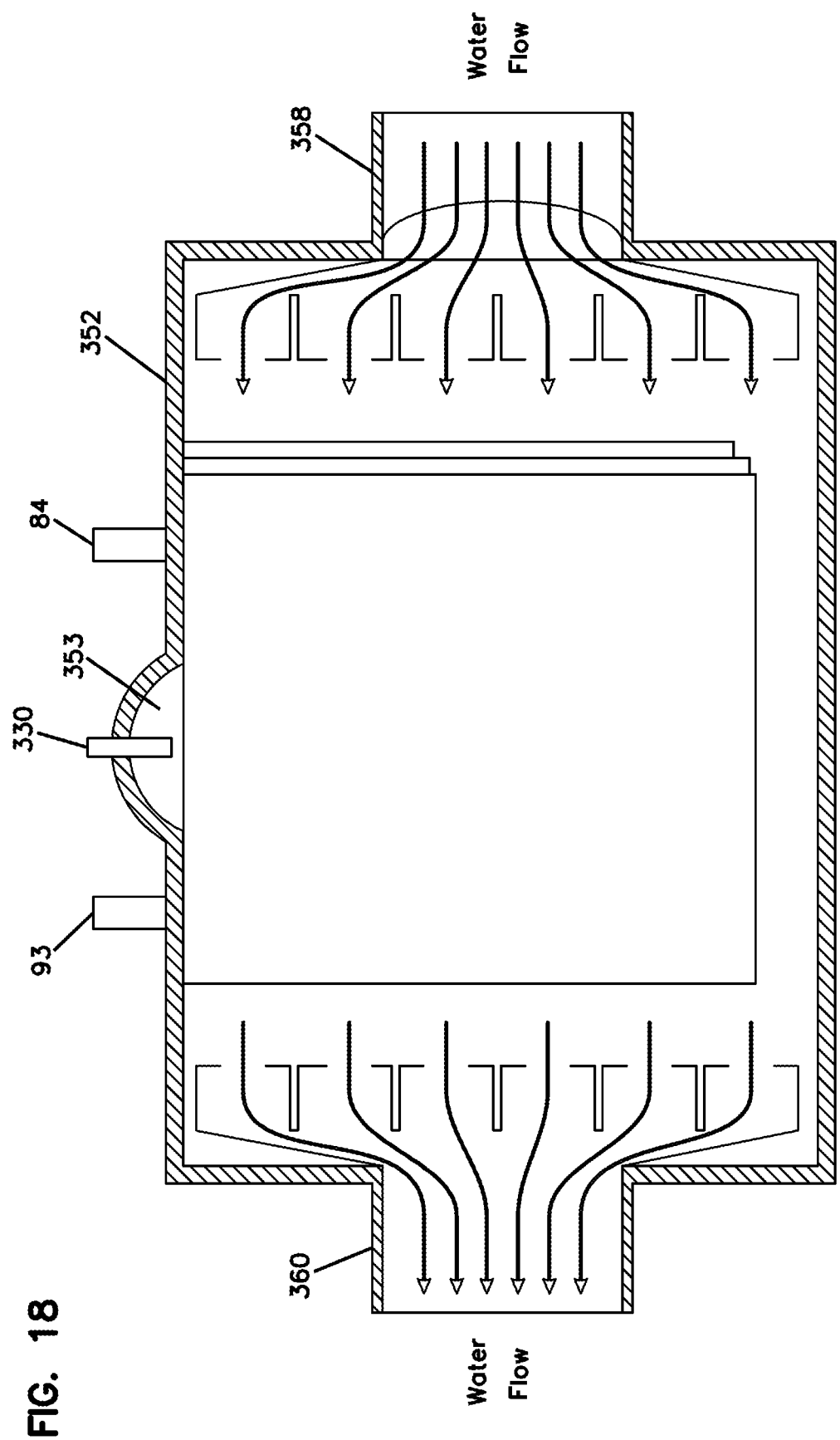
FIG. 18 is a cross-sectional view of the electrolytic cell of FIG. 17.
Figure 19:
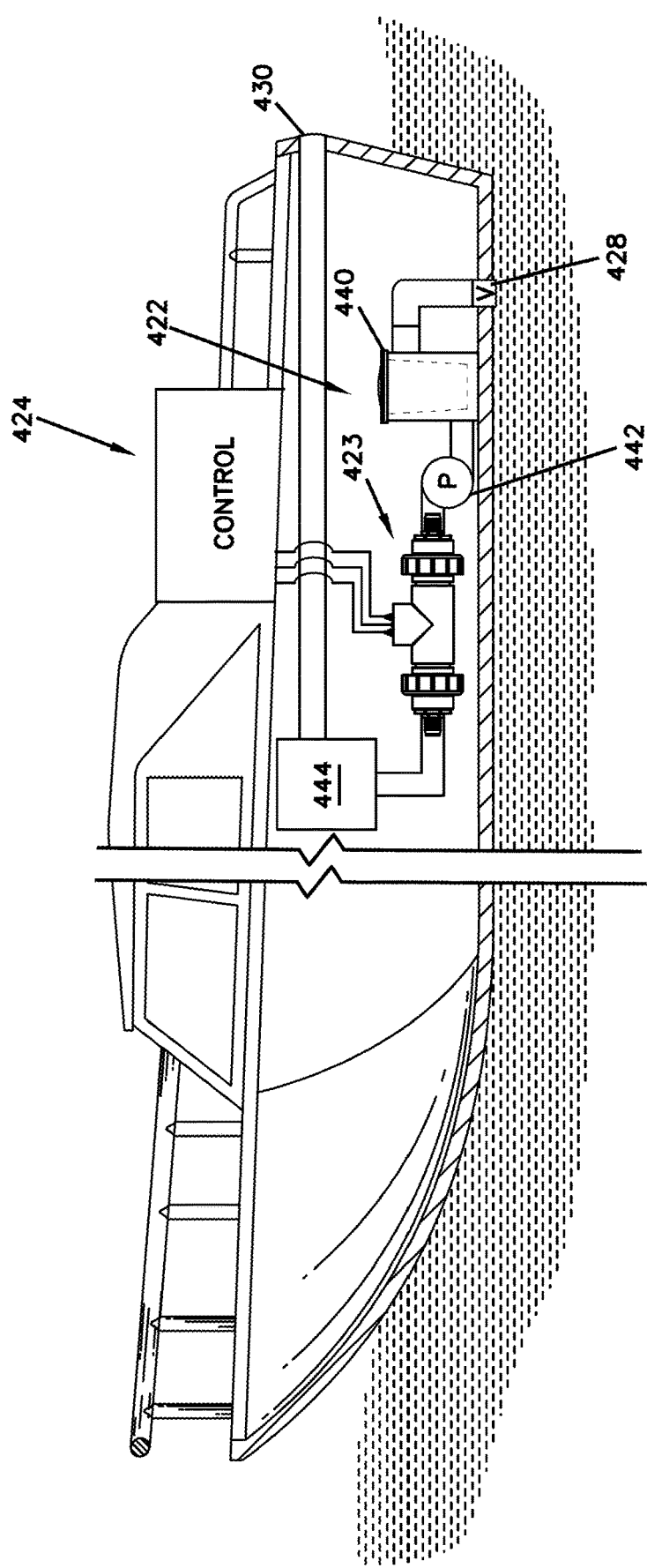
FIG. 19 depicts a watercraft having an on-board water system incorporating another biocide generating system in accordance with the principles of the present disclosure.

FIG. 16 shows another on-board water system having a biocide generating system 324 in accordance with the principles of the present disclosure. The biocide generating system 324 includes an electrolytic cell 345 incorporated within a stand-alone housing 352 (e.g., an in-line housing). The stand-alone housing 352 has been integrated into an on-board water system 322 at a location between a strainer 340 and a pump 342. The on-board water system 322 includes an inlet 328, an outlet 330, and equipment 344 in need of biocide to prevent the growth of bio-matter. The stand-alone housing 352 includes a water inlet 358 and a water outlet 360. The electrode arrangement 72 is mounted within the stand-alone housing 352. Baffles 375 can be provided for distributing the flow of water evenly through the electrode arrangement 72. The stand-alone housing 352 includes an upper gas collection location 353. A gas sensing electrode 330 is positioned at the gas collection location 353. The gas sensing electrode 330 projects through the housing 352 and can be coupled to a control system of the biocide generating system 324 by a lead. The terminal posts 84, 93 of the first and second electrodes 74, 76 also project through the housing 352 and are connected to a current source of the control system by leads. In certain examples, the current source is configured to apply a constant direct current across the first and second electrodes 74, 76 to drive electrolysis for generating biocide within the stand-alone housing 352. It will be appreciated that features of the control system of the biocide generating system 324 can be the same as those described with respect to the control system of the biocide generating system 24. The control system of the biocide generating system 324 can interface with the pump 342 to determine whether the pump 342 is on or off. When the control detects that the pump 342 is in an off state, the control can terminate power to the electrolytic cell 345. In other examples, the system may generate biocide intermittently or for controlled durations when water is not flowing through the system (e.g., as indicated by the flow sensor and/or gas detection sensor and/or the status of the pump) so that biocide generated at the electrolytic cell can move by diffusion to the portion of the water system located before the electrolytic cell to discourage bio-growth at this portion (e.g., the portion extending from the electrolytic cell, through the strainer 340 to the inlet 328). The biocide may also move by diffusion in a direction extending from the electrolytic cell toward the sea-water inlet of the water system. In certain examples, the system can be configured such that when the system continues to generate biocide while the pump is not operating, water from the electrolytic cell can move by gravity through at least a portion of the water system extending from the electrolytic cell, through the strainer toward the inlet. In this way, water containing biocide can move by gravity into the strainer to inhibit bio-growth in the strainer or other components of the water system located before the electrolytic cell. In other examples, the pump can be periodically reversed for a short period of time while the system continues to generate biocide so that water within the electrolytic cell containing biocide can be pumped in reverse direction from normal operation through at least a portion of the water system extending from the electrolytic cell, through the strainer toward the inlet. The valve corresponding to the inlet of the water system can remain open during reverse pumping. In certain examples, the pump is operated in reverse for a short enough time that the pump does not cavitate (i.e., the pump does not operate long enough to draw all the contained in the water system between the pump and the water outlet of the water system). In this way, water containing biocide can be periodically moved/pumped into the strainer and/or elsewhere in the water system before the electrolytic cell (e.g., through the pump for examples of the type depicted at FIG. 19 in which the pump is before the electrolytic cell) to inhibit bio-growth. In still another example, a separate flow line 343 (see FIG. 16) can be routed from a first location at the electrolytic cell or after the electrolytic cell to a second location at the strainer or before the strainer so that a portion of the water containing biocide can be directed through the flow line 343 to treat the strainer to inhibit bio-growth. In certain examples, one or more valves can be provided within the flow line 343. In certain examples, similar flow lines can be included to provide biocide treatment to other components of the water system located before the electrolytic cell (e.g., the pump for configurations of the type as shown in FIG. 19 where the pump is located before the electrolytic cell).

FIGS. 19-22 show another on-board water system 422 having a biocide generating system 424 in accordance with the principles of the present disclosure. The biocide generating system 424 includes an electrolytic cell unit 423 (i.e., a biocide generating unit) including an electrolytic cell 445 incorporated within a housing 452 (e.g., an in-line housing). The on-board water system 422 also includes an inlet 428, a strainer 440, a pump 442, equipment 444 and an outlet 430. A controller of the type previously described (e.g., controller 48) controls operation of the electrolytic cell unit 423. The housing 452 can be integrated into the on-board water system 422 at a location between the equipment 444 and the pump 442, although alternatives are possible. That is, the housing 452 and the electrolytic cell 445 may be mounted after the pump 442.

Figure 20:
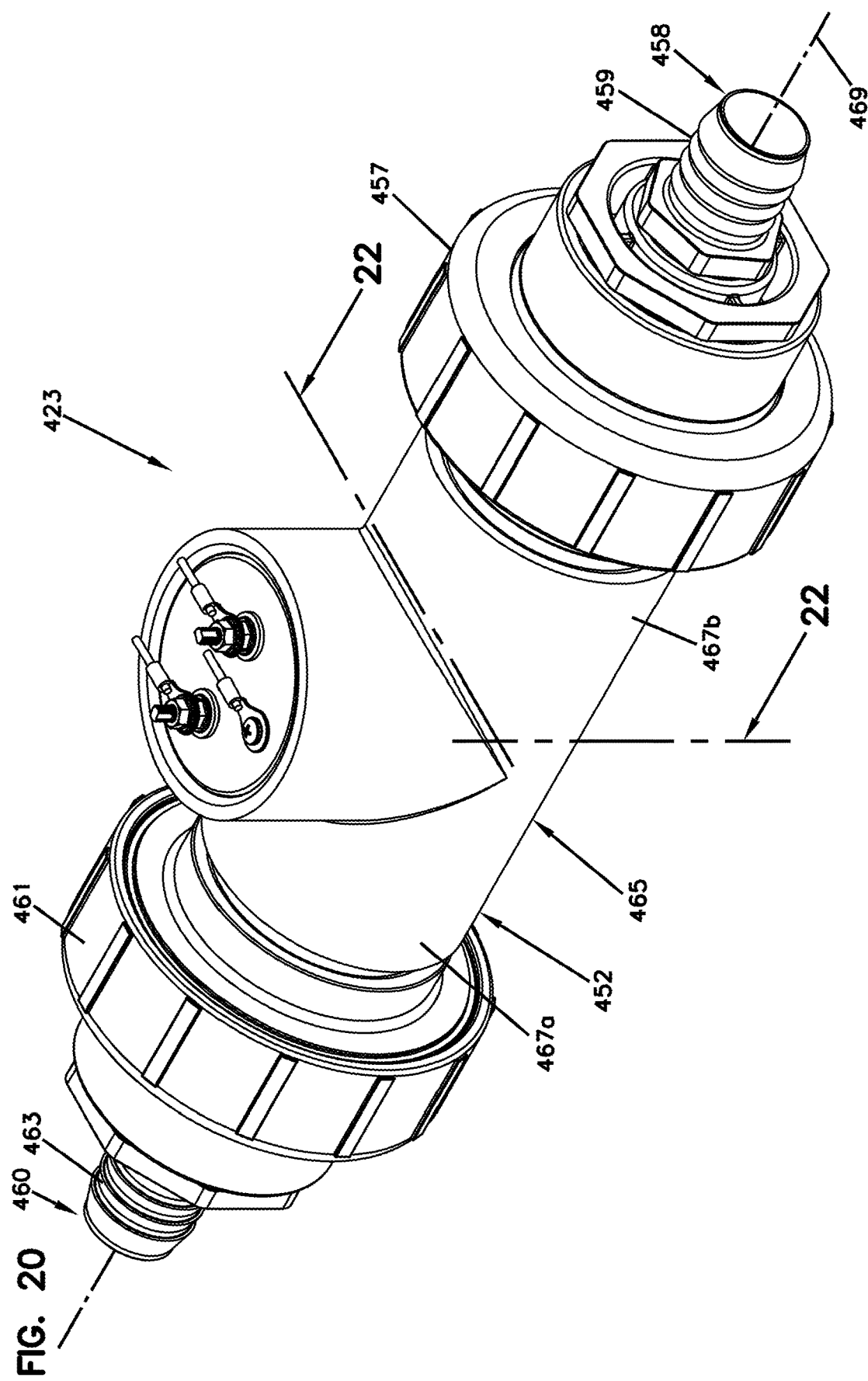
FIG. 20 is a perspective view of an electrolytic cell unit in accordance with the principles of the present disclosure.
Figure 21:
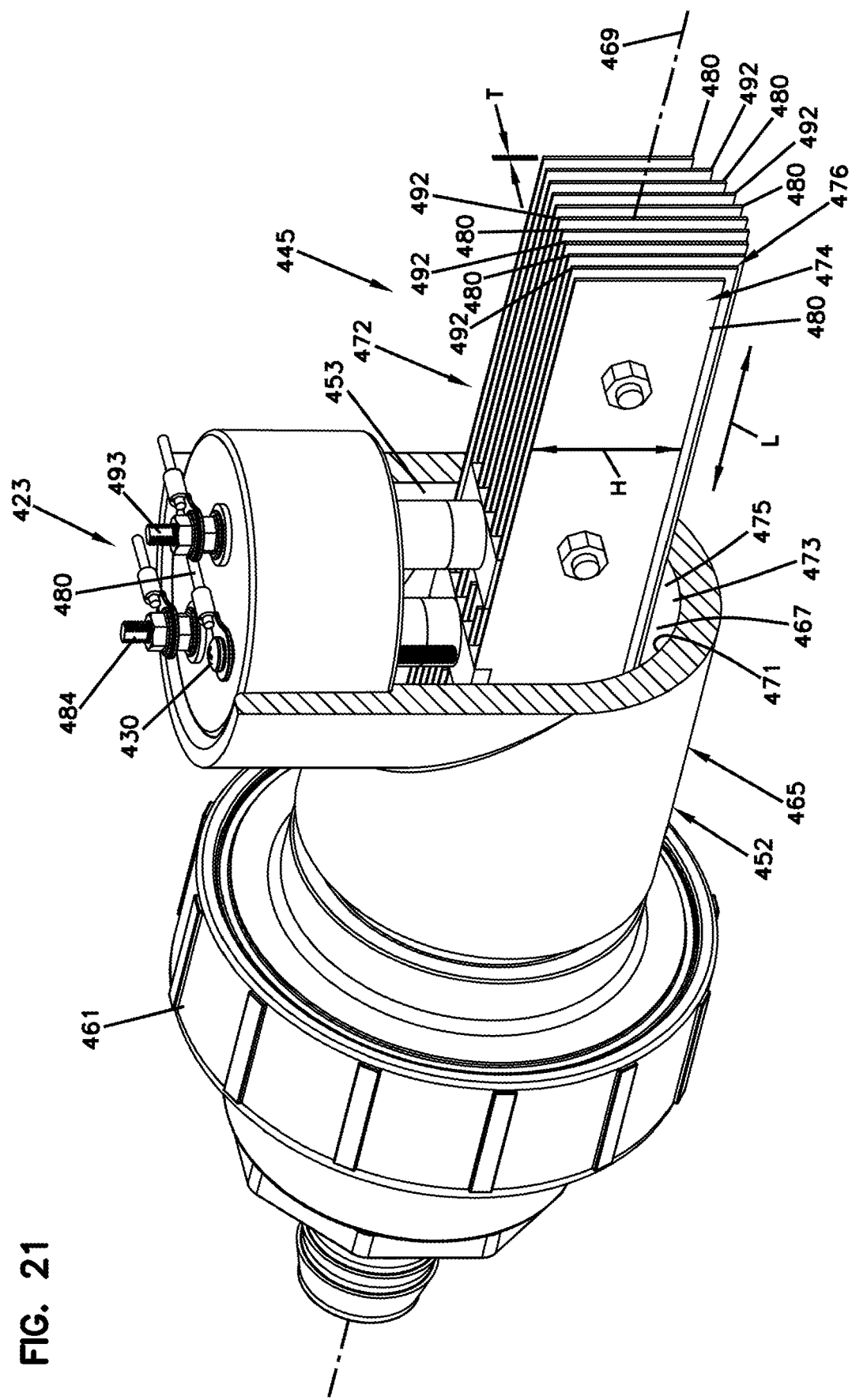
FIG. 21 is a cut-away view of the electrolytic cell unit of FIG. 20.
Figure 22:
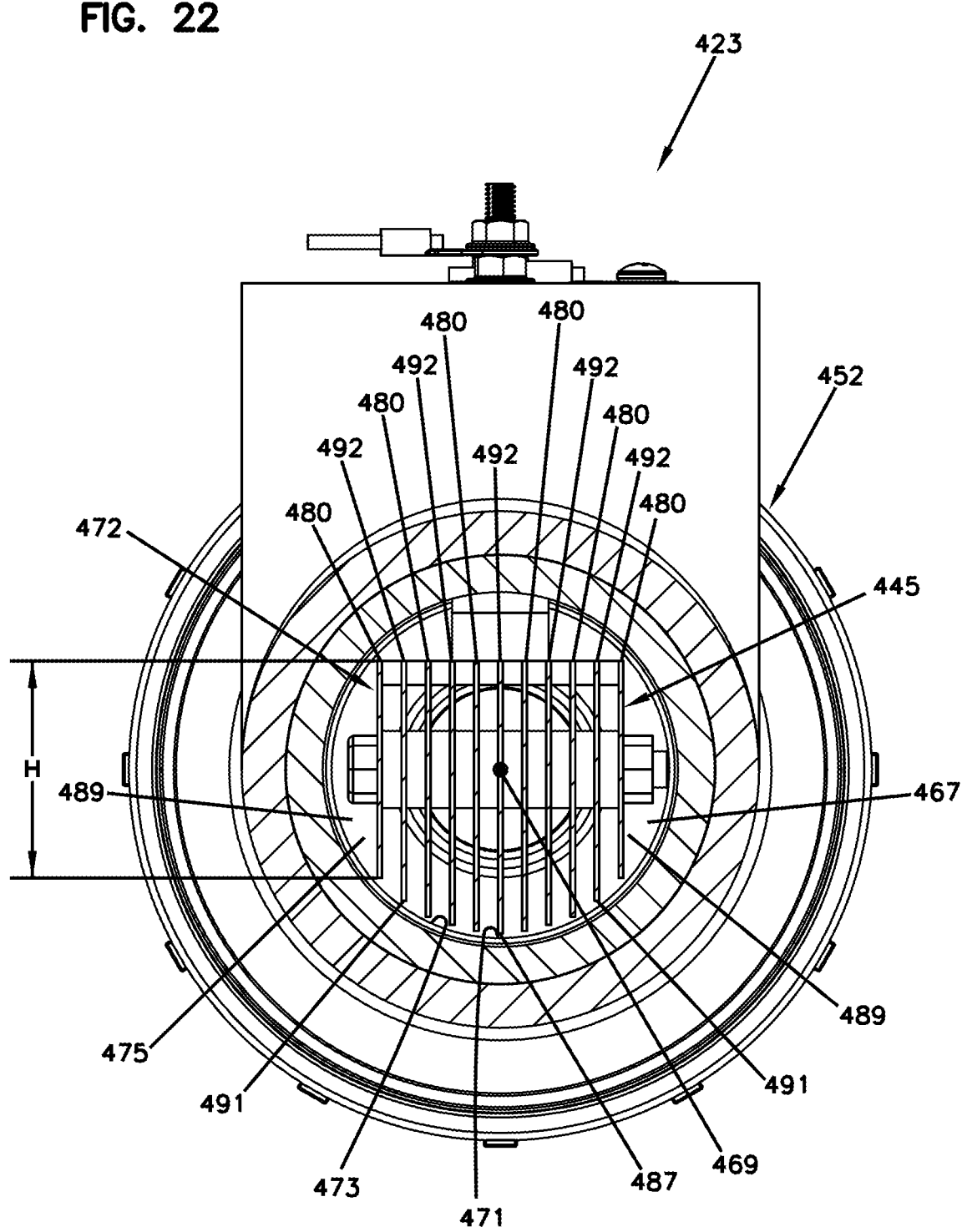
FIG. 22 is a cross-sectional view of the electrolytic cell unit of FIG. 20 taken along section line 22-22.

Referring to FIG. 20, the housing 452 includes a water inlet 458 and a water outlet 460. The water inlet and outlet 458, 460 are configured for allowing the housing 452 to be coupled/installed into the water system. In one example, the water inlet 458 can be defined at least in part by an end cap 457 and a fitting 459 (e.g., a hose fitting). Similarly, the water outlet 460 can be defined by an end cap 461 and a fitting 463 (e.g., a hose fitting). The end caps 457, 461 mount at opposite ends of a central housing structure 465 of the housing 452. The central housing structure 465 defines a flow passage 467 (see FIGS. 21 and 22) which extends linearly between the end caps 457, 461. The flow passage 467 extends along a longitudinal axis 469 of the housing 452. The longitudinal axis 469 extends between the inlet 458 and the outlet 460 and is parallel to a flow orientation/direction through the flow passage 467. As shown at FIGS. 21 and 22, the flow passage 467 has a transverse cross-sectional flow area 475 defined by a flow area boundary 471. The flow area boundary 471 includes at least one curved portion 473 that curves about the longitudinal axis 469. In one example, the flow passage 467 includes a portion or portions that are cylindrical (see cylindrical portions 467a, 467b). The flow area 475 within the cylindrical portions 467a, 467b is defined by a cylindrical flow area boundary 471 having a cylindrical curved portion that circumscribes the longitudinal axis 469. The transverse cross-sectional flow area 475 is the area defined by the flow passage 467 when in a cross-sectional plane perpendicular to the longitudinal axis 469.

Referring to FIGS. 21 and 22, an electrode arrangement 472 is mounted within the central housing structure 465 of the housing 452. A mid-region of the central housing structure 465 includes an upper gas collection location 453 positioned above the electrode arrangement 472. A gas sensing electrode 430 is positioned at the gas collection location 453. The gas sensing electrode 430 projects through the housing 452 and can be coupled to the controller of the biocide generating system 424 by a lead. Terminal posts 484, 493 of the electrode arrangement 472 also project through the housing 452 and are connected to a current source of the controller by leads. In certain examples, the current source is configured to apply a constant direct current across first and second electrodes 474, 476 to drive electrolysis for generating biocide within the stand-alone housing 452.

As described above, the electrode arrangement 472 includes the first electrode 474 and the second electrode 476. The first electrode 474 includes a plurality of parallel first electrode plates 480 electrically coupled to the terminal post 484. The second electrode 476 includes a plurality of parallel second electrode plates 492 electrically coupled to the terminal post 493. The second electrode plates 492 are positioned between the first electrode plates 480 and spaced-apart in relation relative to the first electrode plates 480 such that interstitial space exists between each of the first electrode plates 480 and a corresponding one of the second electrode plates 492. In certain examples, each of the electrode plates includes an electrically conductive material such as a metal material as described above. In certain examples, a catalyst coating of the type previously described herein may be applied to the electrode plates. In certain examples, the outside surface of the outermost electrode plates in the electrolytic cell are not coated with catalyst to help reduce and/or eliminate scale build-up.

As shown at FIGS. 21 and 22, the electrode arrangement 472 is provided with a staggered end configuration adapted to allow at least one end of the electrode arrangement 472 to match (e.g., complement, follow, coincide with) the contour of the curved portion 473 of the flow area boundary 471 defining the transverse cross-sectional flow area 475 of the flow passage 467. The anode and cathode plates 480, 492 each have a length L that extends along the longitudinal axis 469, a height H is perpendicular relative to the length L, and a thickness T that perpendicular to both the height H and the length L. The heights H extend across the transverse cross-sectional flow area 475. The plates 480, 492 are sized with different heights to facilitate staggering the ends of the plates 480, 492 at one or more ends of the electrode arrangement 472 (e.g., the lower end is shown with a staggered configuration as shown at FIG. 22). The plates 480, 492 adjacent the center of the electrode arrangement 472 have the longest heights and the plates 480, 492 at the outsides of the electrode arrangement 472 have the shortest heights. The plates 480, 492 gradually transition in height from large to small in directions extending from a center 487 of the electrode arrangement 472 to outsides 489 of the electrode arrangement 472. Ends 491 (e.g., lower ends as shown at FIG. 22) of the plates 480, 492 are staggered relative to one another so as to follow the contour of the curved portion 473. For example, the ends 491 define a profile that follows the profile of the curved portion 473. The staggering allows the plates 480, 492 to more fully extend across the full cross-sectional area of the transverse cross-sectional flow area 475 so that a larger catalyzed plate surface area can be provided within the housing 452 as compared to if the plates all had the same lengths. This can assist in extending the operating life of the electrode arrangement 472. In other words, by providing the central plates with longer heights, the central plates can extend into a lower portion of the flow passage that would otherwise be unoccupied if the central plates had the same heights as the outermost plates. Such optimization of plate size, substantially increases the electrode surface area, and therefore, increases generation of biocide at lower current levels.

Figure 23:
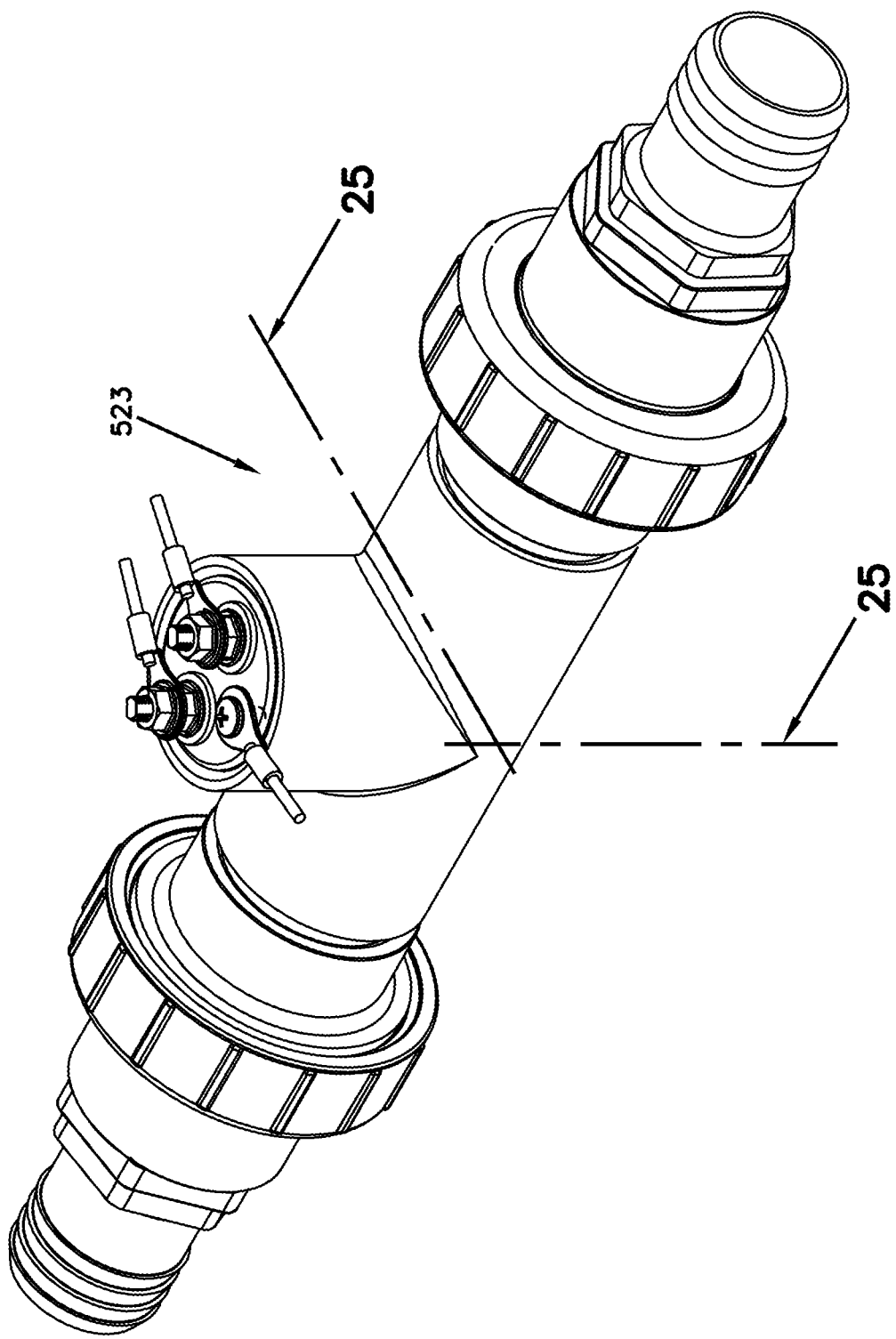
FIG. 23 is a perspective view of another electrolytic cell unit in accordance with the principles of the present disclosure.
Figure 24:
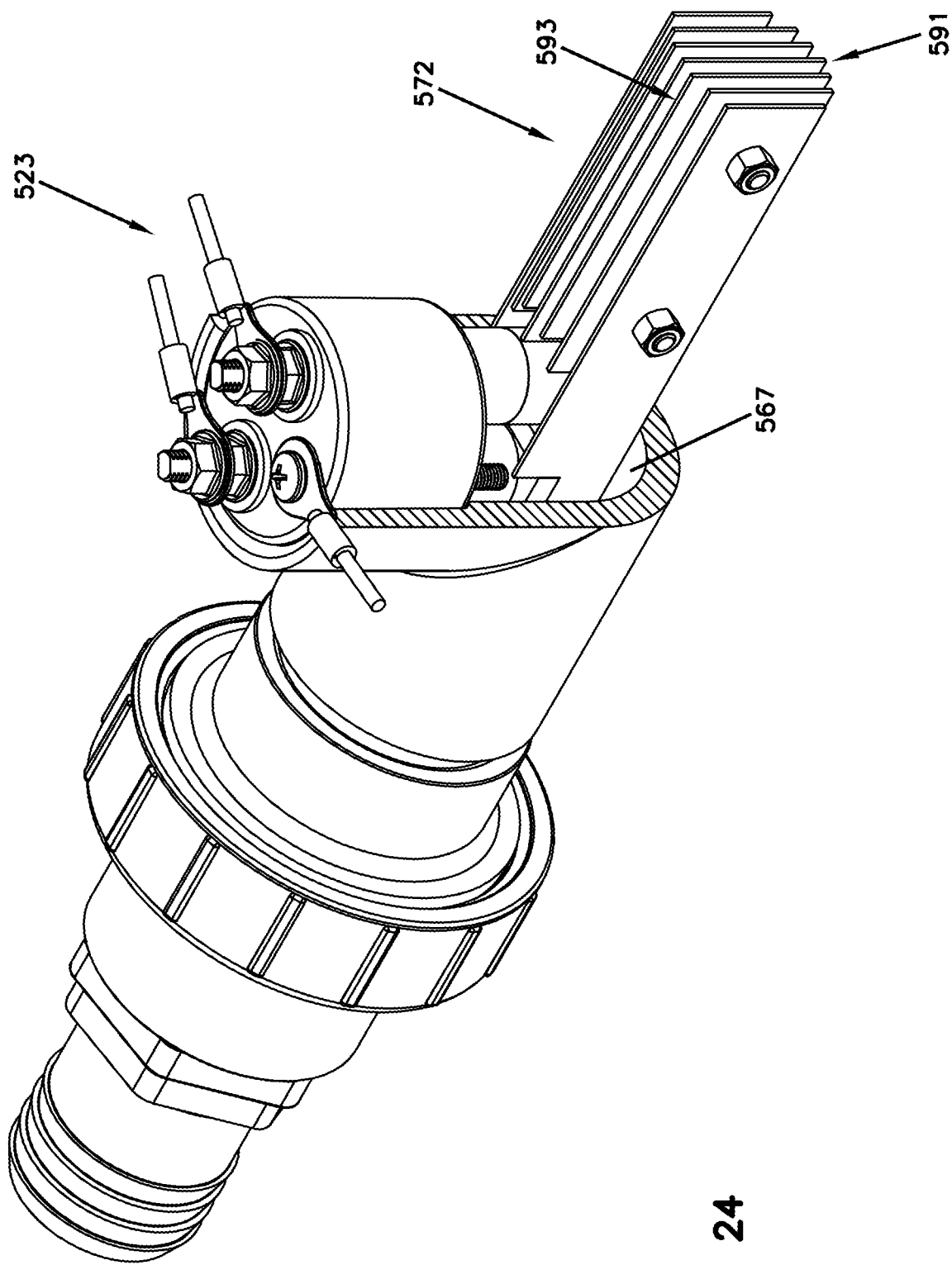
FIG. 24 is a cut-away view of the electrolytic cell unit of FIG. 23.
Figure 25:
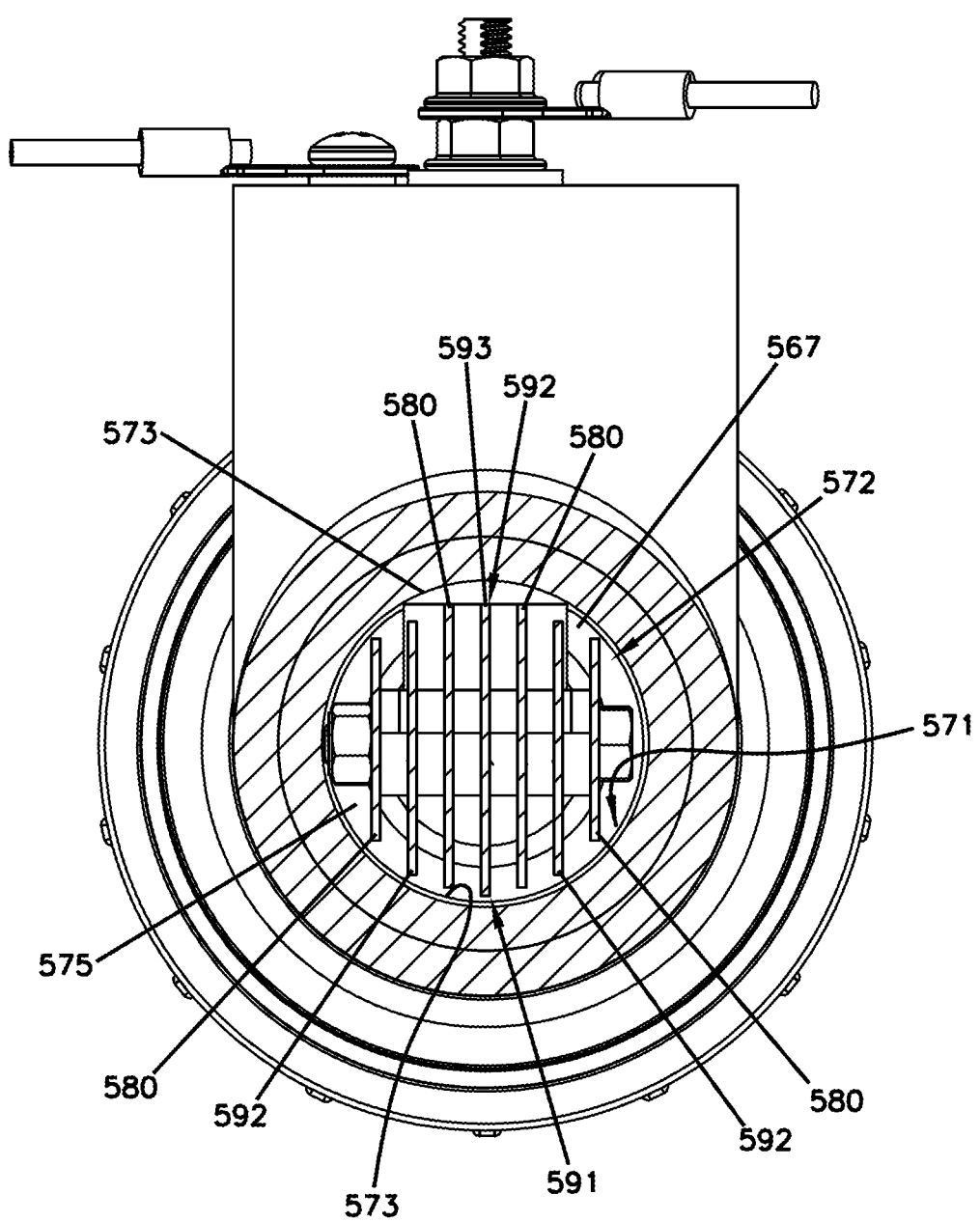
FIG. 25 is a cross-sectional view of the electrolytic cell unit of FIG. 23 taken along section line 25-25.

FIGS. 23-25 depict another electrolytic cell unit 523 in accordance with the principles of the present disclosure. The electrolytic cell 523 has the same basic components and mode of operation as the electrolytic cell 423, except the electrolytic cell 523 has an electrode arrangement 572 having first and second opposite ends 591, 593 (e.g., lower and upper ends as depicted) each having a staggered configuration. The electrode arrangement 572 includes first electrode plates 580 having differing heights and second electrode plates 592 having differing heights. The plates 580, 592 are interleaved. The heights of the plates 580, 592 gradually decrease in directions extending from the central plates to the outermost plate of the electrode arrangement 572. The ends of the plates 580, 592 at the first and second ends 591, 593 of the electrode arrangement 572 are staggered relative to one another to follow a cylindrical contour 573 of a boundary 571 defining a flow passage area 575 of a flow passage 567 that extends through the electrolytic cell unit 523.

It will be appreciated that the "height" of an electrode plate corresponds to the dimension of the electrode plate which extends across the flow area of the flow passage. In the depicted examples, the "heights" are oriented vertically. In other examples, the "heights" may be oriented horizontally or may be angled relative to vertical.

FIGS. 30-41 show another electrolytic cell unit 823 (i.e., a biocide generating unit) in accordance with the principles of the present disclosure. The electrolytic cell unit 823 includes an electrolytic cell 845 incorporated within a housing 852. The housing 852 can be integrated into a water system (e.g., an on-board water system of a boat) at a location between the equipment and the pump similar to the positioning of the housing 452 within the system of FIG. 19. The electrolytic cell 845 includes an electrode unit 802 including first and second electrodes 874, 876, In use, electrical current flows between the electrodes 874, 876 through seawater flowing between the electrodes 874, 876 causing biocide to be generated within sea water via electrolysis. The electrolytic cell unit 823 is configured to minimize the occurrences and/or sizes of low-flow regions (regions that encounter minimal to low water flow during operation of the unit) within the housing 852. To enhance the uniformity of flow throughout the housing 852, one or more baffles (e.g., see baffle 835) can be used to prevent water from "short-circuiting" directly from the inlet to the outlet of the housing. Additionally, an inner profile of the housing 852 and an outer profile of the electrode unit 802 can be designed to generally match each other to inhibit water "short circuiting" paths between the housing inlet and outlet, to minimize dead flow zones within the housing, and to encourage flow between electrode plates of the electrode unit 802. The features to enhance flow uniformity improve the biocide generation efficiency of the electrolytic cell and also assist in inhibiting the accumulation of scale within the unit.

Figure 31:
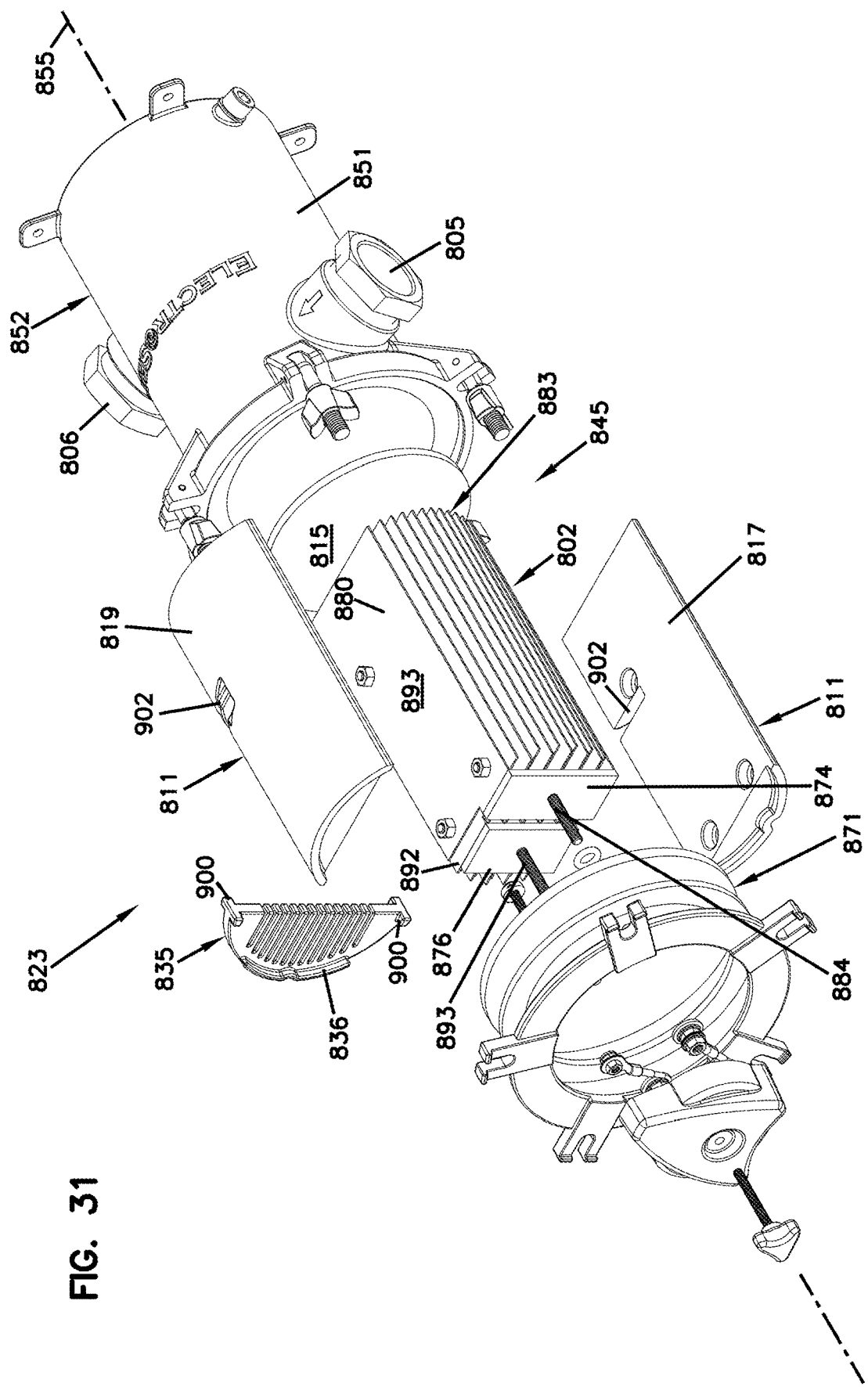
FIG. 31 is an exploded view of the electrolytic cell unit of FIG. 30.
Figure 32:
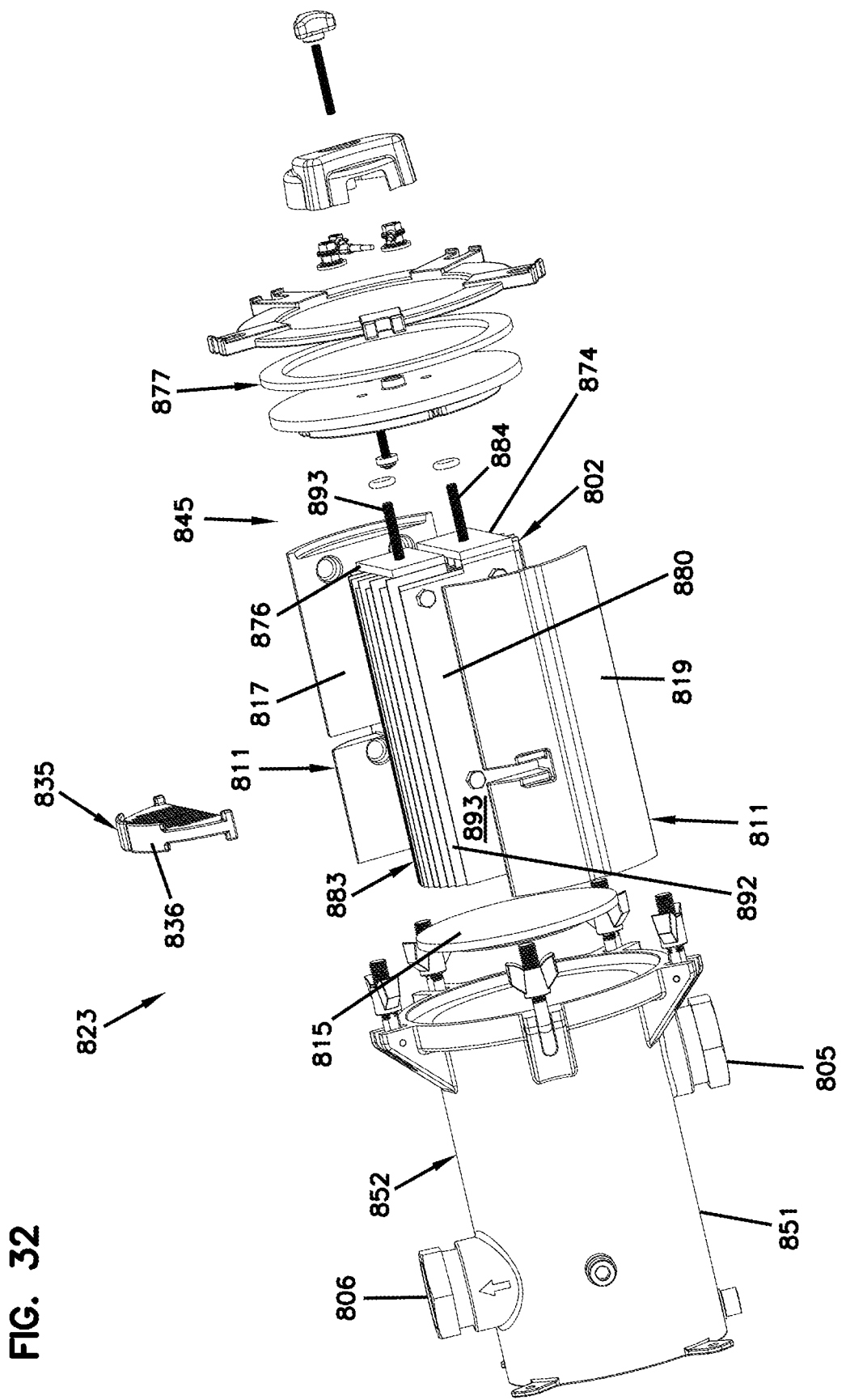
FIG. 32 is another exploded view of the electrolytic cell unit of FIG. 30.
Figure 38:
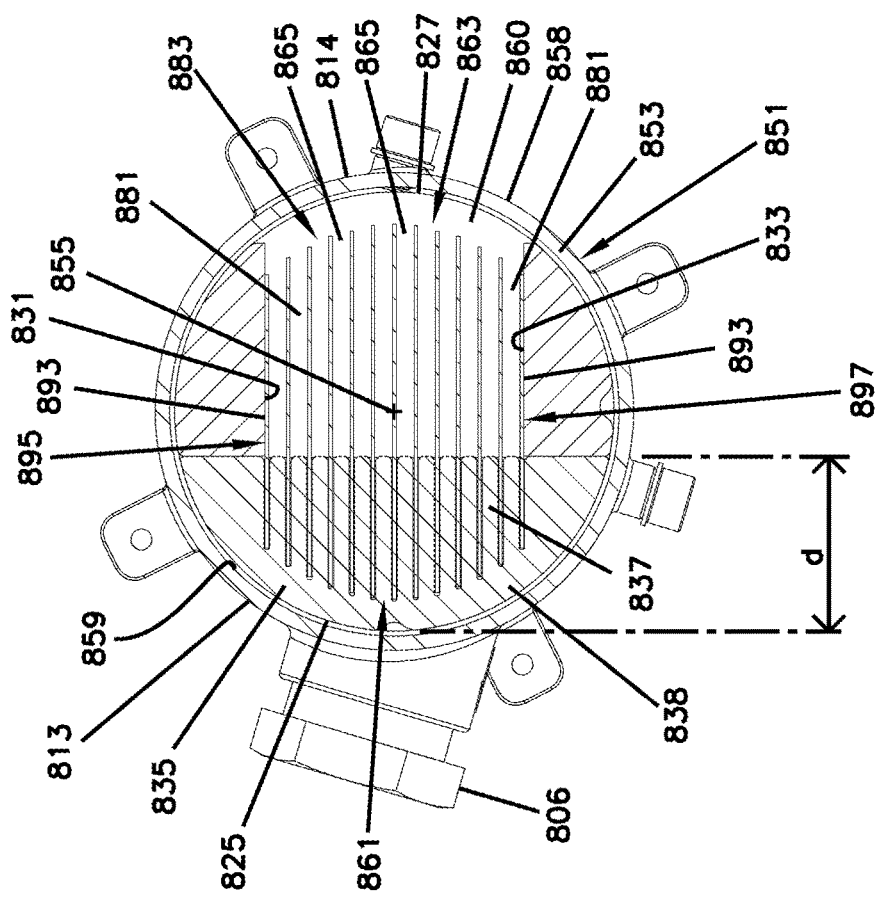
FIG. 38 is another transverse cross-sectional view of the electrolytic cell unit of FIG. 30 which is cut through the interior baffle.
Figure 37:
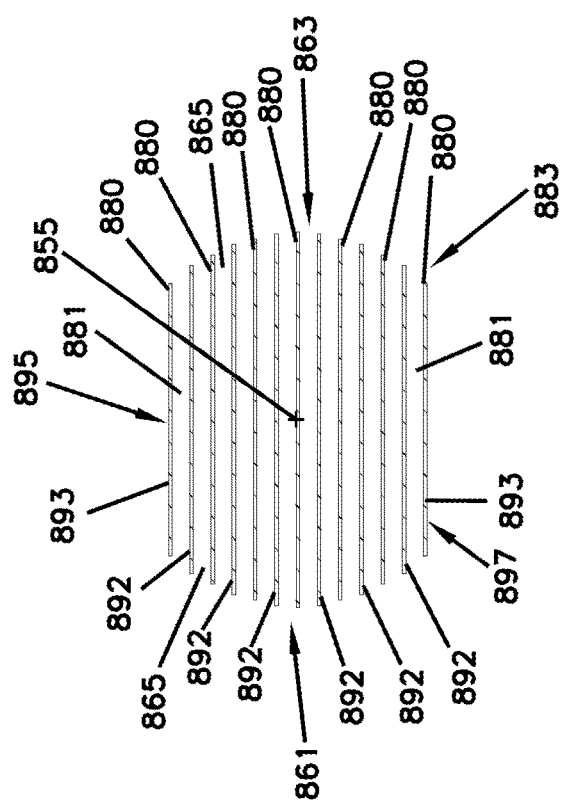
FIG. 37 is a transverse cross-sectional view of an example electrode plate arrangement suitable for use with the electrolytic cell unit of FIG. 30, the cross-sectional view shows a cross-sectional profile or form factor of the electrode plate arrangement.
Figure 39:
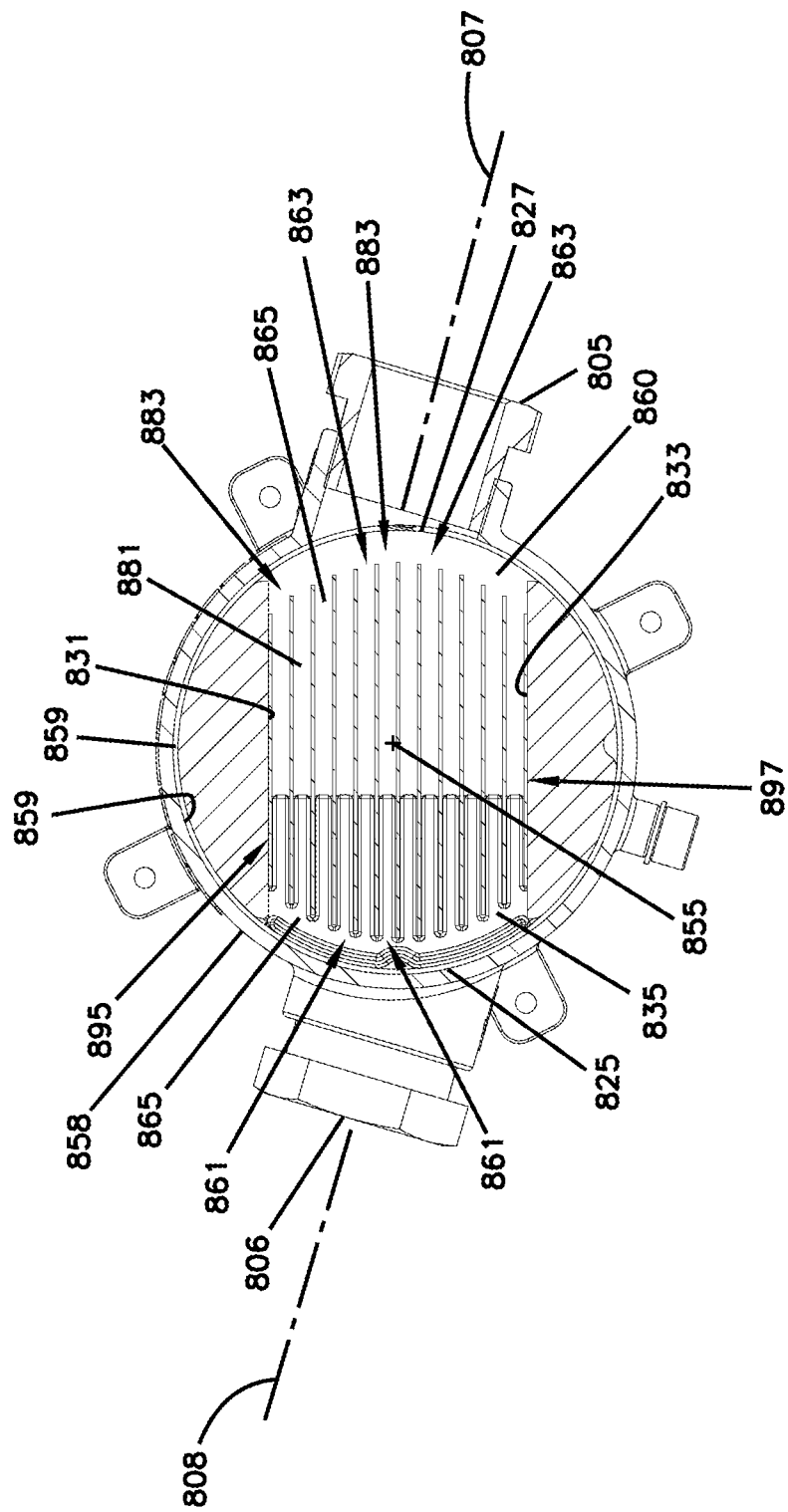
FIG. 39 is another transverse cross-sectional view of the electrolytic cell of FIG. 30 showing the relative positioning of the electrode plate arrangement with respect to the inlet and the outlet of the electrolytic cell.

The first electrode 874 of the electrode unit 802 includes a plurality of parallel first electrode plates 880 (see FIGS. 35 and 37) electrically coupled to a terminal post 884 (see FIGS. 31 and 32). The second electrode 876 of the electrode unit 802 includes a plurality of parallel second electrode plates 892 (see FIGS. 35 and 37) electrically coupled to a terminal post 893 (See FIGS. 31 and 32). The first and second electrode plates 880, 892 are arranged in a plate arrangement 883 (see FIGS. 35 and 37) in which the first and second plates 880, 892 are interleaved with one another to form a plate stack. Within the plate arrangement/stack 883, the first and second electrode plates 880, 892 are alternated with respect to one another and are positioned in spaced-apart relation with respect to one another such that interstitial space 881 (e.g., gaps) exists between adjacent ones of the first and second electrode plates 880, 892 in the stack. In certain examples, each of the electrode plates 880, 892 includes an electrically conductive material such as a metal material as described above. In certain examples, a catalyst coating of the type previously described herein may be applied to the electrode plates 880, 892. In certain examples, major outside surfaces 893 of the outermost electrode plates in the electrolytic cell are not coated with catalyst to help reduce and/or eliminate scale build-up. As shown at FIGS. 37-39, the plate arrangement 883 defines an outer form-factor (e.g., outer shape or transverse cross-sectional profile) having opposite planar sides 895, 897 defined by the major outer surfaces 893, and opposite rounded sides 861, 863 defined by staggered ends of the electrode plates 880, 892. The outer form-factor extends axially between opposite axial ends of the plate arrangement 883. The terminal posts 884, 893 are mounted at one of the axial ends. The interstitial spaces 881 have open ends 865 at the opposite sides 861, 863.

The housing 852 includes a canister 851 having a main body 853 that extends along a central axis 855 between first and second axial ends 856, 857. The main body 853 has cylindrical outer and inner shapes 858, 859 that encircle the central axis 855. A removable lid 877 mounts at the first axial end 856 and an end wall 879 encloses the second axial end 857. The end wall 879 can be unitary with the main body 853. The electrode unit 802 can be mounted to and carried with the lid 877.

Figure 40:
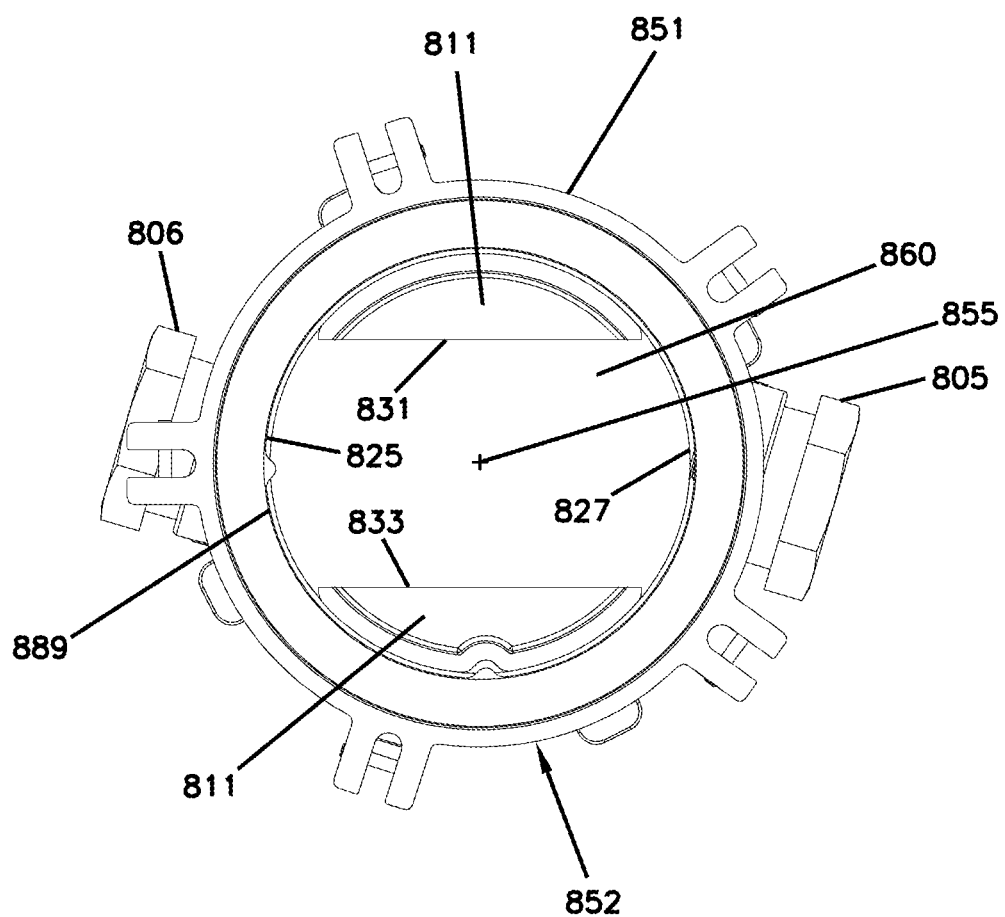
FIG. 40 is a top end view of the electrolytic cell of FIG. 30 with a top lid removed.
Figure 41:
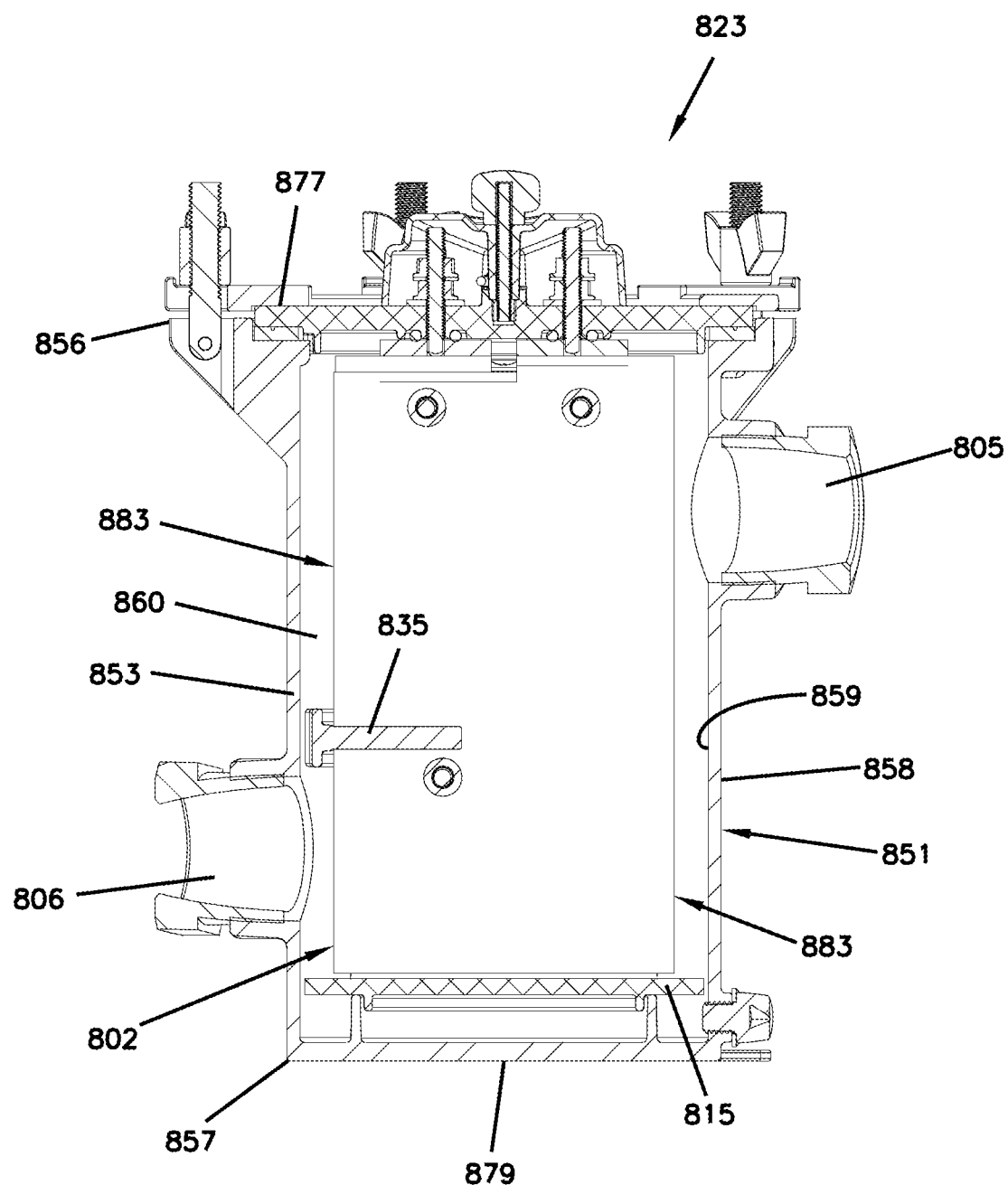
FIG. 41 is a cross-sectional view of the electrolytic cell of FIG. 30 showing the relative axial positioning of the baffle with respect to the inlet and the outlet of the electrolytic cell.

A central cavity 860 (FIGS. 38 and 40) extends through the main body 853 between the first and second ends 856, 857. The central cavity 860 is sized to receive the plate arrangement 883 of the electrode unit 802. Preferably, as shown at FIGS. 38-40, the cavity 860 has a form factor with a transverse cross-sectional profile that generally matches the outer form factor of the plate arrangement 883. For example, the cavity 860 includes opposing planar sides 831, 833 that correspond to the planar sides 895, 897 of the form factor of the plate arrangement 883, and also includes opposing rounded sides 825, 827 that correspond to the rounded sides 861, 863 of the form factor of the plate arrangement 883. In one example, the planar sides 831, 833 of the cavity 860 are defined by fillers 811 (e.g., inserts) (see FIGS. 31, 32 and 34-36) installed within the interior of the main body 853 of the canister 851. The fillers 811 extend axially along the central axis 855 and include planar surfaces 817 (see FIGS. 31 and 32) defining the planar sides 831, 833 and curved surfaces 819 (see FIGS. 31 and 32) that match the curved inner shape 859 of the main body 853 of the canister 851. In other examples, the fillers 811 can be integrally formed or unitary with the main body 853 of the canister 851.

Figure 33:
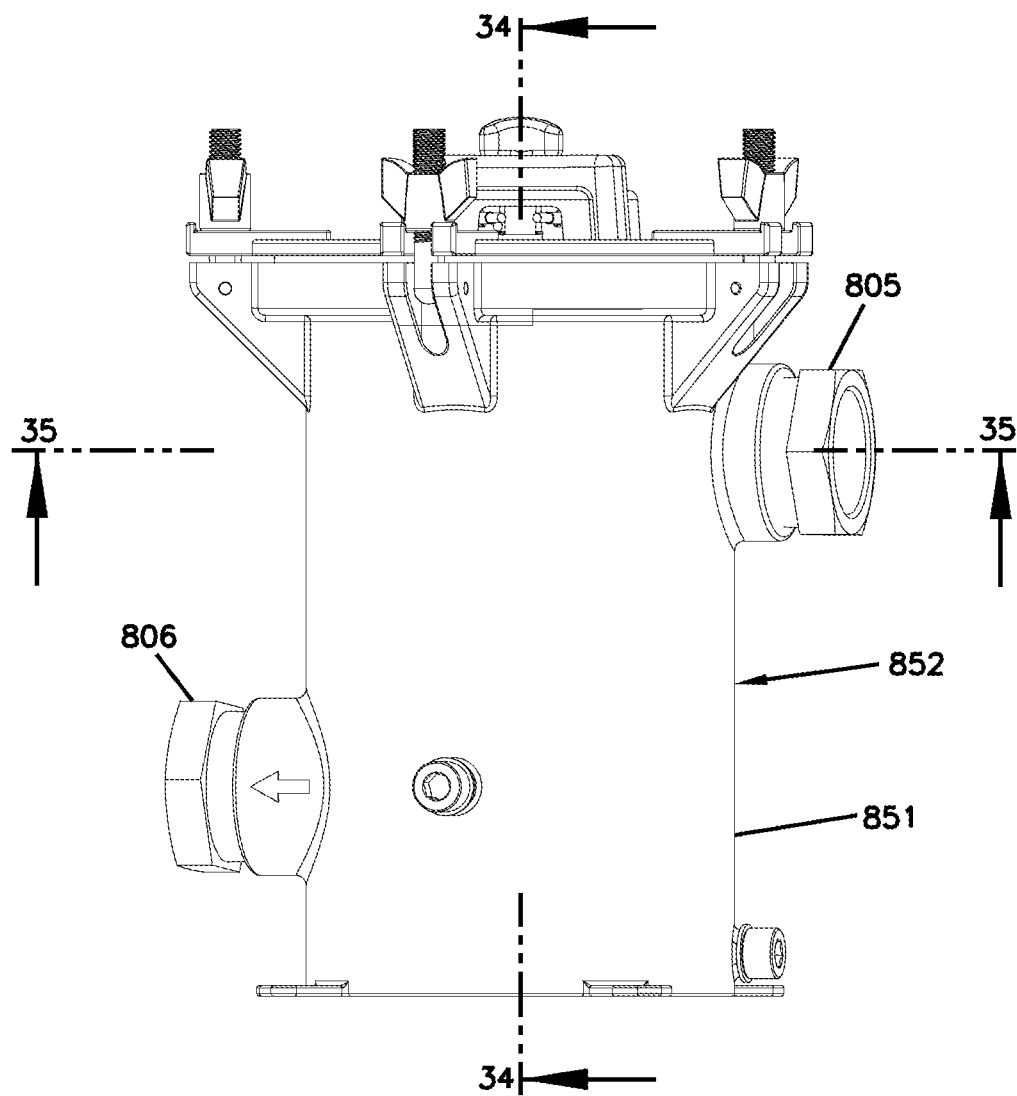
FIG. 33 is an elevational view of the electrolytic cell unit of FIG. 30.
Figure 36:
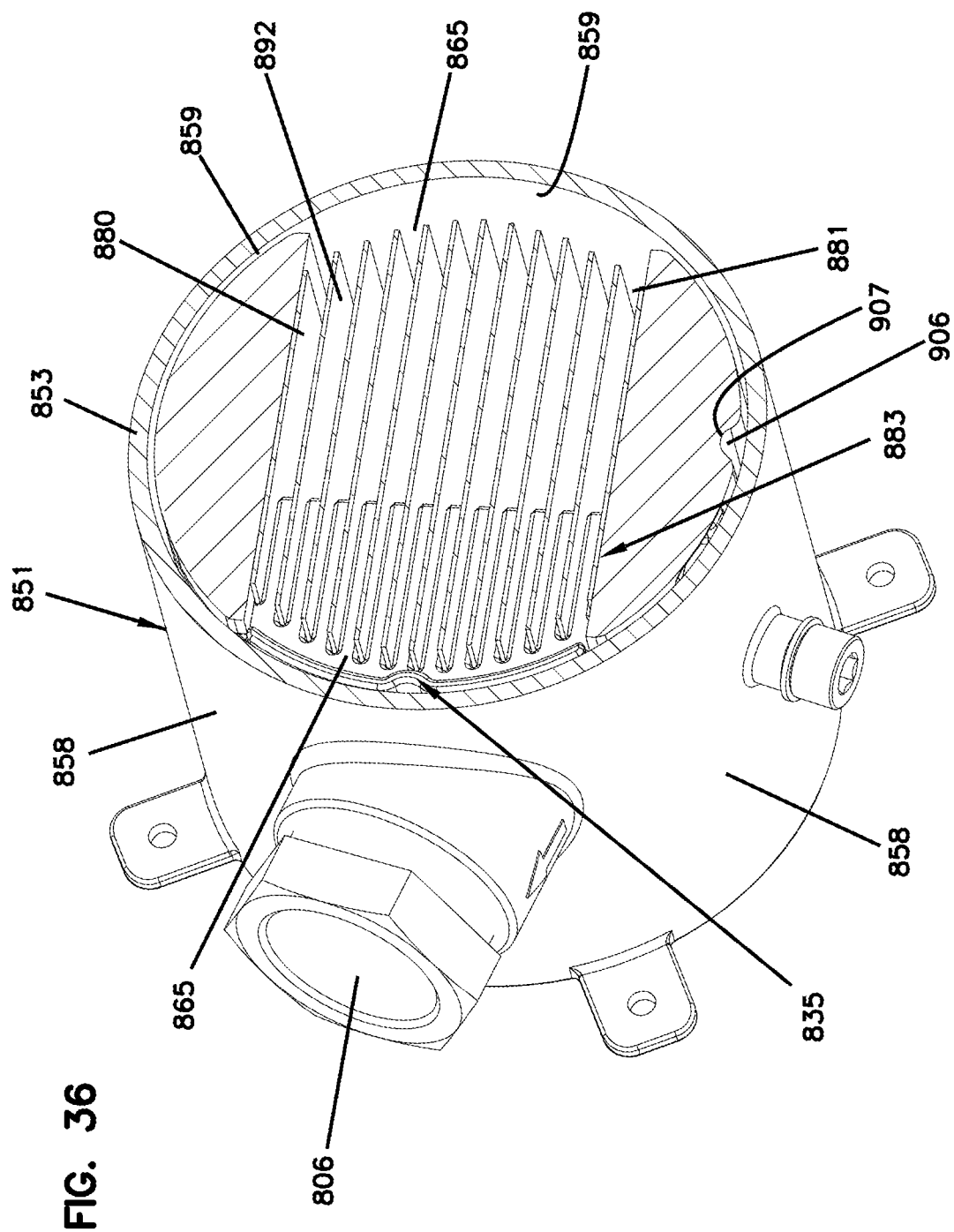
FIG. 36 is a transverse cross-sectional view of the electrolytic cell unit of FIG. 30 showing an interior flow distribution baffle.

The housing 852 also includes a water inlet 805 and a water outlet 806 (see FIG. 33). The water inlet 805 and water outlet 806 can be formed in part by fittings coupled to the main body 853 of the canister 851. The water inlet 805 and the water outlet 806 are offset from one another in an axial orientation that extends along the central axis 855 (e.g., the inlet and the outlet are positioned at different axial heights—a first height location and a second height location, respectively—or different axial positions along the axis of the housing 852) so as to not have an in-line configuration and are preferably positioned on opposite sides of the axis 855 and opposite sides of the housing 852 (see FIG. 39). The water inlet 805 defines an inlet axis 807 (see FIG. 39) and the water outlet 806 defines an outlet axis 808 (see FIG. 39). The water inlet 805 is at the rounded side 827 of the cavity 860 and faces the rounded side 863 of the form factor of the plate arrangement 883. The water outlet 806 is at the rounded side 825 of the cavity 860 and faces the rounded side 861 of the form factor of the plate arrangement 883. The electrode plates 874, 876 are canted at an oblique angle relative to the inlet axis 807 and the outlet axis 808. The open ends 865 of the interstitial spaces 881 face toward the inlet 805 and the outlet 806.

The electrolytic cell unit 823 further includes the baffle 835 (see FIGS. 31, 32, 36, 38 and 41) for preventing water from short circuiting through the housing 852 from the inlet 805 to the outlet 806. The baffle 835 also can be referred to as a flow diverter. The baffle 835 is preferably mounted within the cavity of the housing 852 at a location opposite from the inlet 805 and at the same general side as the outlet 806 (see FIGS. 39 and 41). The baffle 835 is positioned at an axial location (e.g., a third height location) along the axis 855 that is between the axial location (first height location) of the inlet 805 and the axial location (second height location) of the outlet 806 (see FIG. 41). As shown at FIG. 38, the baffle 835 has a comb-like structure with a rounded base 836 that conforms to the curved inner shape 859 of the main body 853 of the canister 851. The baffle 335 also includes comb teeth 837 (see FIG. 38) that fit between the electrode plates 880, 892 within the interstitial spaces 881. The baffle 335 projects inwardly from the main body 853 of the canister 851 toward the central axis 855 and preferably does not intersect the central axis 855. The teeth 837 block the interstitial spaces 881 and also maintain spacing between the electrode plates. As shown at FIG. 38, the baffle 335 has a depth d that extends into the interstitial spaces 881 from a first side 813 of the housing 852 corresponding to the outlet 806 toward a second side 814 of the housing 852 corresponding to the inlet 805. Preferably the depth d does not reach the central axis 855 of the housing 852 such that a terminal inner edge of the baffle 335 is between the first side 813 of the housing 852 and the central axis 855. Preferably, the depth d extends at least 50 percent of the distance between the first side 813 and the central axis 855. In one example, the baffle 335 connects to the fillers 811 such that fillers 811, the electrode plates 880, 892 and the baffle 335 are secured together as a unit that can be inserted into the canister 851 through an open end of the canister 851 formed when the lid of the canister 851 is removed. The baffle 335 can connect to the fillers 811 by a snap-fit connection. For example, retaining portions 900 of the baffle 335 can snap within receptacles 902 defined by the fillers 811. At least one of the fillers 811 and/or the baffle 835 can be keyed relative to the housing 852 to ensure the electrolytic unit is loaded into the housing 852 at the proper rotational orientation (e.g., see FIG. 36 where key 906 is shown fitting within keyway 907). The electrolytic cell 823 further includes an end plate 815 (see FIG. 41) that covers the axial end of the plate arrangement 883 adjacent to the end wall 879 of the housing 852.

Figure 43:
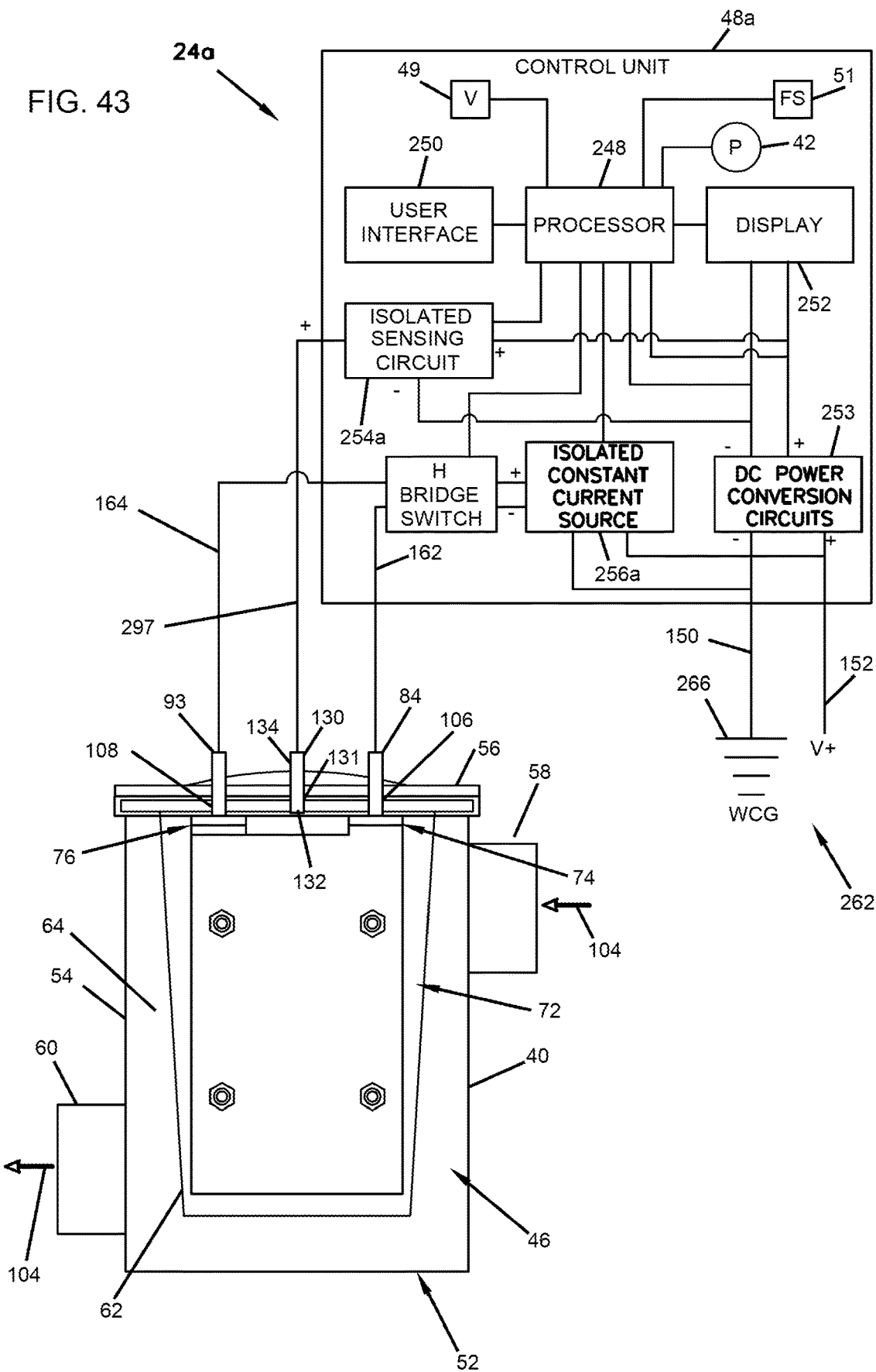
FIG. 43 schematically depicts another biocide generating system in accordance with the principles of the present disclosure.
Figure 44:
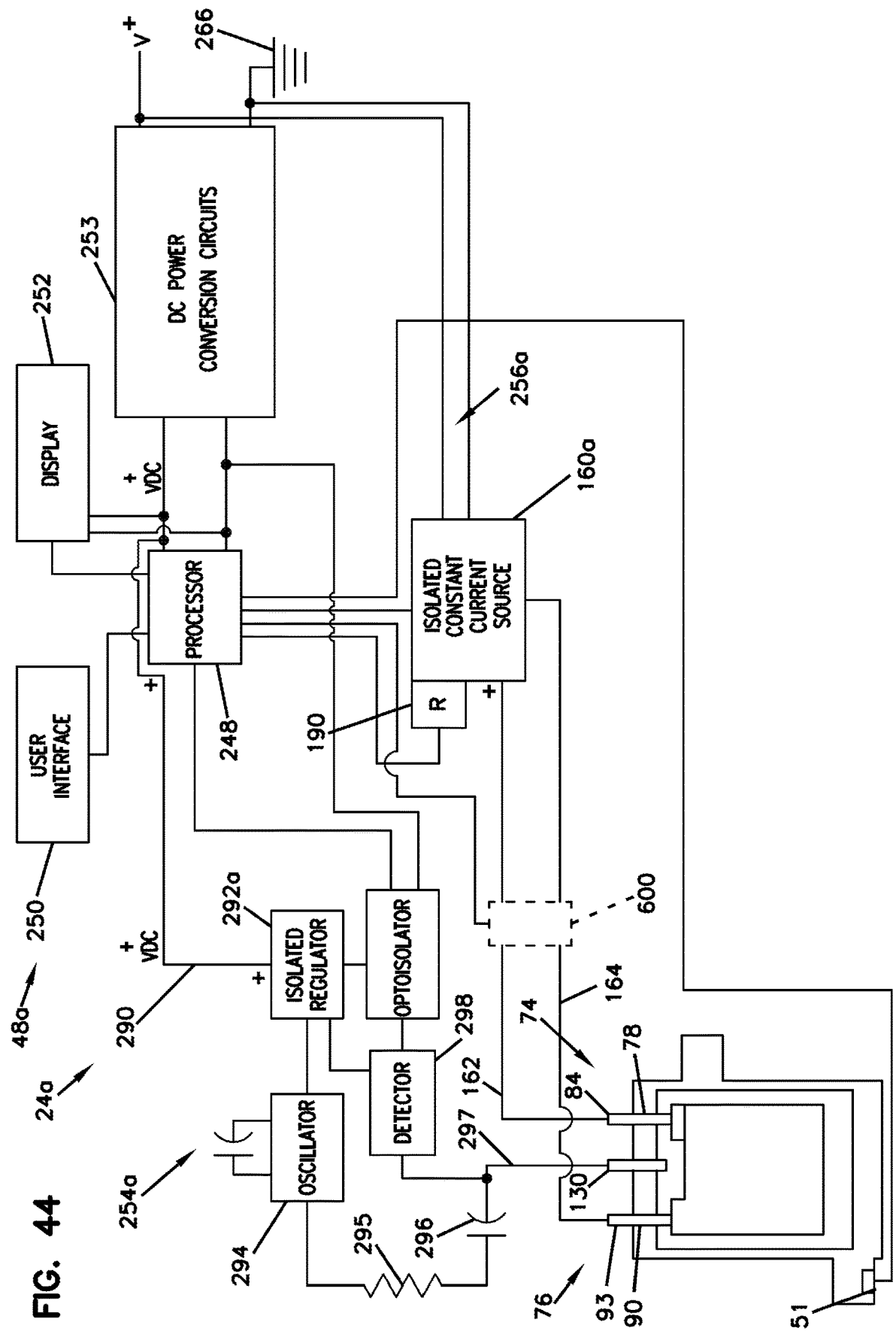
FIG. 44 is a more detailed schematic of the biocide generating system of FIG. 43.

FIGS. 43 and 44 depict another biocide generating system 24a in accordance with the principles of the present disclosure. The biocide generating system 24a has similar components as the biocide generating system 24, and like components have been assigned the same reference numbers. The biocide generating system 24a is modified as compared to the biocide generating system 24 by including DC power conversion circuits 253 for providing power (e.g., non-isolated power) to components such as the processor 248, the display 252 and a gas sensing circuit 254a. The gas sensing circuit 254a is isolated from the main power system of the boat by a dedicated transformer or the like corresponding to the gas sensing circuit 254a (e.g., incorporated as part of an isolated regulator 292a) Also, the biocide generating system 24a includes a constant current source 160a that receives power from the main power system of the boat, and which is electrically isolated from the main power system of the boat (e.g., the main boat ground 266) by a dedicated transformer or the like corresponding to the constant current source 160a. The DC power conversion circuitry 253 does not convert power provided to the isolated constant current source 160a.

The various examples described above are provided by way of illustration only and should not be construed to limit the scope of the present disclosure. Those skilled in the art will readily recognize various modifications and changes that may be made with respect to the examples illustrated and described herein without departing from the true spirit and scope of the present disclosure.

What is claimed is:

1. A biocide generating system for inhibiting bio-fouling within a water system of a watercraft, the water system being configured to draw water from a body of water on which the watercraft is supported, the biocide generating system comprising:
an electrode arrangement adapted to be incorporated as part of an electrolytic cell through which the water of the water system flows; and
a control system that interfaces with the electrode arrangement, the control system including an electrical power circuit for establishing a flow of electrical current between first and second electrodes of the electrode arrangement to generate a biocide in the water within the electrolytic cell, the control system including a switching arrangement operable in a first switch configuration in which the first electrode is an anode and the second electrode is a cathode, the switching arrangement also being operable in a second switch configuration in which the first electrode is a cathode and the second electrode is an anode, and the switching arrangement being operable in a third switch configuration in which electrical power is terminated to the first and second electrodes and the first and second electrodes are electrically connected to one another by a circuit path that by-passes the water in the electrolytic cell and provides a short circuit between the first and second electrodes.

2. The biocide generating system of claim 1, wherein the electrical power circuit is configured to be electrically isolated from the watercraft.

3. The biocide generating system claim 1, wherein the electrical power circuit includes a constant current power supply for applying electrical current across the first and second electrodes.

4. The biocide generating system of claim 1, wherein the control system is configured to vary a magnitude of the electrical current established between the first and second electrodes in relation to a rate of water flow through the electrolytic cell.

5. The biocide generating system of claim 4, further comprising a flow sensor for sensing the rate of water flow through the electrolytic cell.

6. The biocide generating system of claim 5, wherein the flow sensor is integrated with the electrolytic cell.

7. The biocide generating system of claim 4, wherein the control system is configured to vary the magnitude of the electrical current in proportion to the rate of water flow through the electrolytic cell.

8. The biocide generating system of claim 4, wherein the control system varies the magnitude of the electrical current based on an algorithm derived from Faraday's law of electrolysis and system dependent operating properties of the system.

9. The biocide generating system of claim 4, wherein the electrolytic cell includes a housing having an inlet and an outlet, wherein the electrode arrangement is located within the housing, wherein the outlet is adapted for connection to a portion of the water system desired to be treated with biocide.

10. The biocide generating system of claim 9, further comprising a flow sensor for sensing a rate of water flow through the electrolytic cell, the flow sensor being carried with the housing.

11. The biocide generating system of claim 1, wherein the third switch configuration expedites transitioning electrolytic cell from a first ion distribution wherein ions are concentrated about the first and second electrodes to a second ion distribution in which the ions are more uniformly distributed within the electrolytic cell, wherein the second ion distribution corresponds generally to a condition in which the ions are at equilibrium and no voltage differential exists between the first and second electrodes.

12. The biocide generating system of claim 1, wherein during biocide generation the control system alternates the switching arrangement between the first and second switch configuration wherein before switching the switching arrangement from the first switch configuration to the second switch configuration the control system temporarily switches the switching arrangement to the third switch configuration, and wherein before switching the switching arrangement from the second switch configuration back to the first switch configuration the control system temporarily switches the switching arrangement to the third switch configuration.

13. The biocide generating system of claim 12, wherein the switching arrangement is operated in the first and second switching configurations for first durations prior to switching, and wherein the switching arrangement is operated in the third switch configuration for a second duration before switching, wherein the first duration is longer than the second duration.

14. The biocide generating system of claim 1, wherein the water system includes a flow path that extends sequentially from an inlet of the water system through the electrolytic cell and a heat exchanger to an outlet of the water system, wherein the inlet of the water system draws water into the flow path from the body of water and the outlet of the water system deposits the water from the flow path back into the body of water, wherein the electrolytic cell generates biocide in the water flowing through the flow path, and wherein the biocide generated by the electrolytic cell provides treatment of the heat exchanger to prevent growth of bio-organisms within the heat exchanger.

15. The biocide generating system of claim 1, wherein the electrolytic cell includes a housing having an inlet and an outlet, wherein the electrode arrangement is in the housing, wherein the housing contains a straining filter, wherein the inlet of the housing directs water into an interior of the straining filter such that the water within the interior of the straining filter has not been filtered by the straining filter and must flow through the straining filter in an interior-to-exterior direction to reach the outlet of the housing, and wherein at least a portion of the electrode arrangement is located within the interior of the straining filter.

16. The biocide generating system of claim 1, wherein the water system includes a main flow path that extends sequentially from an inlet of the water system through a strainer, the electrolytic cell, and a heat exchanger to an outlet of the water system, wherein the electrolytic cell generates biocide in water flowing through the main flow path, wherein the water system also includes a recirculation flow line that taps only a portion of the water flowing through the main flow path and directs the tapped portion of the water from a first location at or after the electrolytic cell to a second location before the electrolytic cell, and wherein the second location is at or before the strainer of the water system.

17. The biocide generating system of claim 1, wherein the control system also includes a gas sensing circuit for detecting when gas collects in the electrolytic cell.

18. The biocide generating system of claim 17, wherein the gas sensing circuit includes a gas sensing electrode.

19. The biocide generating system of claim 1, wherein the electrolytic cell includes a canister lid and a canister main body to which the canister lid attaches, wherein the canister main body defines a water inlet and a water outlet, wherein the canister main body defines an interior volume in fluid communication with the water inlet and the water outlet, wherein the electrode arrangement is carried with the canister lid and includes interleaved electrode plates coupled to the canister lid, and wherein the electrode plates extend into the interior volume of the canister main body when the canister lid is mounted on the canister main body.

20. The biocide generating system of claim 1, wherein the electrolytic cell includes a housing having a water inlet and a water outlet, wherein the housing defines a flow passage that extends between the water inlet and the water outlet, wherein the electrode arrangement is positioned within the flow passage of the housing, wherein the electrode arrangement includes interleaved electrode plates, wherein flow diverter is provided within the flow passage for diverting the flow of water such that the water flow is distributed more uniformly through the electrode arrangement, and wherein the flow diverter is optionally a comb-like baffle having comb teeth that extend into interstitial spaces between the electrode plates.

21. The biocide generating system of claim 1, wherein the control system is configured to generate biocide when water is flowing through the system and also is configured to generate a controlled amount of biocide when the water flow through the water system has stopped such that sufficient biocide is generated to diffuse from the electrolytic cell toward a water inlet of the water system.

22. A biocide generating system for inhibiting bio-fouling within a water system of a watercraft, the water system being configured to draw water from a body of water on which the watercraft is supported, the biocide generating system comprising:
   an electrode arrangement adapted to be incorporated as part of an electrolytic cell through which the water of the water system flows; and
   a control system that interfaces with the electrode arrangement, the control system including an electrical power circuit for establishing a flow of electrical current between first and second electrodes of the electrode arrangement to generate a biocide in the water within the electrolytic cell, the control system including a switching arrangement operable in a first switch configuration in which the first electrode is an anode and the second electrode is a cathode, the switching arrangement also being operable in a second switch configuration in which the first electrode is a cathode and the second electrode is an anode, wherein the electrolytic cell includes a housing having a water inlet and a water outlet which are offset from one another along a height of the housing so as to not have an in-line configuration, the water inlet and outlet being respectively positioned at first and second different height locations along the height of the housing and being respectively positioned at opposite first and second sides of the housing, wherein the housing defines a flow passage that extends between the water inlet and the water outlet, wherein the electrode arrangement is positioned within the flow passage of the housing, wherein the electrode arrangement includes interleaved electrode plates, wherein a flow diverter is provided within the flow passage, wherein the flow diverter is a comb-like baffle having comb teeth that extend into interstitial spaces between the electrode plates, wherein the flow diverter is located at the second side of the housing at a third height location between the first and second height locations, and wherein the interstitial spaces face toward the opposite first and second sides of the housing.

* * * * *